(12) United States Patent
Iakovleva et al.

(10) Patent No.: US 12,700,245 B1
(45) Date of Patent: Aug. 4, 2026

(54) SYSTEMS FOR CALIBRATING VEHICLE-BASED IMAGE CAPTURE DEVICES

(71) Applicant: Geotab Inc., Oakville (CA)

(72) Inventors: Aleksandra Iakovleva, Espoo (FI); Gleb Odinokikh, Dubai (AE); Arsenii Pavlov, Yerevan (AM); Christopher Piche, Abu Dhabi (AE)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/465,436

(22) Filed: Jan. 30, 2026

Related U.S. Application Data

(60) Provisional application No. 63/812,605, filed on May 27, 2025.

(51) Int. Cl.
| | |
|---|---|
| *G06V 20/59* | (2022.01) |
| *G06T 7/70* | (2017.01) |
| *G06T 7/80* | (2017.01) |
| *G06V 10/25* | (2022.01) |
| *G06V 10/762* | (2022.01) |

(52) U.S. Cl.
CPC .............. G06V 20/597 (2022.01); G06T 7/70 (2017.01); G06T 7/80 (2017.01); G06V 10/25 (2022.01); G06V 10/762 (2022.01); *G06T 2207/20132* (2013.01)

(58) Field of Classification Search
CPC .... G06V 20/597; G06V 10/25; G06V 10/762; G06T 7/70; G06T 7/80; G06T 2207/20132
See application file for complete search history.

(56) References Cited

U.S. PATENT DOCUMENTS

| | | | |
|---|---|---|---|
| 7,505,841 B2 | 3/2009 | Sun et al. | |
| 7,676,087 B2 | 3/2010 | Dhua et al. | |
| 9,405,970 B2 | 8/2016 | Israel et al. | |
| 9,489,635 B1 | 11/2016 | Zhu | |
| 10,007,854 B2 * | 6/2018 | Blayvas | H04N 13/20 |
| 10,496,891 B2 | 12/2019 | Sai | |
| 10,728,420 B2 | 7/2020 | Popa | |
| 10,997,434 B2 | 5/2021 | Kurian et al. | |
| 11,336,867 B2 | 5/2022 | Meier et al. | |
| 11,562,550 B1 * | 1/2023 | Asghar | G06F 3/012 |
| 11,758,096 B2 | 9/2023 | Shah et al. | |
| 11,866,055 B1 | 1/2024 | Srinivasan et al. | |
| 11,978,266 B2 * | 5/2024 | Arar | G06V 20/56 |

(Continued)

FOREIGN PATENT DOCUMENTS

| | | |
|---|---|---|
| CN | 114092916 A | 2/2022 |
| CN | 115731535 A | 3/2023 |

(Continued)

*Primary Examiner* — Fernando Alcon
(74) *Attorney, Agent, or Firm* — Mark J. Pringle-Rigby

(57) ABSTRACT

Systems, devices, and methods for calibration of image capture devices at vehicles are described. A calibration polygon is determined based on key points in image data. The calibration polygon can be regularly or continuously calibrated in an ongoing matter based on additional key points in later captured image data. The calibration polygon can be monitored continuously or periodically, to determine when recalibration is required. Calibration for road-facing image capture devices and cabin-facing capture devices is described.

16 Claims, 18 Drawing Sheets

(56)     References Cited

U.S. PATENT DOCUMENTS

| | | | |
|---|---|---|---|
| 11,995,546 B1 | 5/2024 | Srinivasan et al. | |
| 12,175,773 B1 * | 12/2024 | Kaushik | G06V 20/597 |
| 12,197,610 B2 * | 1/2025 | Wen | G06V 20/46 |
| 2011/0115912 A1 | 5/2011 | Kuehnle | |
| 2015/0049193 A1 | 2/2015 | Gupta et al. | |
| 2015/0371095 A1 | 12/2015 | Hartmann et al. | |
| 2016/0343145 A1 | 11/2016 | Israel et al. | |
| 2021/0335130 A1 * | 10/2021 | Messer | B60R 11/04 |
| 2021/0402942 A1 * | 12/2021 | Torabi | B60W 50/14 |
| 2022/0051017 A1 * | 2/2022 | Choi | G06N 3/047 |
| 2022/0245955 A1 | 8/2022 | Freeman et al. | |
| 2023/0038842 A1 | 2/2023 | Yu et al. | |
| 2023/0166743 A1 * | 6/2023 | Heck | G06N 3/044 |
| 2024/0005675 A1 | 1/2024 | Lelowicz et al. | |
| 2024/0367645 A1 * | 11/2024 | Sasmal | B60W 30/09 |
| 2025/0046175 A1 * | 2/2025 | Lipchin | G08B 21/22 |
| 2025/0384758 A1 * | 12/2025 | Tengstrand | G06V 40/172 |

FOREIGN PATENT DOCUMENTS

| | | | | |
|---|---|---|---|---|
| CN | 116194342 A | 5/2023 | | |
| WO | WO-2023244513 A1 * | 12/2023 | | G06F 21/62 |
| WO | WO-2025143408 A1 * | 7/2025 | | G06V 10/80 |

* cited by examiner

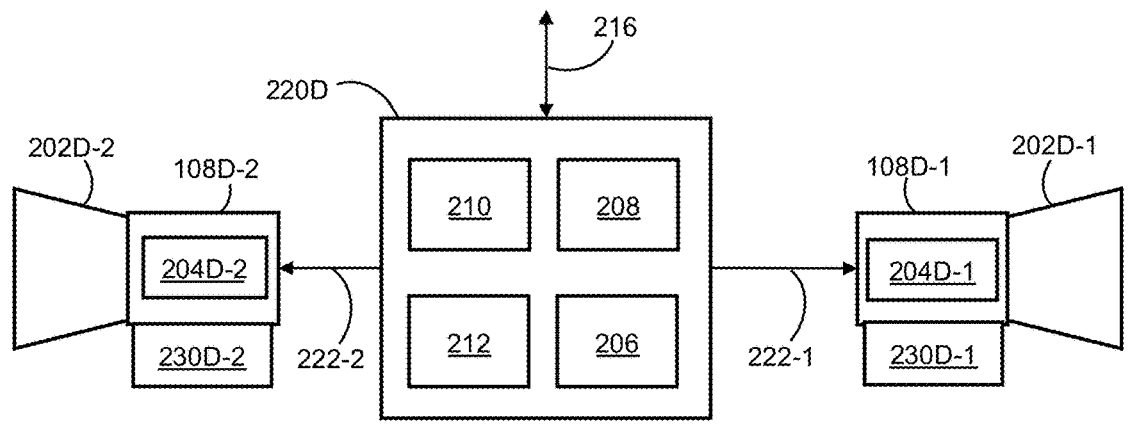
FIGURE 2D
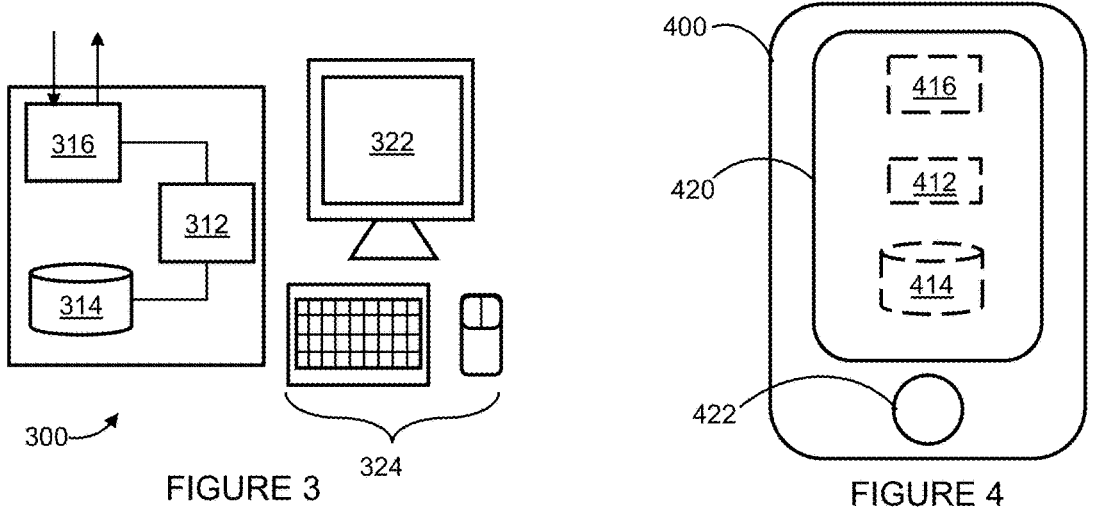
FIGURE 3
FIGURE 4
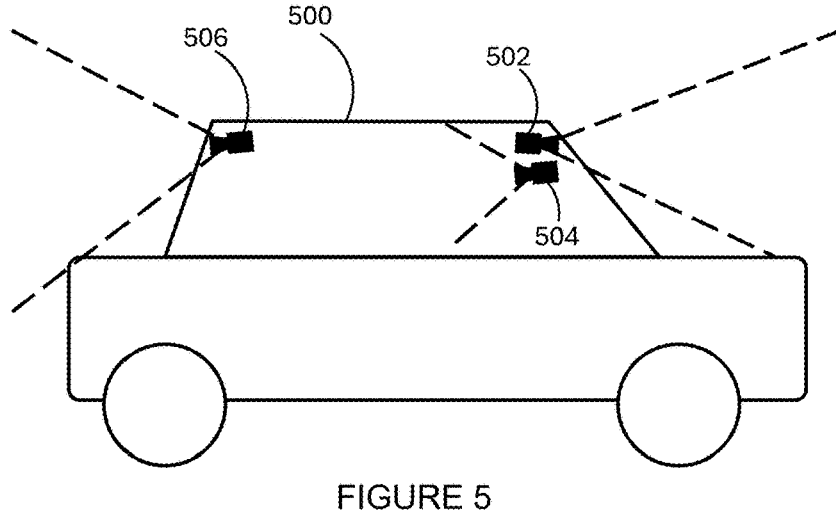
FIGURE 5

1400

SYSTEMS FOR CALIBRATING VEHICLE-BASED IMAGE CAPTURE DEVICES

PRIOR APPLICATION DATA

This application claims priority to U.S. Provisional Patent Application No. 63/812,605, titled "Systems and Methods for Calibrating Vehicle-Based Image Capture Devices", filed on May 27, 2025.

TECHNICAL FIELD

The present disclosure generally relates to systems, methods, and devices which capture image data at vehicles, and in particular relates to calibration of image capture devices at vehicles.

BACKGROUND

Vehicle-related image data provides a number of benefits. As non-limiting examples, image data captured from a perspective of a vehicle can be used to identify or characterize infrastructure (for example signage), to analyze driving behaviors, or to understand events such as collisions or near-misses. To make optimal use of vehicle-related image data, image capture devices positioned at a vehicle should be adjusted to capture an optimal field of view, and/or calibrated to identify regions of the field of view of greatest importance.

SUMMARY

According to a broad aspect, the present disclosure describes a method, comprising: performing a calibration process which includes: accessing first telematics data for a vehicle; accessing a first image data series captured by at least one image capture device at the vehicle representing a road external to the vehicle, the first image data series and the first telematics data representing a first period of time; determining whether suitability criteria are satisfied for at least the first telematics data; when the suitability criteria are not satisfied, restarting the calibration process; when the suitability criteria are satisfied: for each image in the first image data series, identifying a respective nearest left-lane point, the nearest left-lane point being a nearest point to the vehicle in the image on a lane boundary left of the vehicle; for each image in the first image data series, identifying a respective nearest right-lane point, the nearest right-lane point being a nearest point to the vehicle on a lane boundary right of the vehicle; for each image in the first image data series, identifying a respective vanishing point; and aggregating respective nearest left-lane points as an aggregate nearest left-lane point, respective nearest right-lane points as an aggregate nearest right-lane point, and respective vanishing points as an aggregate vanishing point, to define a calibration polygon including vertices at the aggregate nearest left-lane point, the aggregate nearest right-lane point, and the aggregate vanishing point; and performing a monitoring process which includes: accessing second telematics data for the vehicle; accessing second image data captured at the vehicle representing a road external to the vehicle, the second image data and the second telematics data representing a common time after the first period of time; determining whether the suitability criteria are satisfied for at least the second telematics data; when the suitability criteria are not satisfied, restarting the monitoring process; when the suitability criteria are satisfied: identifying another nearest left-lane point in the second image data, the other nearest left-lane point being a nearest point to the vehicle in the second image data on a lane boundary left of the vehicle; identifying another nearest right-lane point in the second image data, the other nearest right lane point being a nearest point to the vehicle in the second image data on a lane boundary right of the vehicle; identifying another vanishing point in the second image data; comparing the other nearest left-lane point, the other nearest right-lane point, and the other vanishing point, as a monitoring polygon, to the calibration polygon; when the monitoring polygon deviates from the calibration polygon in excess of a deviation threshold, performing the calibration process again; and when the monitoring polygon does not deviate from the calibration polygon in excess of the deviation threshold, maintain the calibration polygon.

The first telematics data may include location data indicative of a trajectory of the vehicle for the first period of time, and the suitability criteria may include the trajectory of the vehicle being a straight line.

The first telematics data may include location data over time or speed data indicative of movement speed of the vehicle for the first period of time, and the suitability criteria may include the movement speed of the vehicle exceeding a speed threshold.

The first telematics data may include location data indicative of a location of the vehicle, and the suitability criteria may include the location of the vehicle matching a location classification.

Determining whether suitability criteria are satisfied for at least the first telematics data may comprise determining whether the suitability criteria are satisfied for the first telematics data and the first image data series. Determining whether the suitability criteria are satisfied for the first image data series may comprise determining whether lane line markings are visible in the first image data series.

The calibration process may further include, prior to aggregating the respective nearest left-lane points, the respective nearest right-lane points, and the respective vanishing points: determining whether each nearest left-lane point, nearest right-lane point, and vanishing point is valid. Aggregating the respective nearest left-lane points, the respective nearest right-lane points, and the respective vanishing points may be limited to aggregating valid nearest left-lane points, valid nearest right-lane points, and valid vanishing points. Determining whether the nearest left-lane points, the nearest right-lane points, and the vanishing points are valid may comprise at least one of: applying a trained plausibility detection model to identify valid points as points which are plausible; and determining whether the nearest left-lane point, nearest right-lane point, or vanishing point is based on an expected lane.

The method may further comprise determining a region of interest within a field of view of the at least one image capture device, based on the calibration polygon. The method may further comprise cropping image data from the at least one image capture device to the region of interest. The method may further comprise executing a trained detection model on the region of interest for image data from the at least one image capture device.

The method may further comprise orienting, by at least one actuator coupled to the at least one image capture device, the at least one image capture device to align a field of view of the at least one image capture device based on the calibration polygon.

The method may further comprise outputting, to a user by a user interface, the calibration polygon.

The deviation threshold may comprise a pixel displacement threshold, and the monitoring polygon may be within the deviation threshold if the monitoring polygon is displaced from the calibration polygon by a smaller pixel displacement than the displacement threshold.

The deviation threshold may comprise a respective pixel displacement threshold for each of the nearest left-lane point, the nearest right-lane point, and the vanishing point for the monitoring polygon. The monitoring polygon may be within the deviation threshold if each of the nearest left-lane point, the nearest right-lane point, and the vanishing point of the monitoring polygon are displaced, respectively, from the aggregated nearest left-lane point, aggregated nearest right-lane point, and aggregated vanishing point of the calibration polygon, by a displacement smaller than the respective pixel displacement threshold.

The method may further comprise determining a calibration confidence score based on an image position of the calibration polygon to an image position of an optimal polygon, the optimal polygon representing an optimal position for the calibration polygon. The deviation threshold may be variable based on the calibration confidence score.

The first telematics data may comprise inertial data indicative of vertical movement of the vehicle for the first period of time, and the suitability criteria may include the vertical movement of the vehicle being linear.

The first telematics data may comprise elevation data indicative of change in elevation of the vehicle for the first period of time, and the suitability criteria may include an elevation trajectory of the vehicle being linear.

According to another broad aspect, the present disclosure describes a system comprising: at least one image capture device positioned at a vehicle and oriented to face external to the vehicle; at least one processor; and at least one non-transitory processor-readable storage medium storing processor-executable instructions which when executed by the at least one processor cause the system to: perform a calibration process which includes: accessing first telematics data for the vehicle; capturing a first image data series by the at least one image capture device, the first image data series representing a road external to the vehicle, the first image data series and the first telematics data representing a first period of time; determining, by the at least one processor, whether suitability criteria are satisfied for at least the first telematics data; when the suitability criteria are not satisfied, restarting the calibration process; when the suitability criteria are satisfied: for each image in the first image data series, identifying a respective nearest left-lane point, the nearest left-lane point being a nearest point to the vehicle in the image on a lane boundary left of the vehicle; for each image in the first image data series, identifying a respective nearest right-lane point, the nearest right-lane point being a nearest point to the vehicle on a lane boundary right of the vehicle; for each image in the first image data series, identifying a respective vanishing point; and aggregating respective nearest left-lane points as an aggregate nearest left-lane point, respective nearest right-lane points as an aggregate nearest right-lane point, and respective vanishing points as an aggregate vanishing point, to define a calibration polygon including vertices at the aggregate nearest left-lane point, the aggregate nearest right-lane point, and the aggregate vanishing point; and performing a monitoring process which includes: accessing second telematics data for the vehicle; capturing second image data by the at least one image capture device, the second image data representing a road external to the vehicle, the second image data and the second telematics data representing a common time after the first period of time; determining, by the at least one processor, whether the suitability criteria are satisfied for at least the second telematics data; when the suitability criteria are not satisfied, restarting the monitoring process; when the suitability criteria are satisfied: identifying another nearest left-lane point in the second image data, the other nearest left-lane point being a nearest point to the vehicle in the second image data on a lane boundary left of the vehicle; identifying another nearest right-lane point in the second image data, the other nearest right lane point being a nearest point to the vehicle in the second image data on a lane boundary right of the vehicle; identifying another vanishing point in the second image data; comparing the other nearest left-lane point, the other nearest right-lane point, and the other vanishing point, as a monitoring polygon, to the calibration polygon; when the monitoring polygon deviates from the calibration polygon in excess of a deviation threshold, performing the calibration process again; and when the monitoring polygon does not deviate from the calibration polygon in excess of the deviation threshold, maintain the calibration polygon.

The first telematics data may include location data indicative of a trajectory of the vehicle for the first period of time, and the suitability criteria may include the trajectory of the vehicle being a straight line.

The first telematics data may include location data over time or speed data indicative of movement speed of the vehicle for the first period of time, and the suitability criteria may include the movement speed of the vehicle exceeding a speed threshold.

The first telematics data may include location data indicative of a location of the vehicle, and the suitability criteria may include the location of the vehicle matching a location classification.

The processor-executable instructions which cause the at least one processor to determine whether suitability criteria are satisfied for at least the first telematics data may cause the at least one processor to determine whether the suitability criteria are satisfied for the first telematics data and the first image data series. The processor-executable instructions which cause the at least one processor to determine whether the suitability criteria are satisfied for the first image data series may cause the at least one processor to determine whether lane line markings are visible in the first image data series.

The calibration process may further include, prior to aggregating the respective nearest left-lane points, the respective nearest right-lane points, and the respective vanishing points: determining whether each nearest left-lane point, nearest right-lane point, and vanishing point is valid. Aggregating the respective nearest left-lane points, the respective nearest right-lane points, and the respective vanishing points may be limited to aggregating valid nearest left-lane points, valid nearest right-lane points, and valid vanishing points. The processor executable instructions which cause the at least one processor to determine whether the nearest left-lane points, the nearest right-lane points, and the vanishing points are valid may cause the at least one processor to perform at least one of: apply a trained plausibility detection model to identify valid points as points which are plausible; and determine whether the nearest left-lane point, nearest right-lane point, or vanishing point is based on an expected lane.

The processor-executable instructions may further cause the at least one processor to: determine a region of interest within a field of view of the at least one image capture device, based on the calibration polygon. The processor-executable instructions may further cause the at least one processor to crop image data from the at least one image capture device to the region of interest. The processor-executable instructions may further cause the at least one processor to execute a trained detection model on the region of interest for image data from the at least one image capture device.

The system may further comprise at least one actuator coupled to the at least one image capture device, and the processor-executable instructions may further cause the system to orient, by the at least one actuator, the at least one image capture device to align a field of view of the at least one image capture device based on the calibration polygon.

The system may further comprise a user interface to output, to a user, the calibration polygon.

The deviation threshold may comprise a pixel displacement threshold, and the monitoring polygon may be within the deviation threshold if the monitoring polygon is displaced from the calibration polygon by a smaller pixel displacement than the displacement threshold.

The deviation threshold may comprise a respective pixel displacement threshold for each of the nearest left-lane point, the nearest right-lane point, and the vanishing point for the monitoring polygon, and the monitoring polygon may be within the deviation threshold if each of the nearest left-lane point, the nearest right-lane point, and the vanishing point of the monitoring polygon are displaced, respectively, from the aggregated nearest left-lane point, aggregated nearest right-lane point, and aggregated vanishing point of the calibration polygon, by a displacement smaller than the respective pixel displacement threshold.

The processor-executable instructions may further cause the at least one processor to determine a calibration confidence score based on an image position of the calibration polygon to an image position of an optimal polygon, the optimal polygon representing an optimal position for the calibration polygon. The deviation threshold may be variable based on the calibration confidence score.

The first telematics data may comprise inertial data indicative of vertical movement of the vehicle for the first period of time, and the suitability criteria may include the vertical movement of the vehicle being linear.

The first telematics data may comprise elevation data indicative of change in elevation of the vehicle for the first period of time, and the suitability criteria may include an elevation trajectory of the vehicle being linear.

The system may further comprise at least one telematics sensor which captures the first telematics data and the second telematics data.

According to another broad aspect, the present disclosure describes a method, comprising: performing an ongoing calibration process which includes: accessing telematics data for a vehicle; accessing an image captured by at least one image capture device at the vehicle representing a road external to the vehicle, the image and the telematics data representing a common time; determining whether suitability criteria are satisfied for at least the telematics data; when the suitability criteria are not satisfied, restarting the calibration process; when the suitability criteria are satisfied: identifying a nearest left-lane point in the image, the nearest left-lane point being a nearest point to the vehicle in the image on a lane boundary left of the vehicle; identifying a nearest right-lane point in the image, the nearest right-lane point being a nearest point to the vehicle on a lane boundary right of the vehicle; identifying a vanishing point in the image; and aggregating the nearest left-lane point, the nearest right-lane point, and the vanishing point, with a calibration polygon including vertices at an aggregated nearest left-lane point, an aggregated nearest right-lane point, and an aggregated vanishing point.

The telematics data may include location data indicative of a trajectory of the vehicle, and the suitability criteria may include the trajectory of the vehicle being a straight line.

The telematics data may include location data over time or speed data indicative of movement speed of the vehicle for the first period of time, and the suitability criteria may include the movement speed of the vehicle exceeding a speed threshold.

The telematics data may include location data indicative of a location of the vehicle, and the suitability criteria may include the location of the vehicle matching a location classification.

Determining whether suitability criteria are satisfied for at least the telematics data may comprise determining whether the suitability criteria are satisfied for the telematics data and the image. Determining whether the suitability criteria are satisfied for the image may comprise determining whether lane line markings are visible in the image.

The calibration process may further include, prior to aggregating the nearest left-lane point, the nearest right-lane point, and the vanishing point: determining that the nearest left-lane point, the nearest right-lane point, and vanishing point are valid. Determining that the nearest left-lane point, the nearest right-lane point, and the vanishing point are valid may comprise at least one of: applying a trained plausibility detection model to identify valid points as points which are plausible; and determining that the nearest left-lane point, nearest right-lane point, or vanishing point is based on an expected lane.

The method may further comprise determining a region of interest within a field of view of the at least one image capture device, based on the calibration polygon. The method may further comprise cropping image data from the at least one image capture device to the region of interest. The method may further comprise executing a trained detection model on the region of interest for image data from the at least one image capture device.

The method may further comprise orienting, by at least one actuator coupled to the at least one image capture device, the at least one image capture device to align a field of view of the at least one image capture device based on the calibration polygon.

The method may further comprise outputting, to a user by a user interface, the calibration polygon.

The method may further comprise determining a calibration confidence score based on an image position of the calibration polygon to an image position of an optimal polygon, the optimal polygon representing an optimal position for the calibration polygon.

The method may further comprise: dropping nearest left-lane data points, nearest right-lane data points, and vanishing points which exceed an age threshold from the calibration polygon.

The method may further comprise: dropping select nearest left-lane data points, nearest right-lane data points, and vanishing points from the calibration polygon when a data point limit is reached.

The telematics data comprises inertial data indicative of vertical movement of the vehicle, and the suitability criteria includes the vertical movement of the vehicle being linear.

The telematics data may comprise elevation data indicative of change in elevation of the vehicle, and the suitability criteria may include an elevation trajectory of the vehicle being linear.

According to yet another broad aspect, the present disclosure describes a system, comprising: at least one image capture device positioned at a vehicle and oriented to face external to the vehicle; at least one processor; and at least one non-transitory processor-readable storage medium storing processor-executable instructions which when executed by the at least one processor cause the system to: perform an ongoing calibration process which includes: accessing telematics data for the vehicle; capturing an image by the at least one image capture device, the image representing a road external to the vehicle, the image and the telematics data representing a common time; determining, by the at least one processor, whether suitability criteria are satisfied for at least the telematics data; when the suitability criteria are not satisfied, restarting the calibration process; when the suitability criteria are satisfied: identifying a nearest left-lane point in the image, the nearest left-lane point being a nearest point to the vehicle in the image on a lane boundary left of the vehicle; identifying a nearest right-lane point in the image, the nearest right-lane point being a nearest point to the vehicle on a lane boundary right of the vehicle; identifying a vanishing point in the image; and aggregating the nearest left-lane point, the nearest right-lane point, and the vanishing point, with a calibration polygon including vertices at an aggregated nearest left-lane point, an aggregated nearest right-lane point, and an aggregated vanishing point.

The telematics data may include location data indicative of a trajectory of the vehicle, and the suitability criteria includes the trajectory of the vehicle being a straight line.

The telematics data may include location data over time or speed data indicative of movement speed of the vehicle for the first period of time, and the suitability criteria may include the movement speed of the vehicle exceeding a speed threshold.

The telematics data may include location data indicative of a location of the vehicle, and the suitability criteria may include the location of the vehicle matching a location classification.

The processor-executable instructions which cause the at least one processor to determine whether suitability criteria are satisfied for at least the telematics data may cause the at least one processor to determine whether the suitability criteria are satisfied for the telematics data and the image. The processor-executable instructions which cause the at least one processor to determine whether the suitability criteria are satisfied for the image may cause the at least one processor to determine whether lane line markings are visible in the image.

The calibration process may further include, prior to aggregating the nearest left-lane point, the nearest right-lane point, and the vanishing point: determining that the nearest left-lane point, the nearest right-lane point, and vanishing point are valid. The processor executable instructions which cause the at least one processor to determine that the nearest left-lane point, the nearest right-lane point, and the vanishing point are valid may cause the at least one processor to perform at least one of: applying a trained plausibility detection model to identify valid points as points which are plausible; and determining that the nearest left-lane point, nearest right-lane point, or vanishing point is based on an expected lane.

The processor-executable instructions may further cause the at least one processor to determine a region of interest within a field of view of the at least one image capture device, based on the calibration polygon. The processor-executable instructions may further cause the at least one processor to crop image data from the at least one image capture device to the region of interest. The processor-executable instructions may further cause the at least one processor to execute a trained detection model on the region of interest for image data from the at least one image capture device.

The system may further comprise at least one actuator coupled to the at least one image capture device, and the processor-executable instructions further cause the system to orient, by the at least one actuator, the at least one image capture device to align a field of view of the at least one image capture device based on the calibration polygon.

The system may further comprise a user interface to output, to a user, the calibration polygon.

The processor-executable instructions may further cause the at least one processor to determine a calibration confidence score based on an image position of the calibration polygon to an image position of an optimal polygon, the optimal polygon representing an optimal position for the calibration polygon.

The processor-executable instructions may further cause the at least one processor to: drop nearest left-lane data points, nearest right-lane data points, and vanishing points which exceed an age threshold from the calibration polygon.

The processor-executable instructions may further cause the at least one processor to: drop select nearest left-lane data points, nearest right-lane data points, and vanishing points from the calibration polygon when a data point limit is reached.

The telematics data may comprise inertial data indicative of vertical movement of the vehicle for the first period of time, and the suitability criteria includes the vertical movement of the vehicle being linear.

The telematics data may comprise elevation data indicative of change in elevation of the vehicle for the first period of time, and the suitability criteria may include an elevation trajectory of the vehicle being linear.

The system may further comprise at least one telematics sensor which captures the telematics data.

According to yet another broad aspect, the present disclosure describes a method, comprising: performing a calibration process which includes: accessing first telematics data for a vehicle; accessing a first image data series captured by at least one image capture device at the vehicle representing an interior of the vehicle, the first image data series and the first telematics data representing a first period of time; determining whether suitability criteria are satisfied for at least the first telematics data; when the suitability criteria are not satisfied, restarting the calibration process; when the suitability criteria are satisfied: for each image in the first image data series, applying at least one detection model to identify at least one bounding box around at least one human represented in the first image data series; cluster bounding boxes of each human of the at least one human across the first image data series to identify a respective bounding box cluster for each human of the at least one human; aggregate a position of each bounding box in each bounding box cluster to determine an aggregated position of each human of the at least one human; and select one human of the at least one human, the select human positioned at a driver's seat of the vehicle; determine a calibration polygon focused on the aggregated position of the select human positioned at a driver's seat of the vehicle; and performing a monitoring process which includes: accessing second telematics data for the vehicle; accessing second image data captured at the vehicle representing the interior of the vehicle, the second image data and the second telematics data representing a common time after the first period of time; determining whether the suitability criteria are satisfied for at least the second telematics data; when the suitability criteria are not satisfied, restarting the monitoring process; when the suitability criteria are satisfied: applying the at least one detection model to identify a position of the select human represented in the second image data; compare the position of the select human in the second image data to the aggregated position of the select human; when the position of the select human in the second image data deviates from the aggregated position of the select human in excess of a deviation threshold, perform the calibration process again; and when the position of the select human in the second image data does not deviate from the aggregated position of the select human in excess of a deviation threshold, maintain the calibration polygon focused on the position of the select human.

The first telematics data may include location data over time or speed data indicative of movement speed of the vehicle for the first period of time, and the suitability criteria may include the movement speed of the vehicle exceeding a speed threshold.

The first telematics data may include location data indicative of a location of the vehicle, and the suitability criteria may include the location of the vehicle matching a location classification.

Determining whether suitability criteria are satisfied for at least the first telematics data may comprise determining whether the suitability criteria are satisfied for the first telematics data and the first image data series. Determining whether the suitability criteria are satisfied for the first image data series may comprise determining whether a driver of the vehicle is in a driving posture.

The method may further comprise determining a region of interest within a field of view of the at least one image capture device, based on the calibration polygon. The method may further comprise cropping image data from the at least one image capture device to the region of interest. The method may further comprise executing a trained detection model on the region of interest for image data from the at least one image capture device.

The method may further comprise orienting, by at least one actuator coupled to the at least one image capture device, the at least one image capture device to align a field of view of the at least one image capture device based on the calibration polygon.

The method may further comprise outputting, to a user by a user interface, the calibration polygon.

The deviation threshold may comprise a pixel displacement threshold, and the monitoring polygon may be within the deviation threshold if the monitoring polygon is displaced from the calibration polygon by a smaller pixel displacement than the displacement threshold.

The method may further comprise determining a calibration confidence score based on an image position of the calibration polygon to an image position of an optimal polygon, the optimal polygon representing an optimal position for the calibration polygon. The deviation threshold may be variable based on the calibration confidence score.

The first telematics data may comprise inertial data indicative of vertical movement of the vehicle for the first period of time, and the suitability criteria may include the vertical movement of the vehicle being linear.

According to yet another broad aspect, the present disclosure describes a system, comprising: at least one image capture device positioned at a vehicle and oriented to face an interior of the vehicle; at least one processor; and at least one non-transitory processor-readable storage medium storing processor-executable instructions which when executed by the at least one processor cause the system to: perform a calibration process which includes: access first telematics data for the vehicle; capturing a first image data series by the at least one image capture device, the first image data series representing an interior of the vehicle, the first image data series and the first telematics data representing a first period of time; determining, by the at least one processor, whether suitability criteria are satisfied for at least the first telematics data; when the suitability criteria are not satisfied, restarting the calibration process; when the suitability criteria are satisfied: for each image in the first image data series, applying at least one detection model to identify at least one bounding box around at least one human represented in the first image data series; cluster bounding boxes of each human of the at least one human across the first image data series to identify a respective bounding box cluster for each human of the at least one human; aggregate a position of each bounding box in each bounding box cluster to determine an aggregated position of each human of the at least one human; and select one human of the at least one human, the select human positioned at a driver's seat of the vehicle; determine a calibration polygon focused on the aggregated position of the select human positioned at a driver's seat of the vehicle; and perform a monitoring process which includes: accessing second telematics data for the vehicle; capturing second image data by the at least one image capture device, the second image data representing the interior of the vehicle, the second image data and the second telematics data representing a common time after the first period of time; determining, by the at least one processor, whether the suitability criteria are satisfied for at least the second telematics data; when the suitability criteria are not satisfied, restarting the monitoring process; when the suitability criteria are satisfied: applying the at least one detection model to identify a position of the select human represented in the second image data; compare the position of the select human in the second image data to the aggregated position of the select human; when the position of the select human in the second image data deviates from the aggregated position of the select human in excess of a deviation threshold, perform the calibration process again; and when the position of the select human in the second image data does not deviate from the aggregated position of the select human in excess of a deviation threshold, maintain the calibration polygon focused on the position of the select human.

The first telematics data may include location data over time or speed data indicative of movement speed of the vehicle for the first period of time, and the suitability criteria may include the movement speed of the vehicle exceeding a speed threshold.

The first telematics data may include location data indicative of a location of the vehicle, and the suitability criteria may include the location of the vehicle matching a location classification.

Determining whether suitability criteria are satisfied for at least the first telematics data may comprise determining whether the suitability criteria are satisfied for the first telematics data and the first image data series. Determining whether the suitability criteria are satisfied for the first image data series may comprise determining whether a driver of the vehicle is in a driving posture.

The processor-executable instructions may further cause the at least one processor to: determine a region of interest within a field of view of the at least one image capture device, based on the calibration polygon. The processor-executable instructions may further cause the at least one processor to crop image data from the at least one image capture device to the region of interest. The processor executable instructions may further cause the at least one processor to execute a trained detection model on the region of interest for image data from the at least one image capture device.

The system may further comprise at least one actuator coupled to the at least one image capture device, and the processor-executable instructions may further cause the system to orient, by the at least one actuator, the at least one image capture device to align a field of view of the at least one image capture device based on the calibration polygon.

The system may further comprise a user interface to output, to a user, the calibration polygon.

The deviation threshold may comprise a pixel displacement threshold, and the monitoring polygon may be within the deviation threshold if the monitoring polygon is displaced from the calibration polygon by a smaller pixel displacement than the displacement threshold.

The processor-executable instructions may further cause the at least one processor to determine a calibration confidence score based on an image position of the calibration polygon to an image position of an optimal polygon, the optimal polygon representing an optimal position for the calibration polygon. The deviation threshold may be variable based on the calibration confidence score.

The first telematics data may comprise inertial data indicative of vertical movement of the vehicle for the first period of time, and the suitability criteria may include the vertical movement of the vehicle being linear.

The first telematics data may comprise elevation data indicative of change in elevation of the vehicle for the first period of time, and the suitability criteria may include an elevation trajectory of the vehicle being linear.

The system may further comprise at least one telematics sensor which captures the first telematics data and the second telematics data.

According to yet another broad aspect, the present disclosure describes a method, comprising: performing an ongoing calibration process which includes: accessing telematics data for a vehicle; accessing image data captured by at least one image capture device at the vehicle representing an interior of the vehicle, the image data and the telematics data representing a common time; determining whether suitability criteria are satisfied for at least the telematics data; when the suitability criteria are not satisfied, restarting the calibration process; when the suitability criteria are satisfied: applying at least one detection model to identify at least one bounding box around at least one human represented in the image data; clustering bounding boxes of each human of the at least one human in the image data to identify a respective bounding box cluster for each human of the at least one human; selecting one human of the at least one human, the select human positioned at a driver's seat of the vehicle; and aggregating a position of each bounding box in each bounding box cluster with bounding boxes of a calibration polygon.

The telematics data may include location data over time or speed data indicative of movement speed of the vehicle for the common time, and the suitability criteria may include the movement speed of the vehicle exceeding a speed threshold.

The first telematics data may include location data indicative of a location of the vehicle, and the suitability criteria may include the location of the vehicle matching a location classification.

Determining whether suitability criteria are satisfied for at least the telematics data may comprise determining whether the suitability criteria are satisfied for the telematics data and the image data. Determining whether the suitability criteria are satisfied for the image data may comprise determining whether a driver of the vehicle is in a driving posture.

The method may further comprise determining a region of interest within a field of view of the at least one image capture device, based on the calibration polygon. The method may further comprise cropping image data from the at least one image capture device to the region of interest. The method may further comprise executing a trained detection model on the region of interest for image data from the at least one image capture device.

The method may further comprise orienting, by at least one actuator coupled to the at least one image capture device, the at least one image capture device to align a field of view of the at least one image capture device based on the calibration polygon.

The method may further comprise outputting, to a user by a user interface, the calibration polygon.

The method may further comprise determining a calibration confidence score based on an image position of the calibration polygon to an image position of an optimal polygon, the optimal polygon representing an optimal position for the calibration polygon.

The method may further comprise dropping bounding boxes which exceed an age threshold from the calibration polygon.

The method may further comprise dropping select bounding boxes from the calibration polygon when a bounding box limit is reached.

The telematics data may comprise inertial data indicative of vertical movement of the vehicle, and the suitability criteria may include the vertical movement of the vehicle being linear.

The telematics data may comprise elevation data indicative of change in elevation of the vehicle, and the suitability criteria may include an elevation trajectory of the vehicle being linear.

According to yet another broad aspect, the present disclosure describes a system, comprising: at least one image capture device positioned at a vehicle and oriented to face an interior of the vehicle; at least one processor; and at least one non-transitory processor-readable storage medium storing processor-executable instructions which when executed by the at least one processor cause the system to: perform an ongoing calibration process which includes: accessing telematics data for the vehicle; capturing image data by the at least one image capture device, the image data representing an interior of the vehicle, the image data and the telematics data representing a common time; determining, by the at least one processor, whether suitability criteria are satisfied for at least the telematics data; when the suitability criteria are not satisfied, restarting the calibration process; when the suitability criteria are satisfied: applying at least one detection model to identify at least one bounding box around at least one human represented in the image data; clustering bounding boxes of each human of the at least one human in the image data to identify a respective bounding box cluster for each human of the at least one human; selecting one human of the at least one human, the select human positioned at a driver's seat of the vehicle; and aggregating a position of each bounding box in each bounding box cluster with bounding boxes of a calibration polygon.

The telematics data may include location data over time or speed data indicative of movement speed of the vehicle for the common time, and the suitability criteria may include the movement speed of the vehicle exceeding a speed threshold.

The telematics data may include location data indicative of a location of the vehicle, and the suitability criteria may include the location of the vehicle matching a location classification.

The processor-executable instructions which cause the at least one processor to determine whether suitability criteria are satisfied for at least the telematics data may cause the at least one processor to determine whether the suitability criteria are satisfied for the telematics data and the image data. The processor-executable instructions which cause the at least one processor to determine whether the suitability criteria are satisfied for the image data may cause the at least one processor to determine whether a driver of the vehicle is in a driving posture.

The processor-executable instructions may further cause the at least one processor to determine a region of interest within a field of view of the at least one image capture device, based on the calibration polygon. The processor-executable instructions may further cause the at least one processor to crop image data from the at least one image capture device to the region of interest. The processor-executable instructions may further cause the at least one processor to execute a trained detection model on the region of interest for image data from the at least one image capture device.

The system may further comprise at least one actuator coupled to the at least one image capture device, and the processor-executable instructions may further cause the system to orient, by the at least one actuator, the at least one image capture device to align a field of view of the at least one image capture device based on the calibration polygon.

The system may further comprise a user interface to output, to a user, the calibration polygon.

The processor-executable instructions may further cause the at least one processor to determine a calibration confidence score based on an image position of the calibration polygon to an image position of an optimal polygon, the optimal polygon representing an optimal position for the calibration polygon.

The processor-executable instructions may further cause the at least one processor to drop bounding boxes which exceed an age threshold from the calibration polygon.

The processor-executable instructions may further cause the at least one processor to drop select bounding boxes from the calibration polygon when a bounding box limit is reached.

The telematics data may comprise inertial data indicative of vertical movement of the vehicle for the first period of time, and the suitability criteria may include the vertical movement of the vehicle being linear.

The telematics data may comprise elevation data indicative of change in elevation of the vehicle for the first period of time, and the suitability criteria may include an elevation trajectory of the vehicle being linear.

The system may further comprise at least one telematics sensor which captures the telematics data.

BRIEF DESCRIPTION OF THE DRAWINGS

Exemplary non-limiting embodiments are described with reference to the accompanying drawings in which:

FIGS. 2A, 2B, 2C, and 2D are simplified block diagrams of image capture devices according to at least four exemplary implementations.

FIG. 3 is a schematic view of an operator device in accordance with at least one exemplary implementation.

FIG. 4 is a front view of a mobile device in accordance with at least one exemplary implementation.

FIG. 5 is a side view of an exemplary vehicle with a plurality of image capture devices positioned thereat, in accordance with at least one exemplary implementation.

DETAILED DESCRIPTION

The present disclosure details systems and methods for calibrating and adjusting image capture devices.

Models (e.g. algorithms, artificial intelligence, and/or machine learning models) for identifying objects or features in image data are discussed herein. Generally, a machine learning model is trained based on a set of training data, after which the model becomes able to analyze input data and reliably detect features or make determinations based on the input data.

Figure 1A:
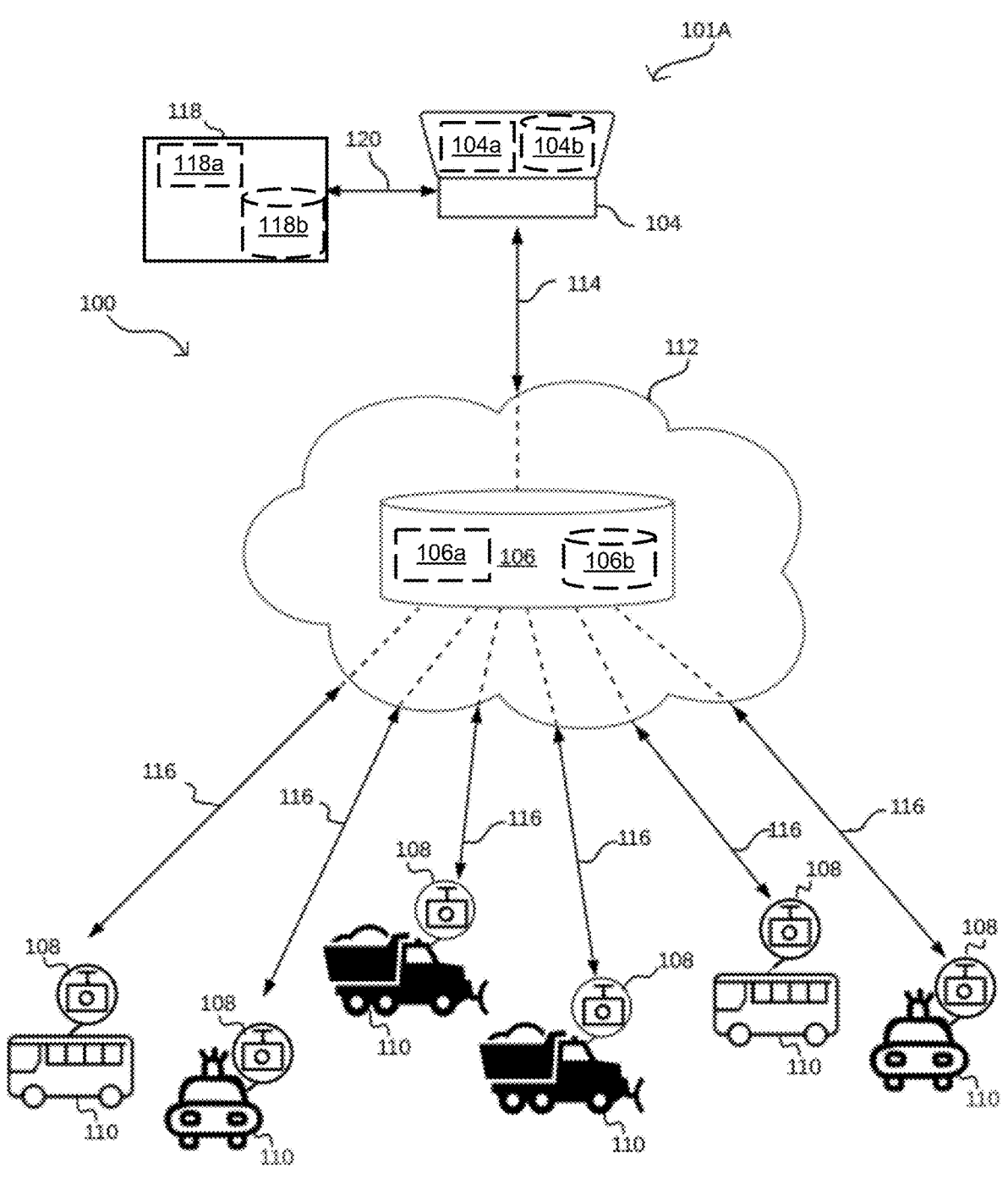
FIG. 1A illustrates a block diagram of an exemplary mobile image system.
Figure 1B:
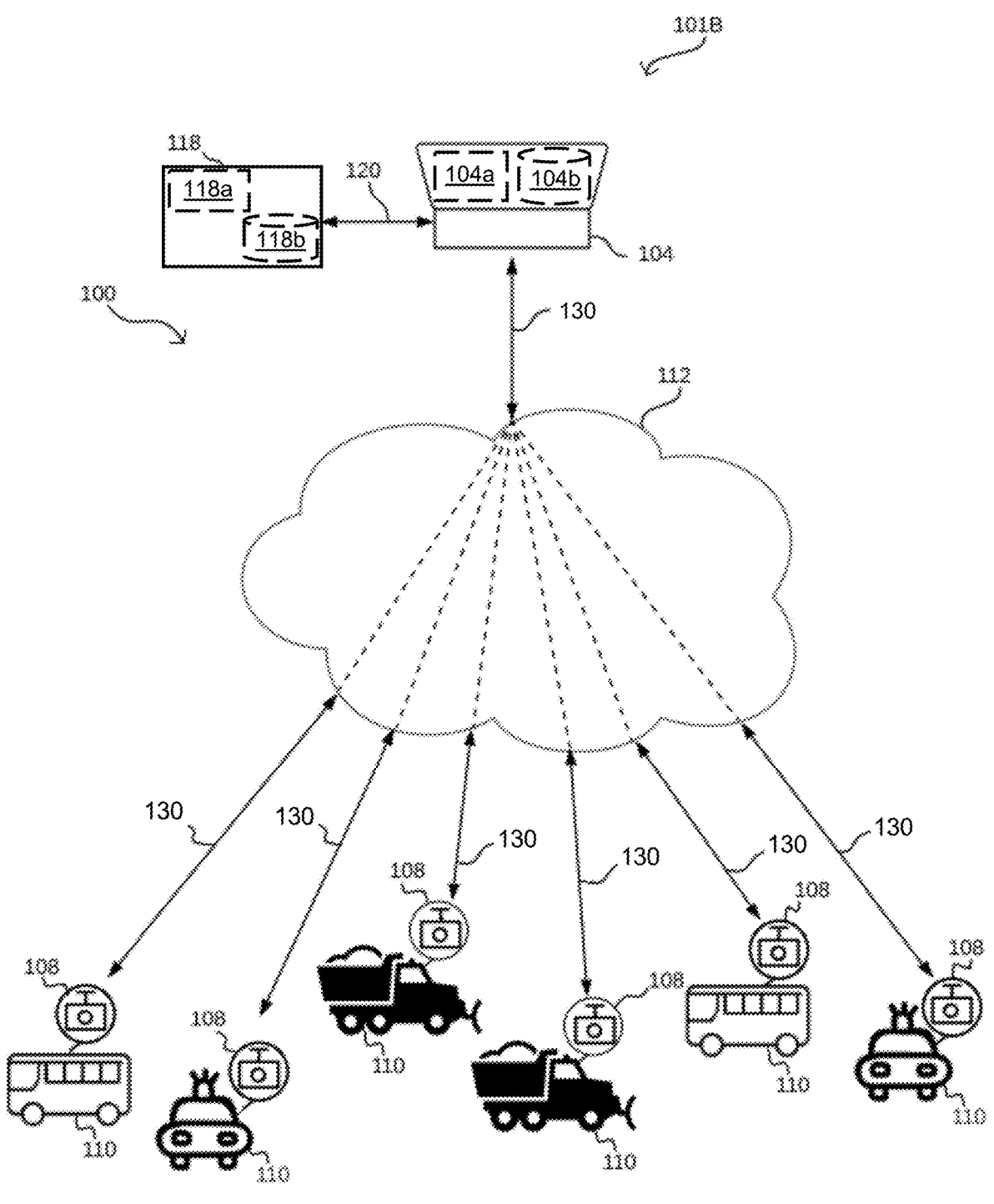
FIG. 1B illustrates a block diagram of another exemplary mobile image system.

FIG. 1A and FIG. 1B illustrate block diagrams of exemplary mobile image systems 101A and 101B, respectively, and exemplary communication network 100 through which mobile image systems 101A and 101B operate. In many of the implementations discussed herein, communication network 100 is optional. That is, in some implementations calibration and/or adjustment of image capture devices can be performed entirely local to a vehicle. Software or firmware updates, updates to models executable at the vehicle device, or provision of data (such as image data) from the vehicle device, can be performed by physical distribution (e.g. by connecting the vehicle device to another device to transfer data, or by using a portable storage medium to transfer the data), thus obviating the need for communication network 100. Alternatively, communication network 100 can be used to distribute data to and/or from vehicle devices (e.g. by sending software/firmware/models to vehicle devices for download, or receiving data such as image data from vehicle devices by upload).

Communication network 100 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 100 may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication network 100 may take other forms as well.

Mobile image system 101A includes a plurality of image capture devices 108, which can comprise (and be referred to herein) as smart video cameras (SVCs), though are not strictly limited as such. The plurality of image capture devices 108 are positioned at (e.g. mounted in/on, or placed within or on) a plurality of vehicles 110. Further, in some implementations more than one image capture device or more than one piece of image capture hardware can be positioned at each vehicle (or any particular vehicles), as is discussed in more detail later with reference to FIGS. 2C and 2D. Image capture system 101A also includes cloud server 106, client device 104 and local server 118. Client device 104 is communicatively coupled to local server 118 via communication link 120. Client device 104 is also shown as including at least one processor 104a and at least one non-transitory processor-readable storage medium 104b. The at least one processor 104a can perform acts such as determination, generation, identification, data analysis, processing, and other appropriate acts, such as acts in the methods described herein. The at least one non-transitory processor-readable storage medium 104b can store any appropriate data, including processor-executable instructions which when executed by the at least one processor 104a cause the client device 104 to perform acts, such as acts of the methods described herein. An exemplary client device may include a personal computer, server, a system, a combination of subsystems, and devices. Reference to a "camera" in this disclosure can include a smart video camera, but may also include a more basic camera. In this regard, the term "camera" can be used interchangeably with "image capture device". Each image capture device 108 is communicatively coupled to cloud server 106 in cloud 112 via a respective communication link 116. For example, each image capture device 108 and the cloud server 106 are configured to wirelessly communicate to each other. Cloud server 106 is also shown as including at least one processor 106a and at least one non-transitory processor-readable storage medium 106b. The at least one processor 106a can perform acts such as determination, generation, identification, data analysis, processing, and other appropriate acts, such as acts in the methods described herein. The at least one non-transitory processor-readable storage medium 106b can store any appropriate data, including processor-executable instructions which when executed by the at least one processor 106a cause the cloud server 106 to perform acts, such as acts of the methods described herein. Cloud server 106 is communicatively coupled to client device 104 via communication link 114. For example, cloud server 106 and client device 104 are configured to wirelessly communicate to each other. As another example, cloud server 106 and client device 104 are configured to communicate with each other over a wired connection. In some implementations, local server 118 may be a remote server from client device 104. Local server 118 is also shown as including at least one processor 118a and at least one non-transitory processor-readable storage medium 118b. The at least one processor 118a can perform acts such as determination, generation, identification, data analysis, processing, and other appropriate acts, such as acts in the methods described herein. The at least one non-transitory processor-readable storage medium 118b can store any appropriate data, including processor-executable instructions which when executed by the at least one processor 118a cause the local server 118 to perform acts, such as acts of the methods described herein.

Mobile image system 101B in FIG. 1B includes a plurality of image capture devices 108, positioned at a plurality of vehicles 110, similar to in FIG. 1A. Image system 101B also includes client device 104 and local server 118, similar to in FIG. 1A. In the example of FIG. 1B, client device 104 is communicatively coupled to local server 118 via communication link 120. An exemplary client device may include a personal computer, server, a system, a combination of systems subsystems, and devices. Each image capture device 108 is communicatively coupled to client device 104 via a respective communication link 130. For example, each image capture device 108 is configured to wirelessly communicate with client device 104. In some implementations, local server 118 may be a remote server from client device 104. The description of components in mobile image system 101A in FIG. 1A is applicable to similarly labelled components in mobile surveillance system 101B in FIG. 1B.

Specific and non-limiting examples of vehicle types which each of vehicles 110 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle, personal vehicle), among others.

An image capture device 108 (or more than one image capture device) may be mounted to or positioned at a vehicle 110 in a manner such that image capture device 108 captures image data of the environment outside the vehicle 110, e.g., towards the windshield, towards a window, atop the vehicle, etc. Additionally, and/or optionally, an image capture device 108 may be mounted to or positioned at a vehicle 110 in a manner such that the image capture device 108 captures image data of the interior of the vehicle. Interior-facing image capture devices 108 may be useful for detecting an event including detecting a person(s) of interest. Example mounting positions for an image capture device at a vehicle are shown in FIG. 5, discussed later.

Figure 2A:
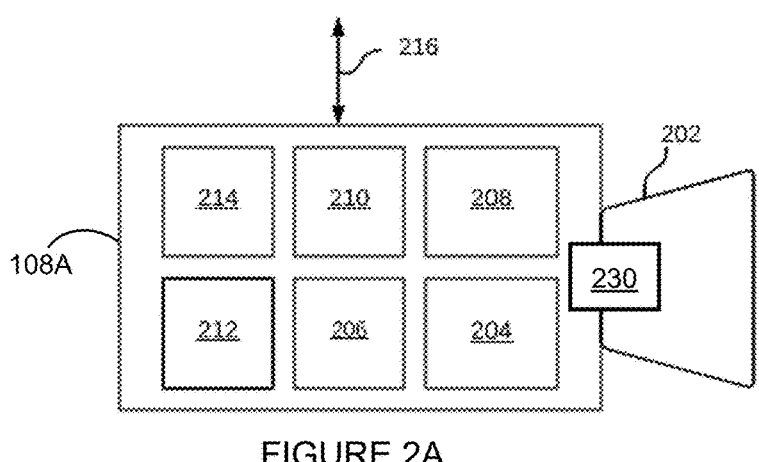

Now referring to FIG. 2A, shown is a simplified block diagram of exemplary image capture device 108A according to one implementation (as a smart video camera). Image capture device 108A as shown in FIG. 2A can be implemented as any of the image capture devices 108 shown in FIGS. 1A and 1B. Image capture device 108A includes lens 202, optoelectronics 204, at least one processor 206, data sensor 208 (e.g., such as a GPS receiver, acceleration sensor or IMU, speed sensor, or other appropriate sensor), wireless communication module 210 (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B). As mentioned earlier, in some implementations the calibration and/or adjustment of the image capture devices herein can be performed entirely locally at a vehicle. In such implementations, the inclusion of a wireless communication module 210 is optional. Image capture device 108A can also be referred to as a vehicle device, in that image capture device 108A is positionable or installable at a vehicle.

FIG. 2A also shows an optional actuator 230. In some implementations (e.g. discussed later with reference to FIGS. 21 and 22, an image capture device is actuatable by an actuator to reorient or redirect the image capture device to a more optimal viewing angle. Optional actuator 230 in FIG. 2A can serve this purpose. In FIG. 2A actuator 230 is positioned proximate lens 202, such the actuator 230 can actuate lens 202 relative to a housing and/or other components of image capture device 108A. Alternatively, actuator 230 could be positioned at a couple or mount where image capture device 108A mounts to the vehicle (similar to as shown in FIGS. 2B and 2D discussed later), such that actuator 230 actuates the entirety of image capture device 108A.

Figure 2B:
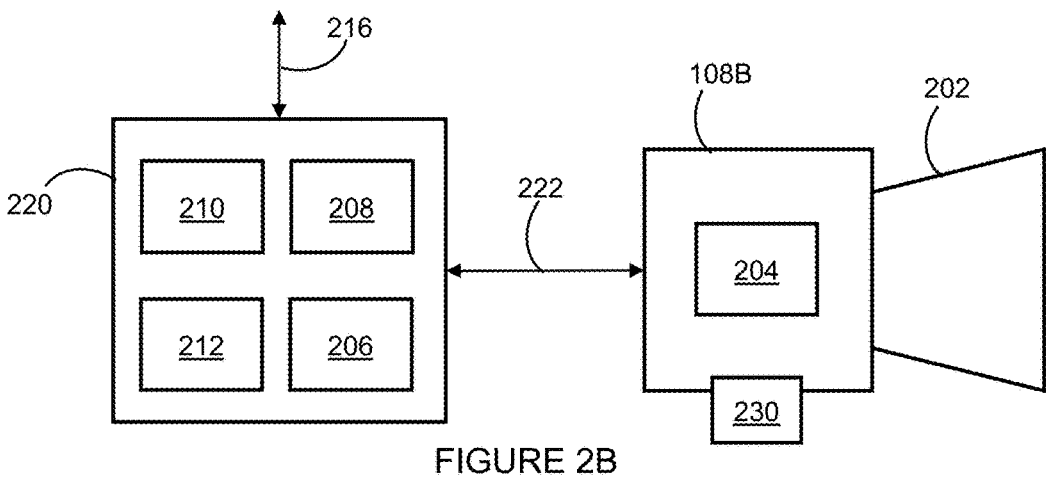

Now referring to FIG. 2B, shown is a simplified block diagram of exemplary image capture device 108B according to one implementation (as a camera which is coupled to a peripheral device, such as a vehicle device or telematics device). FIG. 2B includes many components with the same reference number as components discussed with reference to FIG. 2A. The description of such components in FIG. 2A is applicable to the similarly numbered components in FIG. 2B. In FIG. 2B, image capture device 108B includes lens 202 and optoelectronics 204. In this implementation, image capture device 108B is itself directed to capturing image data, which is in turn provided to a peripheral device 220 via a communication interface 222 (e.g. a wired or wireless communication interface). In some implementations, peripheral device 220 is a vehicle device, such as a telematics monitoring device positioned at a vehicle. In other implementations, peripheral device 220 comprises a collection of components integrated into a vehicle which communicate with each other (e.g. OEM integrated electronics). In FIG. 2B, peripheral device 220 is shown as including the at least one processor 206, the data sensor 208, the optional wireless communication module 210, and the at least one non-transitory processor-readable storage medium 212, similar to the components included in image capture device 108A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B). As discussed with reference to FIG. 2A, wireless communication module 210 is optional, and in some implementations the methods and system discussed herein can be entirely local to the vehicle.

FIG. 2B also shows an optional actuator 230, similar to as discussed with reference to FIG. 2A. In FIG. 2B actuator 230 is positioned at image capture device 108B, such the actuator 230 can actuate the entirety of image capture device 108B (independent of peripheral device 220). In particular, actuator 230 in FIG. 2B could be positioned at a couple or mount where image capture device 108B mounts to the vehicle.

Figure 2C:
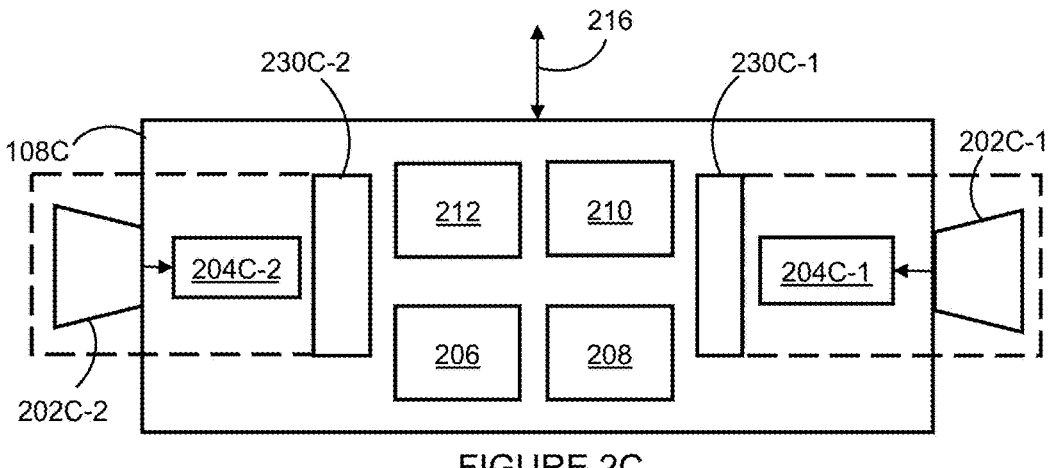

Now referring to FIG. 2C, shown is a simplified block diagram of an exemplary image capture device 108C according to one implementation (as a camera which includes multiple sets of image capture hardware). FIG. 2C includes many components with the same reference number as components discussed with reference to FIG. 2A. The description of such components in FIG. 2A is applicable to the similarly numbered components in FIG. 2C. In FIG. 2C, image capture device 108C includes a first lens 202C-1, a second lens 202C-2, first optoelectronics 204C-1, and second optoelectronics 204C-2. While two lenses and two optoelectronics are shown, any appropriate quantity of lenses or optoelectronics can be included as appropriate for a given application. In an exemplary implementation, lens 202C-1 could be road-facing and lens 202C-2 could be interior cabin-facing.

In the implementation of FIG. 2C, image capture device 108C further includes at least one processor 206, data sensor 208 (e.g., including a GPS receiver, acceleration sensor or IMU, speed sensor, or other appropriate sensor type), optional wireless communication module 210 (e.g., including a 4G or 5G communication module for providing cellular connectivity) and at least one non-transitory processor-readable storage medium 212, similar to as discussed earlier with regards to FIG. 2A. Unless context dictates otherwise, description of FIG. 2A is also applicable to FIG. 2C, and is not repeated for brevity. Similar to the example of FIG. 2A, in some implementations image capture device 108C can also be referred to as a vehicle device to telematics device, in that image capture device 108C is positionable or installable at a vehicle, and can communicate with other devices (e.g. cloud device 106 or client device 104 discussed with reference to FIGS. 1A and 1B) over a communication network (e.g. cloud 112 discussed with reference to FIGS. 1A and 1B).

FIG. 2C also shows optional actuators 230C-1 and 230C-2, similar to optional actuators 230 in FIGS. 2A and 2B, such that description of actuators 230 applies to actuators 230C-1 and 230C-2. In FIG. 2C actuator 230C-1 is positioned proximate lens 202C-1 and optoelectronics 204C-1, such that actuator 230C-1 can actuate lens 202C-1 and optoelectronics 204C-1 relative to a housing and/or other components of image capture device 108C. Similarly, actuator 230C-2 is positioned proximate lens 202C-2 and optoelectronics 204C-2, such that actuator 230C-2 can actuate lens 202C-2 and optoelectronics 204C-2 relative to a housing and/or other components of image capture device 108C. Alternatively, actuator 230C-1 and/or actuator 230C-2 could be positioned at a couple or mount where image capture device 108C mounts to the vehicle (similar to as shown in FIGS. 2B and 2D), such that actuator 230C-1 and/or actuator 230C-2 actuates the entirety of image capture device 108C.

Now referring to FIG. 2D, shown is a simplified block diagram of exemplary image capture devices 108D-1 and 108D-2 according to one implementation. FIG. 2D includes many components with the same reference number as components discussed with reference to FIGS. 2A and 2B. The description of such components in FIGS. 2A and 2B is applicable to the similarly numbered components in FIG. 2D. In FIG. 2D, image capture device 108D-1 includes a first lens 202D-1 and first optoelectronics 204D-1, and image capture device 108D-2 includes a second lens 202D-2 and second optoelectronics 204D-2. In the illustrated example, lens 202D-1 directs incoming light to optoelectronics 204D-1 (or an image sensor thereof), and lens 202D-2 directs incoming light to optoelectronics 204D-2 (or an image sensor thereof). While two image capture devices with respective lenses and optoelectronics are shown, any appropriate quantity of image capture devices, lenses or optoelectronics can be included as appropriate for a given application.

In the implementation of FIG. 2D, image capture devices 108D-1 and 108D-2 are themselves directed to capturing respective image data, which is in turn provided to a peripheral device 220D via respective communication interfaces 222-1 and 222-2 (e.g. wired or wireless communication interfaces). In some implementations, peripheral device 220D is a vehicle device, such as a telematics device positioned at a vehicle. In other implementations, peripheral device 220D comprises a collection of components integrated into a vehicle which communicate with each other (e.g. OEM integrated electronics). Peripheral device 220D in FIG. 2D is similar to peripheral device 220 in FIG. 2B; description of peripheral device 220 in FIG. 2B is fully applicable to peripheral device 220D in FIG. 2D, and is not repeated for brevity.

FIG. 2D also shows optional actuators 230D-1 and 230D-2, similar to optional actuators 230 in FIGS. 2A and 2B and actuators 230C-1 and 230C-2 in FIG. 2C, such that description of actuators 230, 230C-1, and 230C-2 applies to actuators 230D-1 and 230D-2. In FIG. 2D actuator 230D-1 is positioned proximate image capture device 108D-1, such that actuator 230D-1 can actuate image capture device 108D-1 as a whole. Similarly, actuator 230D-2 is positioned proximate image capture device 108D-2, such that actuator 230D-2 can actuate image capture device 108D-2 as a whole. In particular, actuator 230D-1 and/or actuator 230D-2 could be positioned at a couple or mount where image capture device 108D-1 or 108D-2 (respectively) mounts to the vehicle.

In the illustrative examples of FIGS. 2A, 2B, 2C, and 2D, each lens is associated with a set of optoelectronics. However, in some implementations, additional lenses or sets of optoelectronics could be used for a given image capture device (e.g. to achieve foveated vision). Further, in the illustrative examples of FIGS. 2A, 2B, 2C, and 2D, each lens is shown as being pointed in a different direction (to capture a different field of view). In some implementations, multiple lenses or image capture devices can be oriented in a similar direction (for example to capture a binocular view of the same environment).

Collectively, reference to an image capture device 108 or a plurality of image capture devices 108 can include image capture device 108A in FIG. 2A, image capture device 108B in FIG. 2B, image capture device 108C in FIG. 2C, or image capture devices 108D-1 or 108D-2 in FIG. 2D. Further, reference to an image capture device performing acts (such as in the methods discussed herein) can also refer to the peripheral device 220 or the peripheral device 220D performing such acts. For example, reference to an image capture device performing processing, determination, generating, identification, storing of data, transmission, or similar acts can refer to an image capture device and peripheral device in combination performing these acts.

FIG. 3 is a schematic view of an operator device 300, which could be used for management and use in implementations discussed herein, and in particular is useful as a server-side device. For example, device 300 could be used as client device 104 in FIGS. 1A and 1B, or as a user interface device to receive user input and/or present output to a user. Device 300 as illustrated includes at least one processor 312, at least one non-transitory processor-readable storage medium 314, and a communication interface 316. The non-transitory processor-readable storage medium 314 can have processor-readable instructions stored thereon which, when executed by the at least one processor 312 cause the device 300 to perform appropriate operations for the methods described herein. Communication interface 316 can be a wired or wireless interface, through which data and inputs can be provided to device 300, and through which data and outputs can be provided by device 300. For example, location data for a plurality of vehicles can be received from a telematics device or system by communication interface 316, for processing and analysis by the at least one processor 312. Resulting analysis can also be output by communication interface 316.

FIG. 3 also illustrates exemplary input and output devices through which a user or operator can interact with device 300. In particular, FIG. 3 shows a display 322, which can display outputs from device 300. Other output devices could be provided such as speakers, or any other appropriate output device. FIG. 3 also shows a keyboard and mouse 324, which can be used to provide inputs to the device 300. Other input devices could also be used, such as a touchscreen, microphone, trackpad, or any other appropriate input device. Although the input and output devices illustrated in FIG. 3 appear in the form of those used with a desktop computer, other forms of devices could also be used, such as portable devices like a laptop, smartphone, PDA, tablet, or any other appropriate device. Further, a device to which a user provides input and receives output can be remote from the device 300. For example, the device including the at least one processor 312, the at least one non-transitory processor-readable storage medium 314, and the communication interface 316 can be a server, which is remote from a workstation or device with which the user interacts.

FIG. 4 is a schematic view of a mobile device 400, which could be used for management, setup, initialization, use, or diagnostics in implementations discussed herein, and in particular is useful as user device. For example, mobile device 400 could be used as client device 104 in FIGS. 1A and 1B, or as a user interface device to receive user input and/or present output to a user. As another example, mobile device 400 could be used as a calibration/initialization device at a vehicle when installing, calibrating, adjusting, or diagnosing an image capture device at a vehicle. Mobile device 400 as illustrated includes at least one processor 412, at least one non-transitory processor-readable storage medium 414, and a communication interface 416. The non-transitory processor-readable storage medium 414 can have processor-readable instructions stored thereon which, when executed by the at least one processor 412 cause the mobile device 400 to perform appropriate operations for the methods described herein. Communication interface 416 can be a wired or wireless interface, through which data and inputs can be provided to mobile device 400, and through which data and outputs can be provided by mobile device 400.

FIG. 4 also illustrates exemplary input and output mechanisms through which a user or operator can interact with mobile device 400. In particular, FIG. 4 shows a touchscreen display 420, which can display outputs to and receive inputs from a user. Other output devices could be provided such as speakers, or any other appropriate output mechanism. FIG. 4 also shows a button 422, which can be used to provide input to the device 400. Other input mechanisms could also be used, such as a microphone, trackpad, or any other appropriate input device. Although the input and output mechanisms illustrated in FIG. 4 appear in the form of those used with a smartphone, other input and output mechanisms could be used as appropriate for the form factor of mobile device 400.

FIG. 5 is a side view of an exemplary vehicle 500. Vehicle 500 is shown as having image capture devices 502, 504, and 506 installed thereat. Image capture device 502 is a road-facing image capture device, oriented to capture image data representing an environment external to the vehicle, and in particular to capture image data representing an environment in front of the vehicle 500. Image capture device 504 is a cabin-facing image capture device, oriented to capture image data representing an environment inside the vehicle, and in particular to capture image data representing an interior cabin-space of the vehicle 500 where a driver and passengers can occupy. Image capture device 506 is a road-facing image capture device, oriented to capture image data representing an environment external to the vehicle, and in particular to capture image data representing an environment behind the vehicle 500.

While vehicle 500 is shown as including three image capture devices, any appropriate number of image capture devices could be installed at a given vehicle (such as one image capture device, two image capture devices, or even more image capture devices, such as 12 image capture devices).

Figure 6:
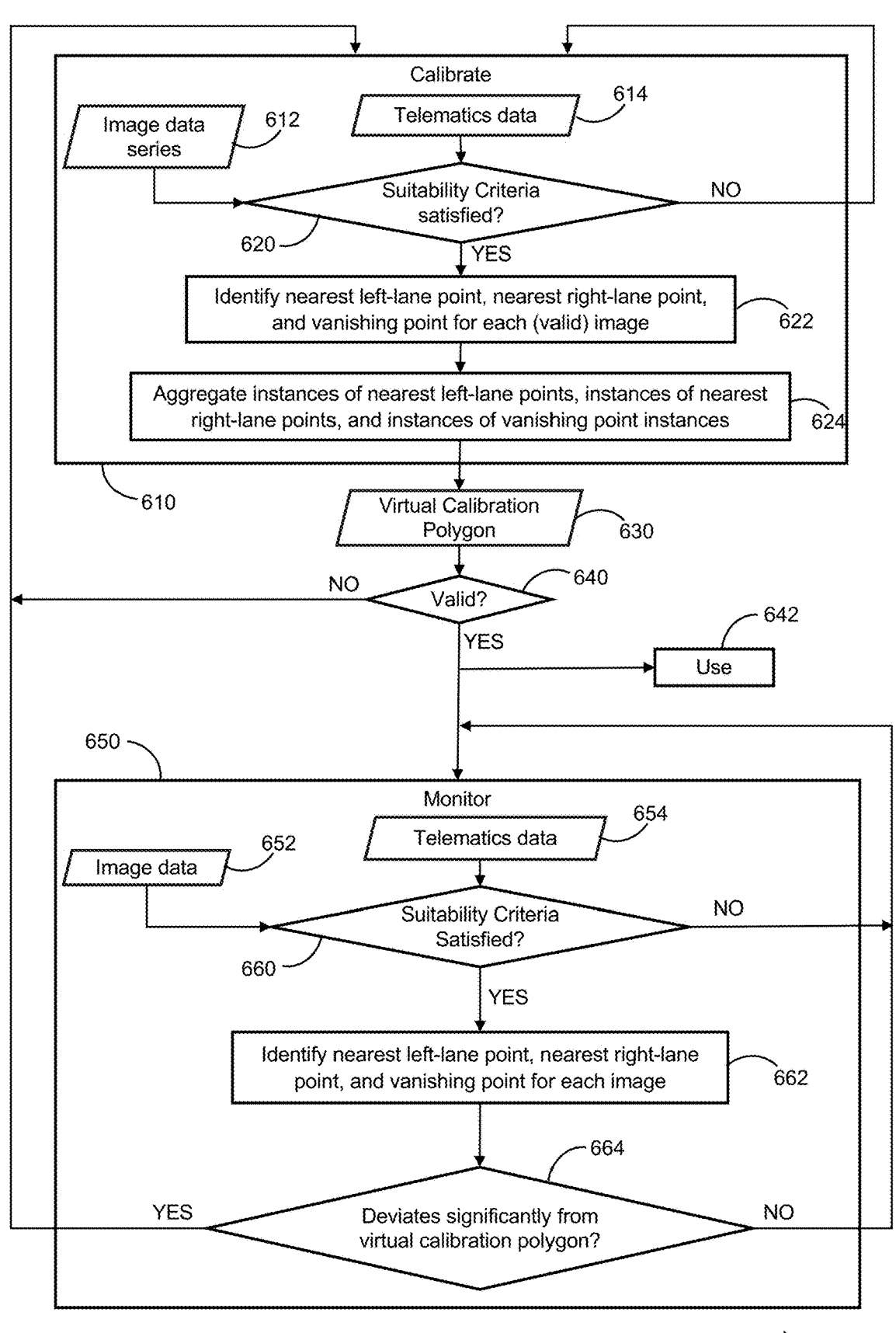
FIG. 6 is a flowchart diagram which illustrates a method for calibration of a road-facing image capture device, in accordance with at least one exemplary implementation.

FIG. 6 is a flowchart diagram which illustrates an exemplary method 600 for calibrating an image capture device at a vehicle, and monitoring the calibration of the image device. Method 600 as illustrated includes a calibration process 610, which includes acts 620, 622, and 624, and method 600 as shown includes a monitoring process 650, which includes acts 660, 662, and 664. Method 600 as shown also includes acts 640 and 642 outside of the calibration process 610 and monitoring process 650. One skilled in the art will appreciate that additional acts could be added, acts could be removed, or acts could be reordered as appropriate for a given application. With reference to the examples illustrated in FIGS. 1A, 1B, 2A, 2B, 2C, 2D, 3, 4, and 5 acts can be performed by or with respect to appropriate components of the discussed systems or devices. For example, at least some acts of method 600 can be performed at an image capture device such as any of image capture devices 108, 108A, 108B, 108C, 108D-1, 108D-2, 502, or 506 discussed with respective reference to FIG. 1A, 1B, 2A, 2B, 2C, 2D, or 5. Further, appropriate acts can be performed by a peripheral device (vehicle device or telematics device) such as any of peripheral device 220 or peripheral device 220D discussed with respective reference to FIGS. 2B and 2D.

In some implementations, the entirety of method 600 (or in some cases most of method 600 excluding act 642) are performed locally to a vehicle. In such implementations, each act of method 600 can be performed by appropriate components of the image capture device at the vehicle, or can be performed by and image capture device at the vehicle or a peripheral device at the vehicle.

In some implementations, at least some acts of method 600 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor (such as any of processor 106a, 104a, or 118a in FIGS. 1A and 1B, any of processors 206 in FIG. 2A, 2B, 2C, or 2D, processor 312 in FIG. 3, or processor 412 in FIG. 4). Further, at least one non-transitory processor-readable storage medium (such as non-transitory processor-readable storage mediums 104b, 106b, 118b, 212, 214, 314, or 414 as non-limiting examples) can store processor-executable instructions, which when executed by a respective at least one processor cause the corresponding system or device to perform a given act of any of the methods discussed herein.

Method 600 is discussed below with reference to a specific example shown in FIGS. 7A and 7B, for ease of understanding. However, one skilled in the art will appreciate that method 600 can be applied to any appropriate example, and that FIGS. 7A and 7B are merely exemplary.

Figure 7A:
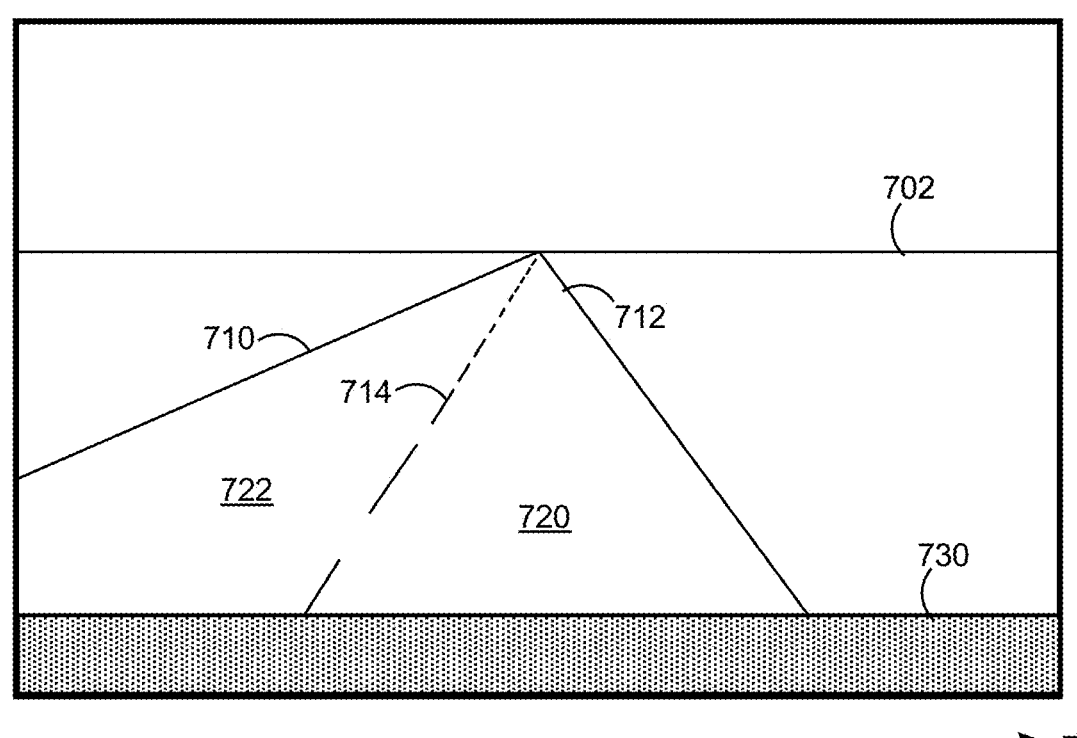
FIGS. 7A, 7B, 8, and 9 illustrate exemplary images from a road-facing perspective of a vehicle.
Figure 7B:
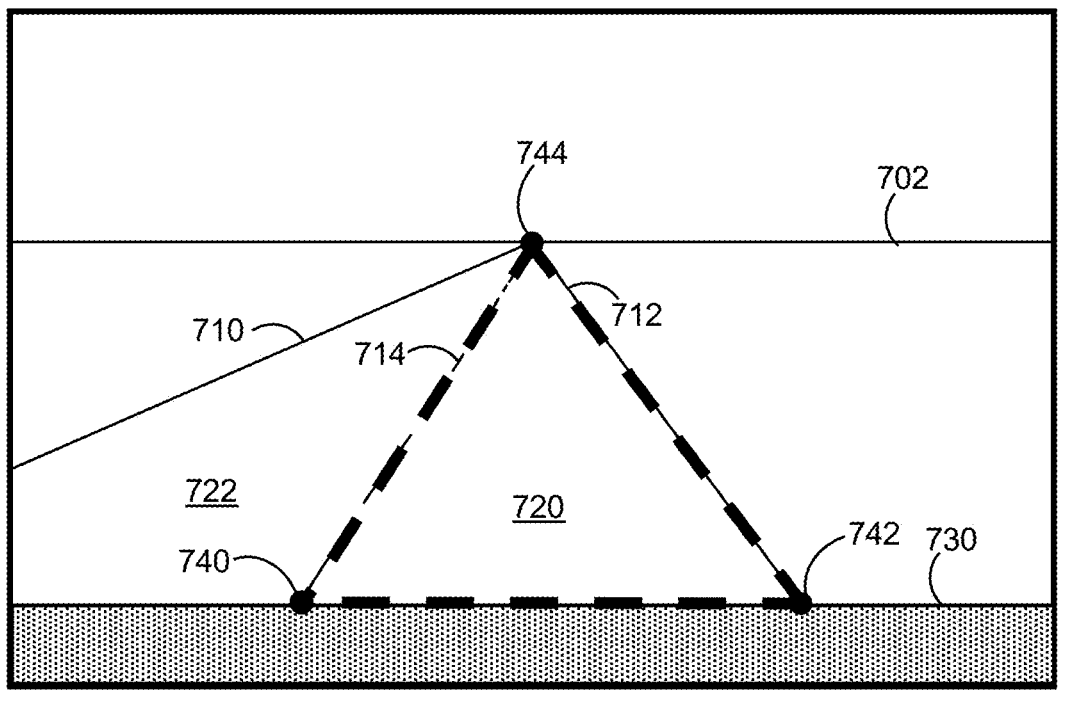

FIG. 7A illustrates image 700. Image 700 represents an image captured by a road-facing image capture device positioned at a vehicle, from a perspective of the vehicle. In the particular example of FIG. 7A, the image 700 represents an image captured from a forward-facing camera (dash-cam), though the discussion of FIG. 7A could also apply to a rear-facing camera. Image 700 includes a representation of a roadway on which vehicles can travel, delineated by boundaries 712 and 710, and extending to horizon 702. The roadway in image 700 includes a first lane of travel 720 (in which the vehicle is positioned where image 700 is captured from), and a second lane of travel 722, divided by lane markers 714 (a dashed line in the example, but other lane markers could also be used, such as a solid line or lane marker fixtures). Image 700 in the example also includes a partial representation of a hood 730 of the vehicle from which image 700 is captured. In some examples, no such hood may be visible. In other examples, other parts of the vehicle, such as windshield posts of the vehicle, may be visible in captured image data.

Image 700 shows a two-lane roadway, but image data could be captured of roadways having any appropriate number of lanes. Further, image data captured by an image captured device can include representations of any pertinent features or objects; what is shown in FIG. 7A is a non-limiting example.

In some implementations, image 700 as shown is raw data captured by an image capture device. In other implementations, image 700 as shown has been processed and/or "cleaned up". For example, image 700 as shown in FIG. 7A can be a cropped version of raw image data (to remove edge data and/or produce image 700 having a certain aspect ratio. As another example, at least one distortion (or anti-distortion) transformation can be applied to raw image data, for example to compensate for characteristics of raw image data such as lens perspective or distortion.

Returning to method 600, an image data series 612 is accessed. Image 700 in FIG. 7A is an example of an image in such an image data series. In some implementations, the scope of method 600 includes capturing the input image data by an image capture device (such as any of those discussed earlier). In other implementations, the scope of method 600 includes accessing a previously stored image data series. For example, image data can be captured by an image capture device and stored at a non-transitory processor-readable storage medium (such as non-transitory processor-readable storage mediums 212 or 214). In such implementations, the image data series 612 can be retrieved from storage. In other implementations, the image data series 612 can be provided by another device. For example, image data series 612 can be received by a peripheral device (such as peripheral device 220 or 220D) from an image capture device (such as image capture device 108B, 108D-1, or 108D-2).

In some implementations, image data series 612 is a stream of image data as captured (e.g. video data including every captured frame). In other implementations, image data series 612 comprises a series of sampled image data. That is, a series of temporally separate images can be sampled from a captured image stream to provide a limited number of images which cover a broader period of time.

At least one processor of the system or device which performs method 600 can optionally preprocess the accessed image data series 612 as appropriate. For example, the image data series 612 can be cropped to a defined resolution, or image correction can be applied such as distortion to compensate for skewing in the image due to properties of the image capture device. As examples, radial distortion and/or tangential distortion of the image data can be compensated for. In some implementations, the accessed image data is already pre-processed to be of a desired resolution and/or to have distortion corrected, prior to access and utilization in method 600. In some implementations, the processor can perform the sampling described above.

Further in method 600, telematics data 614 is accessed. The telematics data can include any appropriate data. As examples, the telematics data could include any of location data, speed data, acceleration data, movement data for the vehicle, or any other appropriate data. In some implementations, the scope of method 600 includes capturing the telematics data, for example by a telematics device (such as peripheral devices 220 or 220D), or by appropriate sensors in an image capture device (such as any of those discussed earlier). In some implementations, "telematics data" can be determined or inferred from image data (e.g. movement or speed could be inferred based on a rate of change of features in image data). In some implementations, the scope of method 600 includes accessing previously stored telematics data. For example, telematics data can be captured and stored at a non-transitory processor-readable storage medium (such as non-transitory processor-readable storage mediums 212 or 214). In such implementations, the telematics data 614 can be retrieved from storage. In other implementations, the telematics data 614 can be provided by another device. For example, telematics data 614 can be received by an image capture device (such as any of those discussed earlier) from telematics device (such as peripheral devices 220 or 220D).

Image data series 612 and telematics 614 generally represent a common period of time. In this way, telematics data 614 is indicative of an environment or movement of the vehicle for a period of time when the image data series 612 is captured. At 620, at least one processor compares the telematics data 614 and/or the image data 612 to suitability criteria.

In an exemplary implementation, the telematics data includes location data indicative of a trajectory of the vehicle for the common period of time, and the suitability criteria includes a criteria for the vehicle trajectory being a straight line. In this way, the processor determines whether the vehicle is travelling on a straight road. Notably, this is not a strict requirement, and curved trajectories can still be handled herein, as discussed later with reference to FIGS. 23A, 23B, and 23C.

In another exemplary implementation, the telematics data includes location and/or elevation data indicative of a change in elevation of the vehicle over time. The suitability criteria in this implementation includes criteria for road flatness, where the elevation data indicates that elevation trajectory of the vehicle is linear (i.e. non fluctuating).

In yet another exemplary implementation, the telematics data includes inertial data indicative of vertical movement of the vehicle. The suitability criteria in this implementation comprises criteria for road flatness, where the inertial data is indicative of vertical movement of the vehicle being linear.

In yet another exemplary implementation, the telematics data includes data indicative of a speed of the vehicle (e.g. speed data itself, or data from which can be derived, such as location data over time and/or acceleration data). In this exemplary implementation, the suitability criteria includes criteria for movement speed of the vehicle to exceed a speed threshold. In this way, the at least one processor determines whether the vehicle is moving on a roadway suited for the remaining acts of calibration process 610 discussed later (e.g., the vehicle is travelling down a road, and not in a parking lot).

In yet another example, the telematics data can include location data, and the suitability criteria includes acceptable location classifications (e.g., the vehicle must be located on a paved and straight road).

In yet another example, the suitability criteria can include image suitability criteria. As an example, the suitability criteria may require that lane marking must be clearly visible in the image data.

The suitability criteria are not necessarily limited to a single criteria (though it can be in some implementations. Any of the above examples could be combined, such that at least one (or all) of a plurality of suitability criteria are analyzed.

If at 620 the suitability criteria are not satisfied, the calibration process is restarted, with a new image data series and new telematics data. That is, the telematics data (or the image data itself) is used to determine whether the road on which the vehicle travels (and image data representing this road) is suitable for use in calibrating the image capture device. Where the road and image data series 612 are not suitable, this data is not utilized in calibration and instead a new calibration is started. In some implementations, image data 612 is not accessed unless telematics data 614 satisfies the suitability criteria (e.g. the telematics data 614 is first checked for suitability).

If at 620 the suitability criteria are satisfied, method 600 proceeds to 622 where calibration is performed based on the image data series 612. At 622, the at least one processor identifies a nearest left-lane point, a nearest right-lane point, and a vanishing point for each image in the image data series. An example is discussed in detail below with reference to FIG. 7B.

FIG. 7B shows image 700, as described with reference to FIG. 7A. FIG. 7B includes additional annotations showing features determined in the calibration process. In particular, the at least one processor applies a lane detection model to the image to identify left and right boundaries of a lane of travel of the vehicle. In the example of image 700, the at least one processor identifies a left lane boundary by lane markers 714, and identifies a right lane boundary by road boundary 712, which represent boundaries of lane 720 in which the vehicle travels.

Lane boundaries can be determined by the at least one processor for example by applying a feature detection model to the image. In an example, the at least one processor can detect lanes in the form of a segmentation mask, where pixels forming lane markings are labeled as lane marking pixels, while other pixels are labelled as background pixels.

Determining the first boundary and the second boundary can entail determining a mathematical representation for each boundary, for example in accordance with Equation (1) below.

$$y = mx + b \tag{1}$$

Equation (1) is a mathematical representation of a straight line, where y is a vertical value, m is slope of the line, x is a horizontal value, and b is the y intercept (where the line crosses the vertical axis when x=0). Determining the a first lane boundary can entail determining a first slope $m_1$ and a first y intercept $b_1$ for the first lane boundary. Likewise, determining a second lane boundary can entail determining a second slope $m_2$ and a second y intercept $b_2$ for the second lane boundary. This can be performed for any appropriate number of lanes boundaries in the image. Equation (1) is merely exemplary, and alternative equations or mathematical representations for lines could be used instead.

In some scenarios, many lane markings for a plurality of lanes of travel may be visible in an image being analyzed, and many lane boundary equations can be determined for the image. In such a case, where an origin of the image is at the top-left of the image, lines having negative slope can be considered as being left of the vehicle which carries the image capture device, and lines having positive slope can be considered as being right of the vehicle which carries the image device, from the perspective of the image capture device. Further, from a midpoint of the image, the closest line having negative slope can be considered as a left boundary of a lane of travel of the vehicle carrying the image capture device (i.e. the left lane boundary), and the closest line having positive slope can be considered as a right boundary of a lane of travel of the vehicle carrying the image capture device. This left lane boundary and right lane boundary can be used as the basis for determining the nearest left-lane point, the nearest right lane point, and the vanishing point as discussed below. FIG. 7B illustrates a thick dashed line over lane boundary 712 representing the determined right lane boundary, and another thick dashed line over lane boundary 714 representing the determined left lane boundary.

In an example, the at least one processor determines a vanishing point for the image as a point where the left lane boundary and the right lane boundary intersect each other.

For example, with reference to Equation (1) above, the equation for the left lane boundary and the equation for the right lane boundary can be combined (e.g. one equation substituted into the other) to determine coordinates for the vanishing point. In the example of FIG. 7B, the vanishing point is labelled as 744.

In an example, the at least one processor determines the nearest left point for the image as a point where the left lane boundary intersects with the bottom of the image (the nearest point in the image on the left lane boundary), and determines the nearest right point for the image as a point where the right lane boundary intersects with the bottom of the image (the nearest point in the image on the right lane boundary). With reference to Equation (1), where the origin of the image is defined as the top-left corner, this is the point where y equals the height of the image. These points are not explicitly shown in FIG. 7B, as another implementation is shown as discussed below.

In another example, the at least one processor determines the nearest left point for the image as a visible point on the left lane boundary closest to the bottom of the image, and determines the nearest right point for the image as a visible point on the right lane boundary closest to the bottom of the image. For example, the object or feature detection model which detects the lane boundaries can output a coordinate for the closest point of the left lane boundary (as detected) and right lane boundary (as detected). In the example of FIG. 7B, the nearest left lane point is shown as 740, and the nearest right lane point is shown as 742.

In some implementations, equations for the left lane boundary and the right lane boundary are not explicitly determined. Instead, the nearest left lane point and nearest right lane point can be output as points detected for the left and right lane boundaries which are closest to a bottom of the image, and the vanishing points can be output as a point where the detected left lane boundary and the detected right lane boundary overlap.

As can be seen in FIG. 7B, the nearest left lane point 740, the nearest right lane point 742, and the vanishing point 744 form a polygon, and in particular a triangle. By including additional and/or different identified points from the image, other polygons could be formed.

Returning to method 600, act 622 is performed for the image data series, resulting a plurality of nearest left-lane points, a plurality of right-lane points, and a plurality of vanishing points: a respective nearest left-lane point, nearest right-lane point, and vanishing point for each image in the image data series. In some implementations, act 622 can also include performing a validity check on any determined points, and discarding invalid points. As one example, corresponding points across the image data series could be compared, and outlying points (points different from corresponding points by an amount exceed a validity threshold) can indicate a detection error (such as mis-detection of a lane boundary or detection of a different boundary). Such points, and/or all points determined from a particular image where such error originates, can be identified as invalid and discarded. As another example, a pre-trained plausibility detection model can be applied to the determined points, to discard any points deemed not plausible.

At 624 the at least one processor aggregates instances of nearest left-lane points, nearest right-lane points, and vanishing points across the image data series. That is, the at least one processor aggregates the plurality of nearest left-lane points to determine an aggregated nearest-left lane point, aggregates the plurality of nearest right-lane points to determine an aggregated nearest right-lane point, and aggregates the plurality of vanishing points to determine an aggregated vanishing point for the image data series. Aggregating points in this context refers to any appropriate means of combining point values together to arrive at a single value representing a plurality of points, such as weighted or unweighted averaging of points.

The aggregated nearest left-lane point, aggregated nearest right lane point, and aggregated vanishing point together can be referred to as a "calibration polygon", shown as 630 in FIG. 6. The calibration polygon (and any of the calibration polygons discussed herein) could also be called a "dynamic calibration polygon" in that it can be dynamically updated in the methods herein. The calibration polygon (and any of the calibration polygons discussed herein) could also be called a "virtual calibration polygon" in that is a virtual element determined as a calibration tool. In the example of FIG. 7B, the polygon is a triangle, but if more aggregated points are determined (or a different polygon definition method is used as in FIG. 23C), the polygon could be any appropriate shape. The calibration polygon 630 acts as a calibration target, which can be used in a variety of ways, as discussed in more detail later with reference to act 642.

At 640, the at least one processor applies a validity check to determine if the calibration polygon 630 is valid. If the calibration polygon is not valid, method 600 repeats the calibration process 610 with new image data to attempt to obtain a valid calibration polygon.

As one example, the at least one processor can apply a plausibility detection model to the calibration polygon. Such a plausibility detection model can be pre-trained on valid and invalid calibration data, to identify whether the calibration polygon 630 is plausible or not. A plausibility model can be further trained based on, for example, contextual data such as telematics data (e.g. location, speed, trajectory, acceleration data), map data, road type data, camera parameter data, or any other appropriate form of data. If the calibration polygon 630 is not plausible, then it is deemed not valid at 640.

If the calibration polygon 630 is valid at 640, the calibration polygon can be used at 642 for various purposes. Exemplary uses are discussed later. Further, method 600 proceeds to monitoring process 650.

For monitoring process 650, image data 652 and telematics data 654 are accessed. Accessing of image data 652 and telematics data 654 is similar to as discussed earlier with reference to image data series 612 and telematics data 614. Monitoring process 650 is performed after a successful calibration process 610, and is performed repeatedly, periodically, or continuously as a means of verifying that the calibration remains accurate. As such, image data 652 and telematics data 654 represent a common time (as each other), which is after the period of time represented by image data series 612 and telematics data 614. Further, image data 652 requires only a single sample image (though more images could be used, if desired).

At 660, the at least one processor compares the telematics data 654 and/or the image data 652 to suitability criteria. This comparison is similar to as described earlier with reference to 620, and not repeated for brevity. The telematics data 654 (or the image data 652 itself) can act as an indicator for whether the image data 652 will be suitable for the monitoring process 650. If the suitability criteria are not satisfied, the monitoring process 650 is restarted with new image data 652 and telematics data 654. In some implementations, image data 652 is not accessed unless telematics data 654 satisfies the suitability criteria (i.e. the telematics data 654 is first checked for suitability).

If the suitability criteria are satisfied at 660, the monitoring process continues to act 662. At 662, the at least one processor identifies a nearest left-lane point, nearest right-lane point, and vanishing point in each image of image data 652. Identification of the nearest left-lane point, nearest right lane point, and vanishing point is performed similarly to as discussed earlier with reference to act 622, and not repeated for brevity. If multiple images are included in the image data 652, the respective points can be aggregated similarly to as in act 624. The nearest left-lane point, nearest right-lane point, and vanishing point identified at 662 can be referred to as a "monitoring polygon", which is used to assess accuracy of the "calibration polygon" 630.

At 664, the at least one processor compares the monitoring polygon to the calibration polygon, and determines whether the monitoring polygon deviates significantly from the calibration polygon (deviates in excess of a deviation threshold).

In some exemplary implementations, the deviation threshold is at least one pixel displacement threshold. For example, each of the nearest left-lane point, the nearest right-lane point, and the vanishing point of the monitoring polygon can be respectively compared to the aggregated nearest left-lane point, the aggregated nearest right-lane point, and the aggregated vanishing point of the calibration polygon. In an example, if any one point of the monitoring polygon is a quantity of pixels away from a corresponding point of the calibration polygon which exceeds a pixel displacement threshold, the deviation threshold can be considered exceeded. In another example, if each point of the monitoring polygon is a quantity of pixels away from a corresponding point of the calibration polygon which exceeds a pixel displacement threshold, the deviation threshold can be considered exceeded. In yet another example, displacements between corresponding points of the monitoring polygon and the calibration polygon can be summed, averaged, or otherwise accumulated, and if the result exceeds the pixel displacement threshold, the deviation threshold can be considered exceeded.

In some exemplary implementations, the deviation threshold can comprise a geometric match threshold, such that certain geometric properties of the monitoring polygon be within a similarity threshold to geometric properties of the calibration polygon. As an example, the deviation threshold can comprise an area threshold, which defines an acceptable difference in area between the monitoring polygon and the calibration polygon. As another example, the deviation threshold can comprise boundary threshold, which defines an acceptable difference in cumulative side lengths between the monitoring polygon and the calibration polygon.

In some exemplary implementations, the deviation threshold is dynamic. For example, where a calibration confidence score is determined for the calibration polygon (as discussed later), the deviation threshold can be variable based on the calibration confidence score. In particular, a low calibration confidence score can cause the deviation threshold to also be low, such that calibration will be more likely to be performed again (in the hopes of obtaining a higher confidence calibration).

Where the monitoring polygon does not deviate from the calibration polygon in excess of the deviation threshold, the calibration polygon is maintained (calibration is determined to still be accurate), and the monitoring process 650 is performed again (to act as a recurring verification of calibration). Where the monitoring polygon deviates from the calibration polygon in excess of the deviation threshold, the calibration process 610 is performed again, to recalibrate the image capture device.

The monitoring process 650 is generally performed regularly to ensure accuracy of calibration. For example, monitoring process 650 could be performed continuously on a stream of image data from an image capture device, to ensure constant accuracy. This can be processor-intensive though, so in some implementations monitoring process 650 is performed periodically on sampled data, such as once per second, once per minute, once per 10 minutes, or any other appropriate interval.

Figure 8:
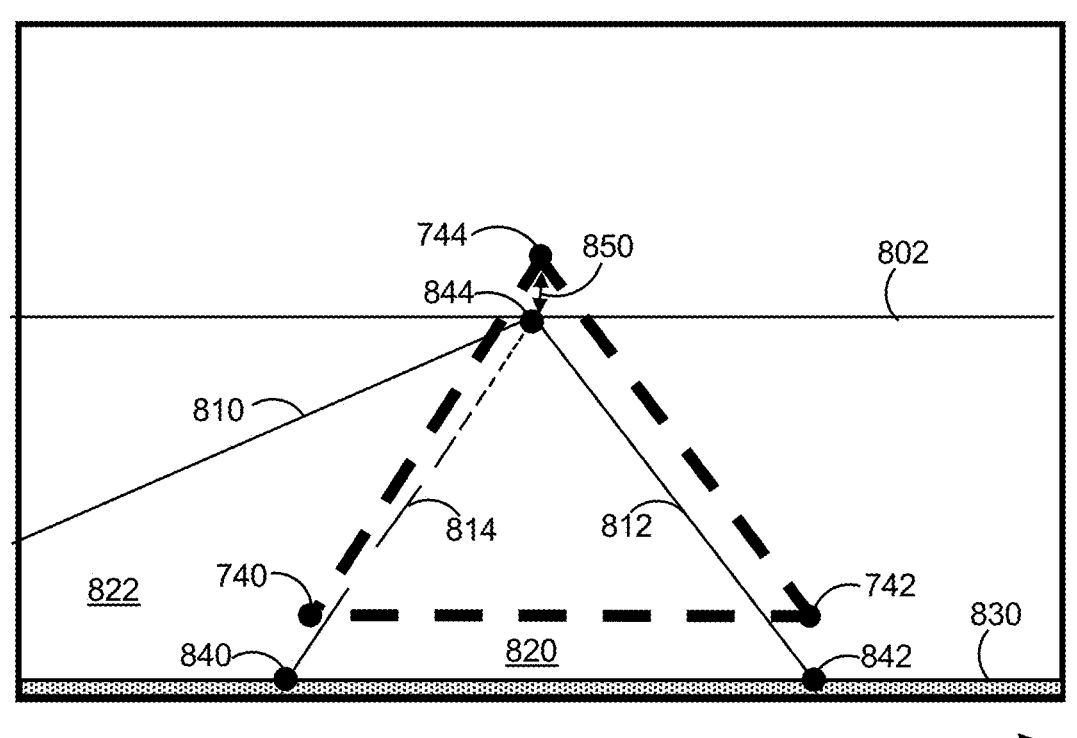
Figure 9:
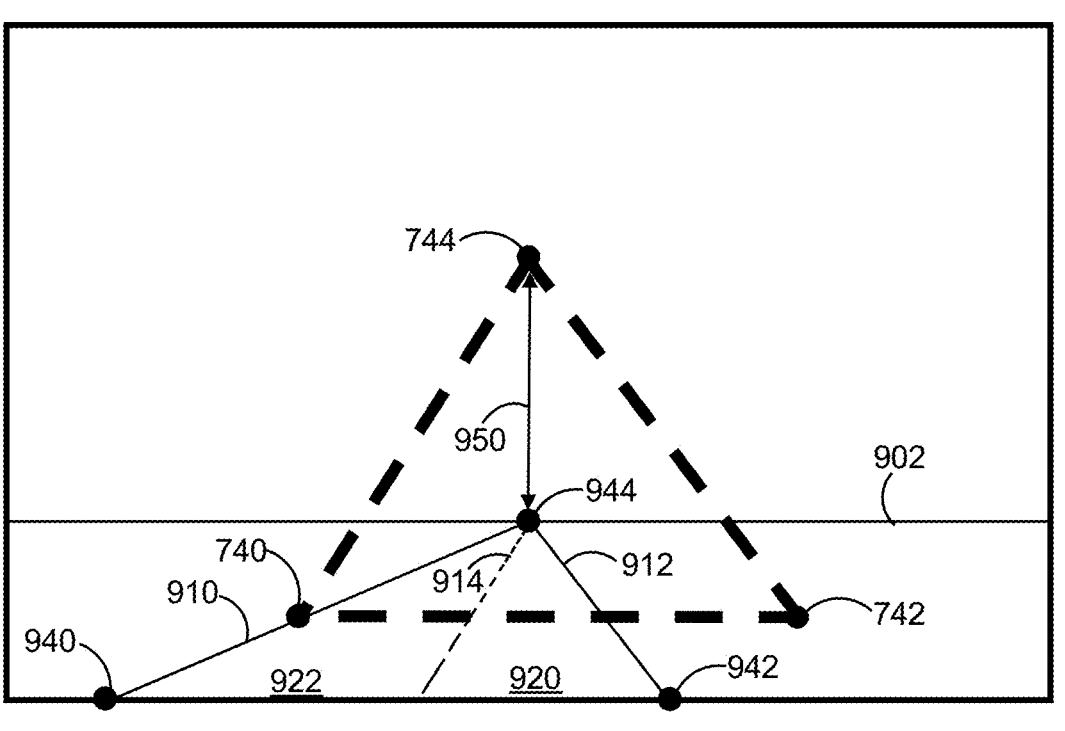

FIGS. 8 and 9 illustrate several example images where the monitoring process 650 can be performed.

FIG. 8 illustrates image 800. Image 800 represents an image captured by a road-facing image capture device positioned at a vehicle, from a perspective of the vehicle, similar to FIGS. 7A and 7B. Image 800 includes a representation of a roadway on which vehicles can travel, delineated by boundaries 812 and 810, and extending to horizon 802. The roadway in image 800 includes a first lane of travel 820 (in which the vehicle is positioned where image 800 is captured from), and a second lane of travel 822, divided by lane markers 814 (a dashed line in the example, but other lane markers could also be used, such as a solid line or lane marker fixtures). Image 800 in the example also includes a partial representation of a hood 830 of the vehicle from which image 800 is captured.

Image 800 shows a calibration polygon defined by points 740, 742, and 744, determined as shown in FIG. 7B. FIG. 8 also shows a nearest left-lane point 840, and nearest right-lane point 842, and a vanishing point 844 for image 800 (determined as in act 662 of method 600). Together, nearest left-lane point 840, and nearest right-lane point 842, and vanishing point 844 are a monitoring polygon. As shown in FIG. 8, vanishing point 844 of the monitoring polygon is different from vanishing point 744 of the calibration polygon by an amount 850. Similar distances between nearest left-lane point 840 and nearest left-lane point 740, and nearest right-lane point 842 and nearest right-lane point 742 are not shown in order to reduce clutter. In this hypothetical example, the amount does not exceed a deviation threshold at 664, so the calibration process 610 is not performed again (the calibration polygon is maintained).

FIG. 9 illustrates image 900. Image 900 represents an image captured by a road-facing image capture device positioned at a vehicle, from a perspective of the vehicle, similar to FIGS. 7A, 7B, and 8. Image 900 includes a representation of a roadway on which vehicles can travel, delineated by boundaries 912 and 910, and extending to horizon 902. The roadway in image 900 includes a first lane of travel 920 (in which the vehicle is positioned where image 900 is captured from), and a second lane of travel 922, divided by lane markers 914 (a dashed line in the example, but other lane markers could also be used, such as a solid line or lane marker fixtures).

Image 900 shows a calibration polygon defined by points 740, 742, and 744, determined as shown in FIG. 7B. FIG. 9 also shows a nearest left-lane point 940, nearest right-lane point 942, and a vanishing point 944 for image 900 (determined as in act 662 of method 600). Together, nearest left-lane point 940, and nearest right-lane point 942, and vanishing point 944 are a monitoring polygon. As shown in FIG. 9, vanishing point 944 of the monitoring polygon is different from vanishing point 744 of the calibration polygon by an amount 950. Similar distances between nearest left-lane point 940 and nearest left-lane point 740, and nearest right-lane point 942 and nearest right-lane point 742 are not shown in order to reduce clutter. In this hypothetical example, distance 950 exceeds a deviation threshold at 664, so the calibration process 610 is performed again (the calibration polygon generated anew).

Figure 10:
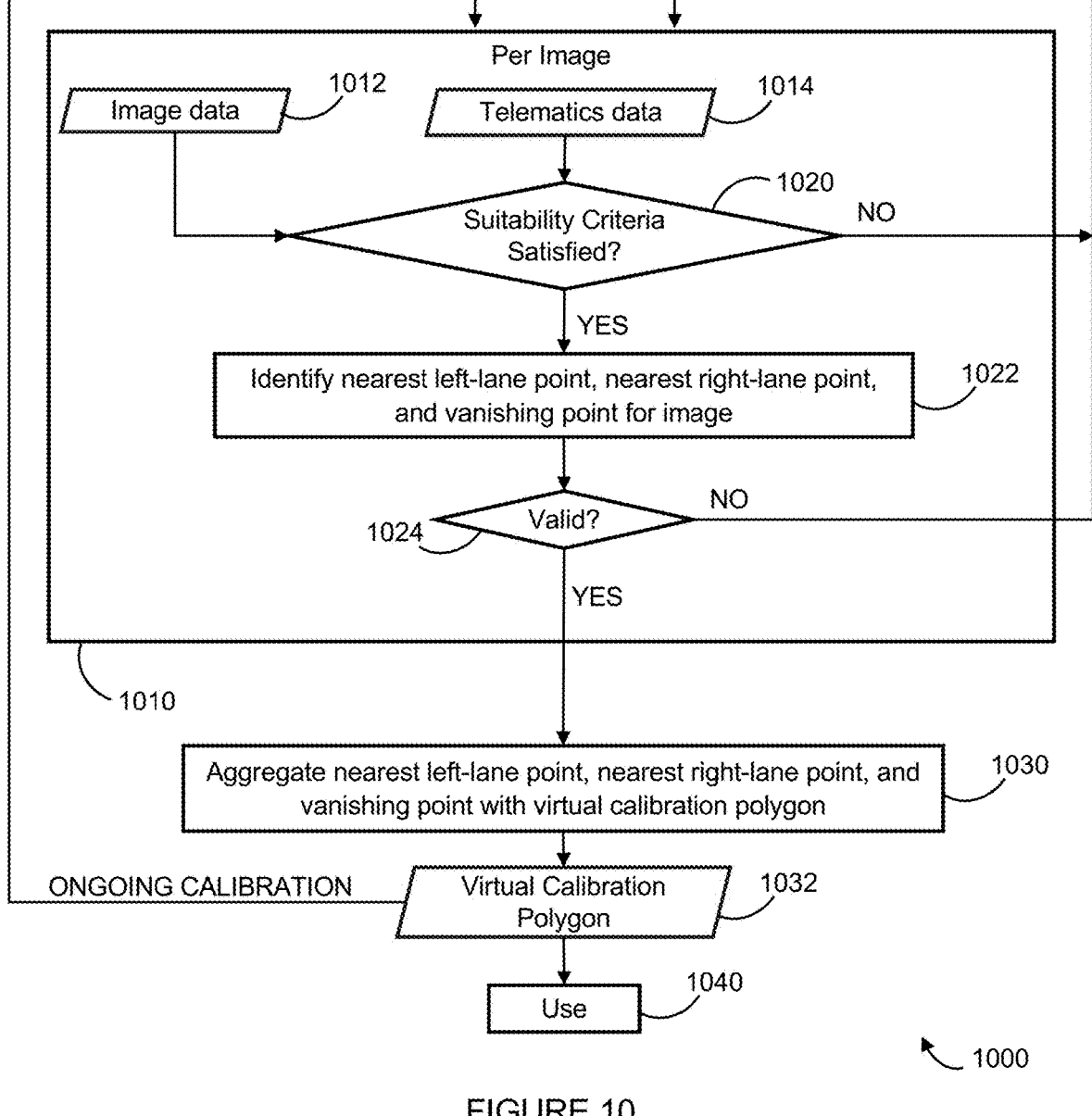
FIG. 10 is a flowchart diagram which illustrates another method for calibration of a road-facing image capture device, in accordance with at least one exemplary implementation.

FIG. 10 is a flowchart diagram which illustrates an exemplary method 1000 for calibrating an image capture device at a vehicle. Method 1000 as illustrated includes a per image calibration process 1010, which includes acts 1020, 1022, and 1024. Method 1000 as shown also includes acts 1030 and 1040 outside of the per image process 1010. One skilled in the art will appreciate that additional acts could be added, acts could be removed, or acts could be reordered as appropriate for a given application. With reference to the examples illustrated in FIGS. 1A, 1B, 2A, 2B, 2C, 2D, 3, 4, and 5 acts can be performed by or with respect to appropriate components of the discussed systems or devices. For example, at least some acts of method 1000 can be performed at an image capture device such as any of image capture devices 108, 108A, 108B, 108C, 108D-1, 108D-2, 502, or 506 discussed with respective reference to FIG. 1A, 1B, 2A, 2B, 2C, 2D, or 5. Further, appropriate acts can be performed by a peripheral device (vehicle device or telematics device) such as any of peripheral device 220 or peripheral device 220D discussed with respective reference to FIGS. 2B and 2D.

In some implementations, the entirety of method 1000 (or in some cases most of method 1000 excluding act 1040) are performed locally to a vehicle. In such implementations, each act of method 1000 can be performed by appropriate components of the image capture device at the vehicle, or can be performed by an image capture device at the vehicle or a peripheral device at the vehicle.

In some implementations, at least some acts of method 1000 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor (such as any of processor 106a, 104a, or 118a in FIGS. 1A and 1B, any of processors 206 in FIG. 2A, 2B, 2C, or 2D, processor 312 in FIG. 3, or processor 412 in FIG. 4). Further, at least one non-transitory processor-readable storage medium (such as non-transitory processor-readable storage mediums 104b, 106b, 118b, 212, 214, 314, or 414 as non-limiting examples) can store processor-executable instructions, which when executed by a respective at least one processor cause the corresponding system or device to perform a given act of any of the methods discussed herein.

Method 1000 in FIG. 10 is similar to method 600 in FIG. 6 in at least some respects. Description of method 600 is generally applicable to method 1000 unless context requires otherwise.

For the per-image process 1010, image data 1012 and telematics data 1014 are accessed. Accessing of image data 1012 and telematics data 1014 is similar to as discussed earlier with reference to image data series 612 and telematics data 614 in method 600, and not repeated for brevity. Image data 1012 and telematics data 1014 represent a common time.

At 1020, the at least one processor compares the telematics data 1014 and/or the image data 1012 to suitability criteria. This comparison is similar to as described earlier with reference to 620 in method 600, and not repeated for brevity. The telematics data 1014 (or the image data 1012 itself) acts as an indicator for whether the image data 1012 will be suitable for use in calibration. If the suitability criteria are not satisfied, the process 1010 is restarted with new image data 1012 and telematics data 1014. In some implementations, image data 1012 is not accessed unless telematics data 1014 satisfies the suitability criteria (i.e. the telematics data 1014 is first checked for suitability).

If the suitability criteria are satisfied at 1020, the process 1010 continues to act 1022. At 1022, the at least one processor identifies a nearest left-lane point, nearest right-lane point, and vanishing point image data 1012. Identification of the nearest left-lane point, nearest right lane point, and vanishing point is performed similarly to as discussed earlier with reference to act 622 in method 600, and not repeated for brevity.

In some implementations, process 1010 includes act 1024. At 1024, the at least one processor performs a validity check on the nearest left-lane point, the nearest right-lane point, and the vanishing point determined at 1022. If the points are invalid (in some implementations if any one point is invalid, in other implementations if a combination of points or all points are invalid), the determined points are not used in calibration, and process 1010 is repeated for new image data.

The validity check at 1024 can comprise any appropriate technique. As one example, an identified point could be compared to a previously determined point (or a previously determined calibration polygon at 1030 discussed later), and outlying points (points different from a comparison point by an amount exceed a validity threshold) can indicate a detection error (such as mis-detection of a lane boundary or detection of a different boundary). Such points, and/or all points determined from a particular image where such error originates, can be identified as invalid and discarded. As another example, a pre-trained plausibility detection model can be applied to the determined points, to discard any points deemed not plausible.

If the points (or some of the points) identified at 1022 are valid at 1024, method 1000 proceeds to 1030. At 1030, the points identified at 1020 are aggregated with a calibration polygon. The calibration polygon comprises an aggregated nearest left-lane point, an aggregated nearest right-lane point, and an aggregated vanishing point, determined from previous iterations of the process 1010. The newly identified points at 1020 are incorporated into the calibration polygon at 1030, to produce an updated calibration polygon 1032. That is, the at least one processor aggregates the newly identified nearest left-lane point from 1020 with the aggregated nearest left-lane points, the newly identified nearest right-lane point with the aggregated nearest right-lane points, and the newly identified vanishing point with the aggregated vanishing points. Aggregating points in this context refers to any appropriate means of combining point values together to arrive at a single value representing a plurality of points, such as weighted or unweighted averaging of points.

After generating the updated calibration polygon 1032, process 1010 is repeated, to continuously update and refine the calibration polygon. In this sense, method 1000 represents an ongoing calibration method. On first iteration of method 1000 (initial calibration), there will not yet be any values for the calibration polygon, and so the first identified nearest left-lane point, nearest right-lane point, and vanishing point will define the first calibration polygon.

After many iterations of process 1010, select identified points can be discarded, such that the calibration polygon is an aggregation of optimally-relevant points identified at

1020 relatively recently. For example, select points can be points which exceed an age threshold, such that these old points can be dropped from the calibration polygon. Alternatively, select data points can be dropped when a data point limit is reached. For example, the calibration polygon may be based on only identified 250 or 1000 points. "Select" points can be selected to be dropped based on a variety of criteria, such as age (e.g. old points or the oldest points can be selected), or on data quality (e.g. points with a low confidence score can be selected). This will keep the calibration polygon more responsive and faster to update when there is change (e.g. the image capture device is bumped, reinstalled, or otherwise moved or reoriented), and more accurate by being based on the most relevant points. The exact number of data points on which the calibration polygon is based is merely exemplary, and could be adjusted as appropriate for a given application. Further, in some implementations the amount of data points on which the calibration polygon is based can be dynamically determined. For example, fewer or more data points could be utilized as dependent on environmental stability (e.g. as based on telematics data or image data). In cases where stability is low (e.g. many non-straight or rough roads), a larger amount of data points could be used as the basis for the calibration polygon, to suppress the impact of any particular moment of unstable data. Conversely, in cases where stability is low (e.g. straight and smooth roads), a smaller amount of data points could be used as the basis for the calibration polygon, to reduce computational burden of the calibration.

In some implementations, aggregation of points to obtain the calibration polygon can be weighted (e.g. a weighted average) to prioritize newer, more relevant data for the calibration.

At any point, the calibration polygon can be used at 1040 for a variety of purposes, as discussed later.

With reference to the exemplary scenario shown in FIG. 8, in the context of method 1000, consider the nearest left-lane point 740, the nearest right-lane point 742, and the vanishing point 744 to represent the calibration polygon. Further consider the nearest left lane-point 840, the nearest right-lane point 842, and the vanishing point 844 to represent newly identified points as identified at 1020. At 1030 in method 1000, the newly identified points 840, 842, and 844 will be aggregated with points 740, 742, and 744, resulting in an updated calibration polygon which lies somewhat between points 740, 742, and 744, and points 840, 842, and 844. After repeated images similar to image 800 (repeated execution of process 1010), the calibration polygon will eventually be calibrated to align with points 840, 842, and 844.

A similar discussion applies with reference to the exemplary scenario shown in FIG. 9 in the context of method 1000. Consider the nearest left-lane point 740, the nearest right-lane point 742, and the vanishing point 744 to represent the calibration polygon. Further consider the nearest left lane-point 940, the nearest right-lane point 942, and the vanishing point 944 to represent newly identified points as identified at 1020. At 1030 in method 1000, the newly identified points 940, 942, and 944 will be aggregated with points 740, 742, and 744, resulting in an updated calibration polygon which lies somewhat between points 740, 742, and 744, and points 940, 942, and 944. After repeated images similar to image 900 (repeated execution of process 1010), the calibration polygon will eventually be calibrated to align with points 940, 942, and 944.

Figure 11:
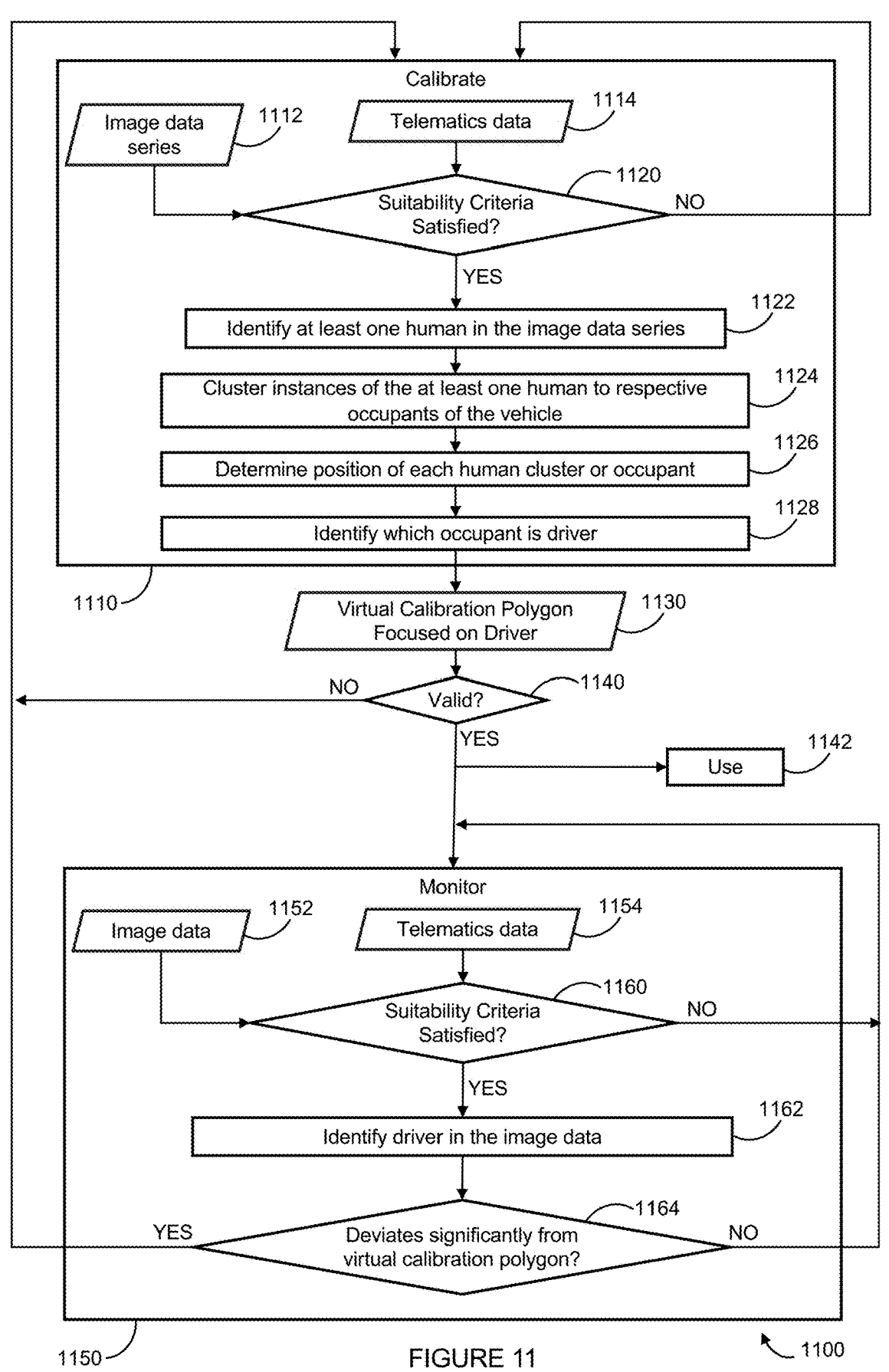
FIG. 11 is a flowchart diagram which illustrates a method for calibration of a cabin-facing image capture device, in accordance with at least one exemplary implementation.

FIG. 11 is a flowchart diagram which illustrates an exemplary method 1100 for calibrating an image capture device at a vehicle. Method 1100 as illustrated includes a calibration process 1110, which includes acts 1120, 1122, 1124, 1126, and 1128, and method 1100 as shown includes a monitoring process 1150, which includes acts 1160, 1162, 1164. Method 1100 as shown also includes acts 1140 and 1142 outside of the calibration process 1110 and monitoring process 1150. One skilled in the art will appreciate that additional acts could be added, acts could be removed, or acts could be reordered as appropriate for a given application. With reference to the examples illustrated in FIGS. 1A, 1B, 2A, 2B, 2C, 2D, 3, 4, and 5 acts can be performed by or with respect to appropriate components of the discussed systems or devices. For example, at least some acts of method 1100 can be performed at an image capture device such as any of image capture devices 108, 108A, 108B, 108C, 108D-1, 108D-2, 502, or 506 discussed with respective reference to FIG. 1A, 1B, 2A, 2B, 2C, 2D, or 5. Further, appropriate acts can be performed by a peripheral device (vehicle device or telematics device) such as any of peripheral device 220 or peripheral device 220D discussed with respective reference to FIGS. 2B and 2D.

In some implementations, the entirety of method 1100 (or in some cases most of method 1100 excluding act 1142) are performed locally to a vehicle. In such implementations, each act of method 1100 can be performed by appropriate components of the image capture device at the vehicle, or can be performed by an image capture device at the vehicle or a peripheral device at the vehicle.

In some implementations, at least some acts of method 1100 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor (such as any of processor 106a, 104a, or 118a in FIGS. 1A and 1B, any of processors 206 in FIG. 2A, 2B, 2C, or 2D, processor 312 in FIG. 3, or processor 412 in FIG. 4). Further, at least one non-transitory processor-readable storage medium (such as non-transitory processor-readable storage mediums 104b, 106b, 118b, 212, 214, 314, or 414 as non-limiting examples) can store processor-executable instructions, which when executed by a respective at least one processor cause the corresponding system or device to perform a given act of any of the methods discussed herein.

Method 1100 in FIG. 11 is similar to method 600 in FIG. 6 and method 1000 in FIG. 10 in at least some respects. Description of methods 600 and 1000 is generally applicable to method 1100 unless context requires otherwise.

Method 1100 is discussed below with reference to a specific example shown in FIGS. 12A and 12B, for ease of understanding. However, one skilled in the art will appreciate that method 600 can be applied to any appropriate example.

Figure 12A:
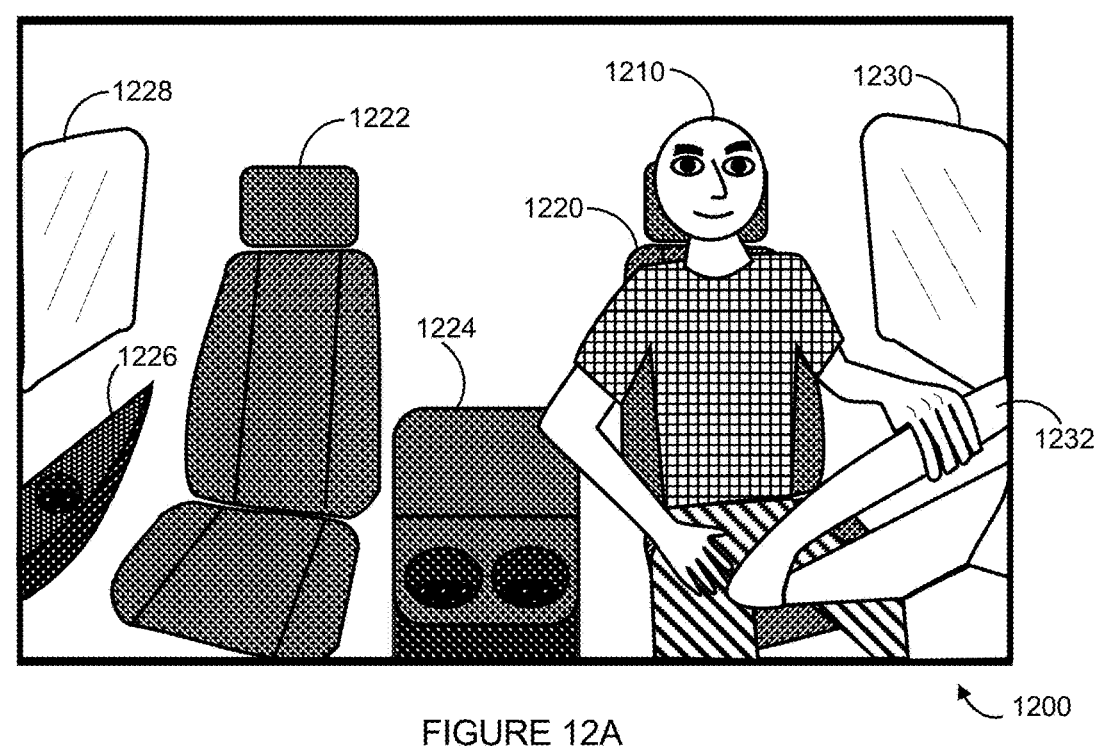
FIGS. 12A, 12B, 13, 14A, and 14B illustrate exemplary images from a cabin-facing perspective of a vehicle.

FIG. 12A illustrates image 1200. Image 1200 represents an image captured by a cabin-facing image capture device positioned at a vehicle. In the particular example of FIG. 12A, the image 1200 represents an image captured from a camera mounted at a front of the vehicle (e.g. to a windshield of the vehicle) facing inwards to the interior of the vehicle. Image 1200 includes a representation of a driver's seat 1220, with a driver 1210 sitting therein. Image 1200 also includes a representation of a passenger seat 1222, presently unoccupied. Image 1200 also includes representations of a center console 1224 between the driver's seat 1220 and the passenger seat 1222, side windows 1228 and 1230, passenger armrest 1226, and steering wheel 1232. While not illustrated to reduce clutter, image 1200 could also include representations of objects of features behind seats 1220 and 1222.

In image 1200, driver 1210 is operating the vehicle, with his left hand on steering wheel 1232 and his right hand on his lap. While image 1200 shows a left-hand drive vehicle (the driver's seat 1220, steering wheel 1232, and other vehicle operation controls are positioned at a left side of the vehicle), the discussion of FIG. 12A and method 1100 can apply to vehicles with any appropriate orientation, including right-hand drive vehicles or dual-side drive vehicles.

In some implementations, image 1200 as shown is raw data captured by an image capture device. In other implementations, image 1200 as shown has been processed and/or "cleaned up". For example, image 1200 as shown in FIG. 12A can be a cropped version of raw image data (to remove edge data and/or produce image 1200 having a certain aspect ratio. As another example, at least one distortion (or anti-distortion) transformation can be applied to raw image data, for example to compensate for characteristics of raw image data such as lens perspective or distortion.

Returning to method 1100, an image data series 1112 is accessed. Image 1200 in FIG. 12A is an example of an image in such an image data series. In some implementations, the scope of method 1100 includes capturing the input image data by an image capture device (such as any of those discussed earlier). In other implementations, the scope of method 1100 includes accessing a previously stored image data series. For example, image data can be captured by an image capture device and stored at a non-transitory processor-readable storage medium (such as non-transitory processor-readable storage mediums 212 or 214). In such implementations, the image data series 1112 can be retrieved from storage. In other implementations, the image data series 1112 can be provided by another device. For example, image data series 1112 can be received by a peripheral device (such as peripheral device 220 or 220D) from an image capture device (such as image capture device 108B, 108D-1, or 108D-2).

In some implementations, image data series 1112 is stream of image data as captured (e.g. video data including every captured frame). In other implementations, image data series 1112 comprises a series of sampled image data. That is, a series of temporally separate images can be sampled from a captured image stream to provide a limited number of images which cover a broader period of time.

At least one processor of the system or device which performs method 1100 can optionally preprocess the accessed image data series 1112 as appropriate. For example, the image data series 1112 can be cropped to a defined resolution, or image correction can be applied such as distortion to compensate for skewing in the image due to properties of the image capture device. As examples, radial distortion and/or tangential distortion of the image data can be compensated for. In some implementations, the accessed image data is already pre-processed to be of a desired resolution and/or to have distortion corrected, prior to access and utilization in method 1100. In some implementations, the processor can perform the sampling described above.

Further in method 1100, telematics data 1114 is accessed. The telematics data can include any appropriate data. Accessing of telematics data 1114 is similar to as discussed earlier with reference to telematics data 614 in method 600, and not repeated for brevity. Image data 1112 and telematics data 1114 represent a common period of time.

At 1120, the at least one processor compares the telematics data 1114 and/or the image data 1112 to suitability criteria. This comparison is similar to as described earlier with reference to 620 in method 600. The telematics data 1114 (and/or the image data 1112 itself) acts as an indicator for whether the image data series 1112 will be suitable for use in calibration. If the suitability criteria are not satisfied, the process 1110 is restarted with new image data 1112 and telematics data 1114. In some implementations, image data 1112 is not accessed unless telematics data 1114 satisfies the suitability criteria (i.e. the telematics data 1114 is first checked for suitability).

In method 1100, the suitability criteria can vary from that discussed with reference to FIGS. 6 and 10. Generally, the suitability criteria are used to determine whether the image data 1112 represents ordinary operation of the vehicle suitable for use in calibration.

In an exemplary implementation, the telematics data includes data indicative of a speed of the vehicle (e.g. speed data itself, or data from which can be derived, such as location data over time and/or acceleration data). In this exemplary implementation, the suitability criteria includes criteria for movement speed of the vehicle to exceed a speed threshold. In this way, the at least one processor determines whether the vehicle is moving (i.e. being driven).

In another exemplary implementation, the telematics data include acceleration data indicative of a movement direction of the vehicle for the common period of time, and the suitability criteria includes a criteria for the vehicle movement direction being forward. In this way, the processor determines whether the vehicle is moving forward (e.g. the driver is not reversing).

In yet another example, the telematics data can include location data, and the suitability criteria includes acceptable location classifications (e.g., the vehicle must be located on a paved road, not a parking lot).

In yet another example, the suitability criteria can include image suitability criteria. As an example, the suitability criteria may require that a driver pose detection model indicates that the driver is in a driving posture (and thus actually operating the vehicle), and not an alternative posture (e.g. a rest posture where the vehicle is not being operated).

If the suitability criteria are not satisfied at 1120, the process 1110 continues to act 1122. At 1122, the at least one processor identifies at least one human in the image data series. FIG. 12B shows an exemplary identification in this regard.

Figure 12B:
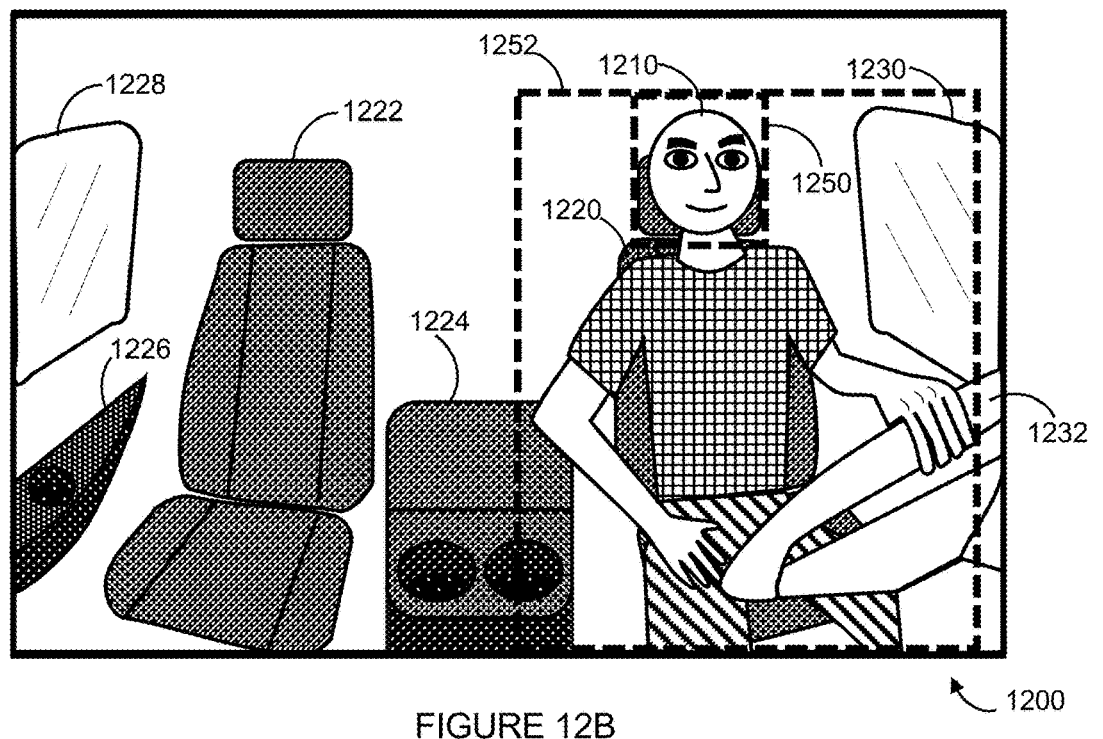

FIG. 12B shows image 1200, as described with reference to FIG. 12A. FIG. 12B also shows a bounding box 1250 around a face of driver 1210. In particular, the at least one processor applies an object or feature detection model (trained to detect at least human faces in this case) to identify and delineate a bounding box around each human face which appears in the image data series. Note that the present disclosure also applies to detection of humans in general, and is not so limited as to require detection of only faces. For example, the object or feature detection model can be a human body detection model which detect an entire human. While the example of FIG. 12B shows a bounding box 1250 for a single human in a single image, the detection model can be executed for each image in the image data series, resulting in a plurality of bounding boxes corresponding to driver 1210 over the time period of the image data series.

Figure 14A:
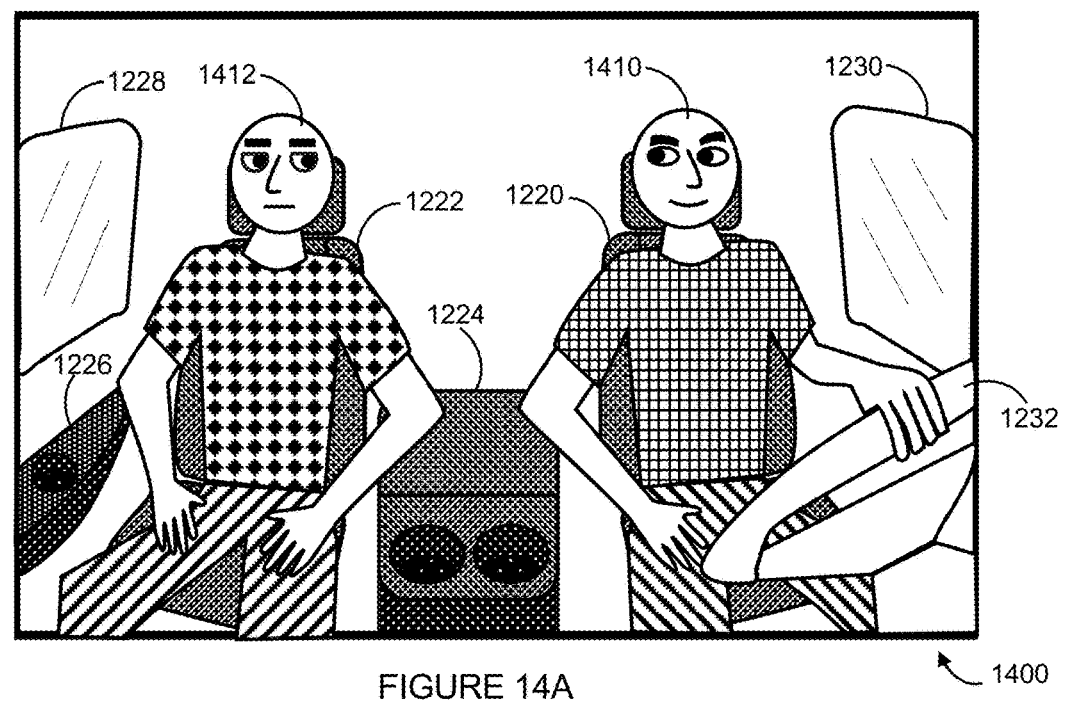
Figure 14B:
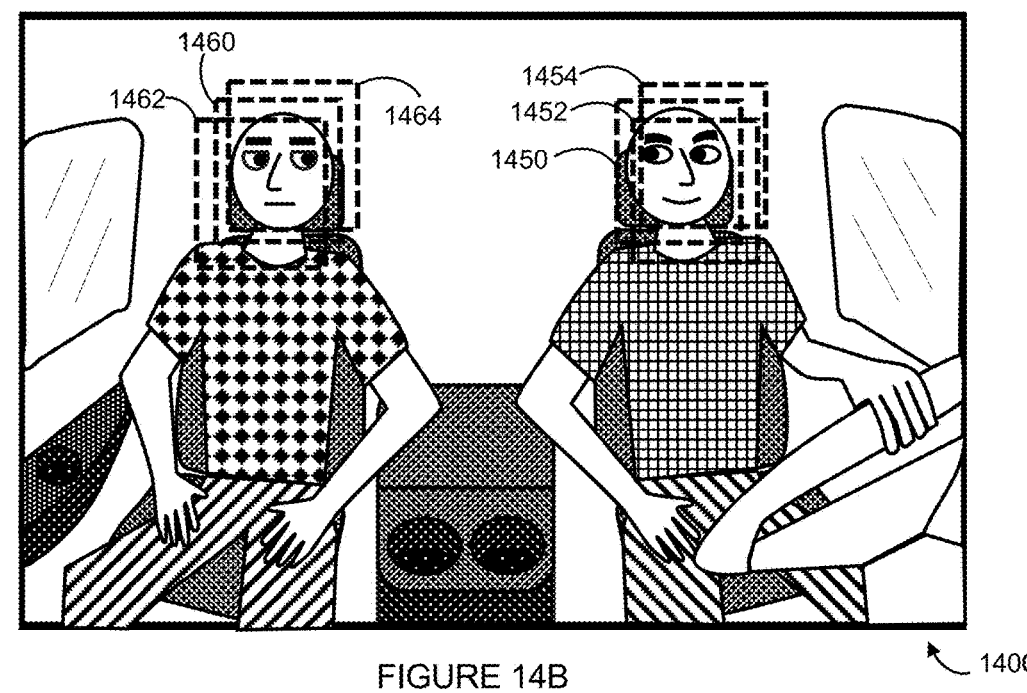

At 1124, the at least one processor clusters bounding boxes for each identified human across the image data series. In particular, a clustering algorithm or model can be executed which groups bounding boxes of similar positions between images. Each cluster of bounding boxes represent a particular occupant of the vehicle over the period of time. Clustering is described in more detail later with reference to FIGS. 14A and 14B. In the example of FIG. 12B, only driver 1210 is in the vehicle, and so there is only one human per image to cluster. In the example of FIGS. 14A and 14B, additional humans are shown.

At 1126, a position of each human and/or occupant is determined for a cluster of bounding boxes corresponding to the human. For example, each bounding box of a cluster of bounding boxes can be aggregated (e.g. averaged) to determine an aggregated bounding box for the human, having an aggregated position. This process can be simplified in some implementations by only aggregating the respective position of each bounding box of the cluster (instead of aggregating the bounding boxes in their entirety).

At 1128, the at least one processor identifies which occupant of the vehicle is the driver. In cases where there is only one occupant in the vehicle (such as shown in FIG. 12B), act 1128 can be skipped, or simplified as a step where the only occupant is identified as the driver. This determination is more complicated in cases where there is more than one driver, and is discussed in more detail later with reference to FIGS. 14A and 14B.

Calibration process 1110 produces a calibration polygon 1130 focused on the vehicle driver. In some implementations, the calibration polygon is a polygon (such as quadrilateral) which encompasses the face of the driver. For example, the calibration polygon can be the aggregated bounding box for the driver's face.

In other implementations, the calibration polygon can be an extended polygon which focuses on the entire visible body of the driver, not just the driver's face. For example, the at least one processor can execute an object or feature detection model which has the capability to detect the human body. When this model is executed on a region of the image where the face of the driver is positioned, a polygon can be identified which encompasses the body of the driver. Such a polygon is shown in FIG. 12B as 1252. Alternatively, in implementations where a human is detected in their entirety, 1252 can represent a bounding box detected for the driver 1210.

At 1140, the at least one processor applies a validity check to determine if the calibration polygon 1130 is valid. If the calibration polygon is not valid, method 1100 repeats the calibration process 1110 with new image data 1112 to attempt to obtain a valid calibration polygon.

As one example, the at least one processor can apply a plausibility detection model to the calibration polygon. Such a plausibility detection model can be pre-trained on valid and invalid calibration data, to identify whether the calibration polygon 1130 is plausible or not. A plausibility model can be further trained based on, for example, contextual data such as telematics data (e.g. location, speed, trajectory, acceleration data), map data, road type data, camera parameter data, or any other appropriate form of data. If the calibration polygon 1130 is not plausible, then it is deemed not valid at 1140.

If the calibration polygon 1130 is valid at 1140, the calibration polygon can be used at 1142 for various purposes. Exemplary uses are discussed later. Further, method 1100 proceeds to monitoring process 1150.

For monitoring process 1150, image data 1152 and telematics data 1154 are accessed. Accessing of image data 1152 and telematics data 1154 is similar to as discussed earlier with reference to image data series 1112 and telematics data 1114. Monitoring process 1150 is performed after a successful calibration process 1110, and is performed repeatedly, periodically, or continuously as a means of verifying that the calibration remains accurate. As such, image data 1152 and telematics data 1154 represent a common time (as each other), which is after the period of time represented by image data series 1112 and telematics data 1114. Further, image data 1152 requires only a single sample image (though more images could be used, if desired).

At 1160, the at least one processor compares the telematics data 1154 and/or the image data 1152 to suitability criteria. This comparison is similar to as described earlier with reference to 1120, and not repeated for brevity. The telematics data 1154 (or the image data 1152 itself) acts as an indicator for whether the image data 1152 will be suitable for the monitoring process 1150. If the suitability criteria are note satisfied, the monitoring process 1150 is restarted with new image data 1152 and telematics data 1154. In some implementations, image data 1152 is not accessed unless telematics data 1154 satisfies the suitability criteria (i.e. the telematics data 1154 is first checked for suitability).

If the suitability criteria are satisfied at 1160, the monitoring process continues to act 1162. At 1162, the at least one processor identifies a driver in the image data 1152. Identification of driver is performed similarly to as discussed earlier with reference to act 1122, and not repeated for brevity. If multiple images are included in the image data 1152, bounding boxes for respective driver representations in different images can be aggregated similarly to as in act 1124. A bounding box or polygon which encompasses the driver or driver's face can be referred to as a "monitoring polygon", which is used to assess accuracy of the "calibration polygon" 1130.

At 1164, the at least one processor compares the monitoring polygon to the calibration polygon, and determines whether the monitoring polygon deviates significantly from the calibration polygon (deviates in excess of a deviation threshold).

In some exemplary implementations, the deviation threshold is at least one pixel displacement threshold. For example, a position of the monitoring polygon can be respectively compared to a corresponding position of the calibration polygon. In an example, if any one point of the monitoring polygon is a quantity of pixels away from a corresponding point of the calibration polygon which exceeds a pixel displacement threshold, the deviation threshold can be considered exceeded. In another example, if each point of the monitoring polygon is a quantity of pixels away from a corresponding point of the calibration polygon which exceeds a pixel displacement threshold, the deviation threshold can be considered exceeded. In yet another example, displacements between corresponding points of the monitoring polygon and the calibration polygon can be summed, averaged, or otherwise accumulated, and if the result exceeds the pixel displacement threshold, the deviation threshold can be considered exceeded.

In some exemplary implementations, the deviation threshold can comprise a geometric match threshold, such that certain geometric properties of the monitoring polygon be within a similarity threshold to geometric properties of the calibration polygon. As an example, the deviation threshold can comprise an area threshold, which defines an acceptable difference in area between the monitoring polygon and the calibration polygon. As another example, the deviation threshold can comprise boundary threshold, which defines an acceptable difference in cumulative side lengths between the monitoring polygon and the calibration polygon.

Where the monitoring polygon does not deviate from the calibration polygon in excess of the deviation threshold, the calibration polygon is maintained (calibration is determined to still be accurate), and the monitoring process 1150 is performed again (to act as a recurring verification of calibration). Where the monitoring polygon deviates from the calibration polygon in excess of the deviation threshold, the calibration process 1110 is performed again, to recalibrate the image capture device.

The monitoring process 1150 is generally performed regularly to ensure accuracy of calibration. For example, monitoring process 1150 could be performed continuously on a stream of image data from an image capture device, to ensure constant accuracy. This can be processor-intensive though, so in some implementations monitoring process 1150 is performed periodically on sampled data, such as once per second, once per minute, once per 10 minutes, or any other appropriate interval.

Figure 13:
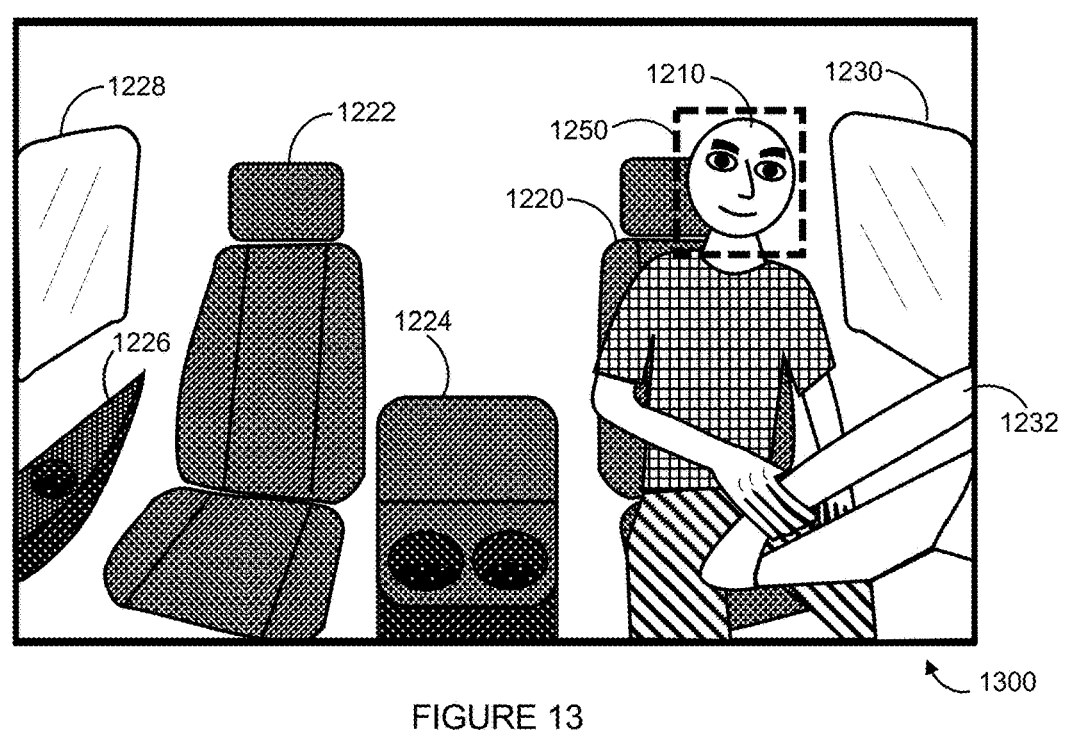

FIG. 13 illustrates an example image where the monitoring process 1150 can be performed.

FIG. 13 illustrates image 1300. Image 1300 represents an image captured by a cabin-facing image capture device positioned at a vehicle, similar to image 1200. In the particular example of FIG. 13, the image 1300 represents the same vehicle as shown in FIGS. 12A and 12B. Various features of the vehicle in image 1300 are the same as those in FIGS. 12A and 12B, and are labelled with the same reference numerals. Discussion of these features is not duplicated in the interests of brevity.

One difference between image 1200 in FIGS. 12A and 12B, and image 1300 in FIG. 13, is that image 1300 represents a different moment, where the driver 1210 is in a different position than in image 1200. In particular, in image 1300 the driver 1210 is leaning to their left, with their right hand on steering wheel 1232 and their left hand on their lap. As a result, the face of driver 1210 is in a different position in image 1300 compared to image 1200.

In the context of method 1100, and in particular monitoring process 1150, where image 1300 is accessed as image data 1152, bounding box 1350 in FIG. 13 is identified as the driver's face per act 1162. The position of bounding box 1350 is compared to a position of the calibration polygon determined based on an aggregation of bounding boxes such as bounding box 1250 in FIG. 12B. If the position of bounding box 1350 deviates from a position of the calibration polygon in excess of a deviation threshold, calibration processor 1110 is performed again. If the position of bounding box 1350 does not deviate from a position of the calibration polygon in excess of the deviation threshold, the calibration polygon is maintained, and monitoring processor 1150 is performed again (optionally after some amount of time).

The deviation threshold can be set to be as strict as appropriate for a given application, and thus whether bounding box 1350 is within the deviation threshold or not depends on how strictly the deviation threshold is set. The position of bounding box 1350 is notably different from bounding box 1250 in FIG. 12B (which contributes to an aggregated position of the calibration polygon), but is still well within the same quadrant of the image, for example. So in particularly strict implementations, the position of bounding box 1350 may trigger the calibration process 1110 to be performed again, whereas in more forgiving implementations, the position of bounding box 1350 may not trigger calibration process 1110.

FIG. 14 illustrates image 1400. Image 1400 represents an image captured by a cabin-facing image capture device positioned at a vehicle, similar to image 1200 and image 1300. In the particular example of FIG. 14, the image 1400 represents a similar or the same vehicle as shown in FIGS. 12A and 12B. Various features of the vehicle in image 1400 are the same or analogous as those in FIGS. 12A and 12B, and are labelled with the same reference numerals. Discussion of these features is not duplicated in the interests of brevity.

One difference between image 1200 in FIGS. 12A and 12B, and image 1400 in FIG. 14, is that image 1400 includes representation of multiple occupants. In particular, a driver 1410 occupies driver's seat 1220, and a passenger 1412 occupies passenger seat 1222. In this regard, FIG. 14A illustrates a scenario where multiple humans are detected and clustered in the context of method 1100.

Applying method 1100 to FIG. 14A, the image data series 1112 can comprise a series of images similar to image 1400. At 1122, the at least one processor identifies two human faces in each image in the image data series (the face of driver 1410 and the face of passenger 1312). As discussed previously, detection of humans is not limited only to detection of faces, and can include whole-body detection.

The faces as identified are shown in FIG. 14B. FIG. 14B shows image 1400, overlayed with a plurality of bounding boxes. Many of the feature labels are omitted from FIG. 14B to reduce clutter, but in general image 1400 in FIG. 14B includes the labelled features shown in FIG. 1400 in FIG. 14A. FIG. 14B shows bounding boxes 1450, 1452, and 1454 which correspond to instances where a face of driver 1410 is identified, for three different images (e.g. three images of image data series 1112). Bounding boxes 1460, 1462, and 1464 are shown which correspond to instances where a face of passenger 1412 is identified, for three different images (e.g. three images of image data series 1112).

At 1124, a clustering algorithm clusters bounding boxes together based on proximity, thus generating a cluster of bounding boxes for each human in the image data. In the example of FIGS. 14A and 14B, bounding boxes 1450, 1452, and 1454 are clustered together, and bounding boxes 1460, 1462, and 1464 are clustered together.

At 1126, a position of each human is identified, by aggregated bounding boxes in each cluster. In the example of FIGS. 14A and 14B, bounding boxes 1450, 1452, and 1454 are aggregated together as an aggregated bounding box representing a face of driver 1410. Further, bounding boxes 1460, 1462, and 1464 are aggregated together as an aggregated bounding box representing a face of passenger 1412.

At 1128, the at least one processor identifies which occupant is the driver of the vehicle. This can be performed in several different ways, discussed below. As mentioned earlier in the discussion of method 1100 and FIGS. 12A and 12B, where there is a single occupant in the vehicle this determine can be simplified. However, more specific and flexible determinations can be implemented, to account for cases where more than one occupant is in the vehicle.

In some implementations, geographic information can be used to identify which side of the vehicle the driver is on, based on regional "handedness" for vehicles (i.e. the vast majority of vehicles in a given region have the same side of the vehicle as the "driver's side"). For example, location data for the vehicle can indicate a country where the vehicle is positioned, and this location data can be cross-referenced with a database which indicates vehicle handedness for the region the vehicle is in. As another example, the devices and systems installed at the vehicle, and or a fleet management system can be pre-configured to include an indication of vehicle handedness (e.g. where a fleet operates in a single region, or only regions which have the same vehicle handedness). Regional handedness is not always applicable, however, as not every vehicle within a region necessarily conforms to handedness norms.

In some implementations, image analysis can be used to determine which occupant is the driver. As one example, an object detection model can be executed which identifies which side of the vehicle the steering wheel is positioned on. This is not applicable in all cases though, as some vehicles such as street sweepers have dual steering wheels (can be driven by a driver seated in either side). As another example, a pose detection model can be executed, which determines whether each occupant is in a "driving" posture, such as grasping the steering wheel, etc.

Figure 15:
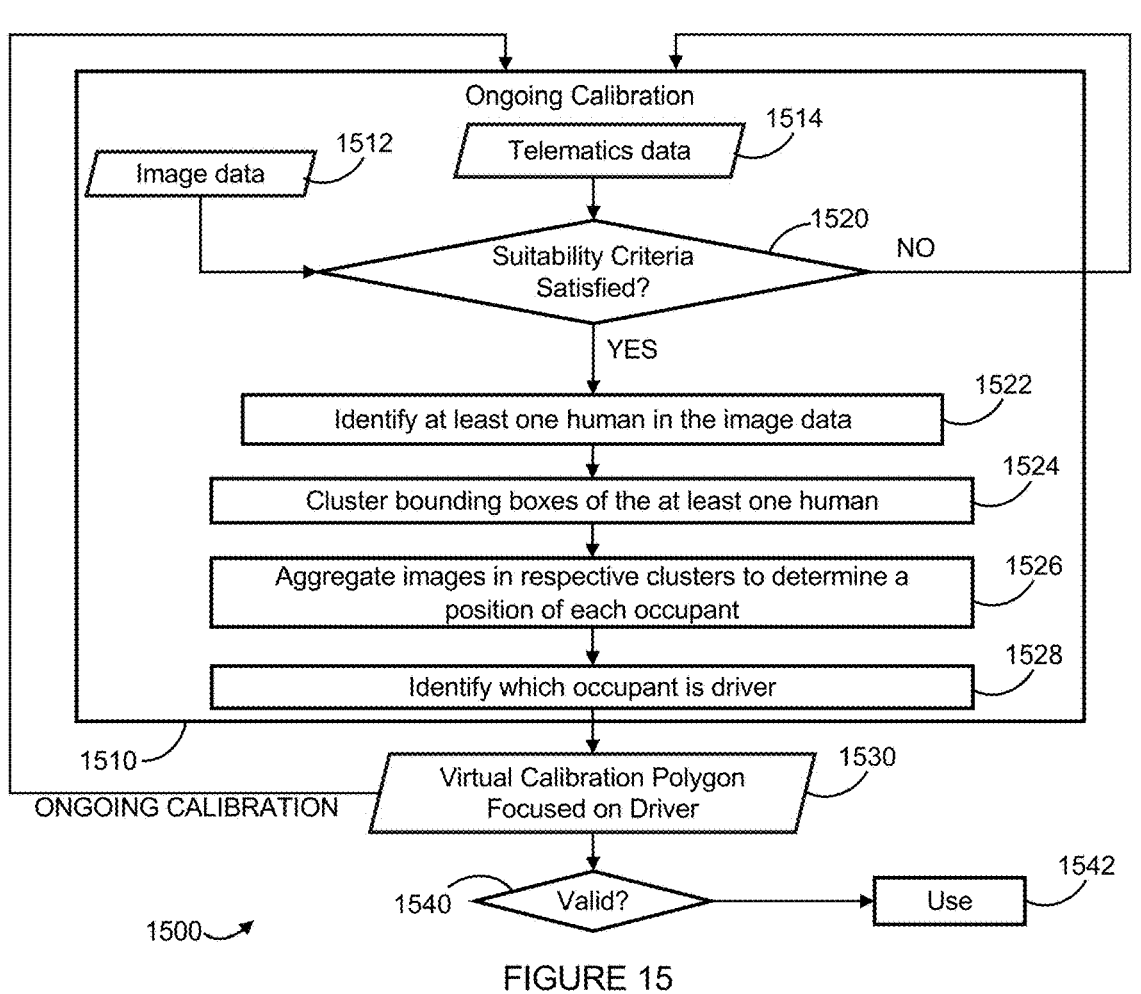
FIG. 15 is a flowchart diagram which illustrates a method for calibration of a cabin-facing image capture device, in accordance with at least one exemplary implementation.

FIG. 15 is a flowchart diagram which illustrates an exemplary method 1500 for calibrating an image capture device at a vehicle. Method 1500 as illustrated includes an ongoing calibration process 1510, which includes acts 1520, 1522, 1524, 1526, and 1528. Method 1500 as shown also includes acts 1540 and 1542. One skilled in the art will appreciate that additional acts could be added, acts could be removed, or acts could be reordered as appropriate for a given application. With reference to the examples illustrated in FIGS. 1A, 1B, 2A, 2B, 2C, 2D, 3, 4, and 5 acts can be performed by or with respect to appropriate components of the discussed systems or devices. For example, at least some acts of method 1500 can be performed at an image capture device such as any of image capture devices 108, 108A, 108B, 108C, 108D-1, 108D-2, 502, or 506 discussed with respective reference to FIG. 1A, 1B, 2A, 2B, 2C, 2D, or 5. Further, appropriate acts can be performed by a peripheral device (vehicle device or telematics device) such as any of peripheral device 220 or peripheral device 220D discussed with respective reference to FIGS. 2B and 2D.

In some implementations, the entirety of method 1500 (or in some cases most of method 1500 excluding act 1542) are performed locally to a vehicle. In such implementations, each act of method 1000 can be performed by appropriate components of the image capture device at the vehicle, or can be performed by an image capture device at the vehicle or a peripheral device at the vehicle.

In some implementations, at least some acts of method 1500 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor (such as any of processor 106a, 104a, or 118a in FIGS. 1A and 1B, any of processors 206 in FIG. 2A, 2B, 2C, or 2D, processor 312 in FIG. 3, or processor 412 in FIG. 4). Further, at least one non-transitory processor-readable storage medium (such as non-transitory processor-readable storage mediums 104b, 106b, 118b, 212, 214, 314, or 414 as non-limiting examples) can store processor-executable instructions, which when executed by a respective at least one processor cause the corresponding system or device to perform a given act of any of the methods discussed herein.

Method 1500 in FIG. 15 is similar to method 1100 in FIG. 11 in at least some respects. Description of method 1100 is generally applicable to method 1500 unless context requires otherwise.

For the ongoing calibration process 1510, image data 1512 and telematics data 1514 are accessed. Accessing of image data 1512 and telematics data 1514 is similar to as discussed earlier with reference to image data series 1112 and telematics data 1114 in method 1100, and not repeated for brevity. Image data 1512 and telematics data 1514 represent a common time. Image data 1512 can include one image, or a plurality of images (e.g. an image data series).

At 1520, the at least one processor compares the telematics data 1514 and/or the image data 1512 to suitability criteria. This comparison is similar to as described earlier with reference to 1120 in method 1100, and not repeated for brevity. The telematics data 1514 (or the image data 1512 itself) acts as an indicator for whether the image data 1512 will be suitable for use in calibration. If the suitability criteria are not satisfied, the process 1510 is restarted with new image data 1512 and telematics data 1514. In some implementations, image data 1512 is not accessed unless telematics data 1514 satisfies the suitability criteria (i.e. telematics data 1514 is first checked for suitability).

If the suitability criteria are satisfied at 1520, the process 1510 continues to act 1522. At 1522, the at least one processor identifies at least one human in the image data series. This identification is similar to act 1122 as discussed with reference to method 1100, and not repeated for brevity.

At 1524, the at least one processor clusters bounding boxes for each identified human across the image data. This clustering can be similar to as discussed with reference to act 1124 in method 1100, particularly where the image data 1512 includes a plurality of images, and is not repeated for brevity. At 1526, a position of each human and/or occupant is determined for a cluster of bounding boxes corresponding to the human. This aggregation can be similar to as discussed with reference to act 1126 in method 1100, particularly where the image data 1512 includes a plurality of images, and is not repeated for brevity.

Further, whether the image data 1512 includes a plurality of images or a single image, the clustering of act 1524 and the aggregation of act 1526 can include bounding boxes in a previously generated calibration polygon. That is, the clustering and aggregation in method 1500 account for not only immediate image data, but also image data based on which a prior calibration was performed. It is in this sense that calibration is "ongoing": the calibration uses a rolling image data set and continues to be tuned.

At 1528, the at least one processor identifies which occupant of the vehicle is the driver. This is similar to the driver identification discussed with reference to 1128 in method 1100, and not repeated for brevity.

Calibration process 1510 produces a calibration polygon 1530 focused on the vehicle driver. In some implementations, the calibration polygon is a polygon (such as quadrilateral) which encompasses the driver or the face of the driver. For example, the calibration polygon can be the aggregated bounding box for the driver's face. The calibration polygon can also be an extended polygon, as discussed earlier and not repeated for brevity.

At 1540, the at least one processor applies a validity check to determine if the calibration polygon 1530 is valid. If the calibration polygon is not valid, method 1500 awaits another iteration of process 1510, for a valid calibration polygon. If the calibration polygon 1530 is valid at 1540, the calibration polygon can be used at 1542 for various purposes. Exemplary uses are discussed later.

Throughout the methods described herein, various acts are included wherein a calibration polygon is used, such as act 642 in method 600, act 1040 in method 1000, act 1142 in method 1100, and act 1542 in method 1500. calibration polygons can be used in many different ways, and several examples are discussed below with reference to FIGS. 16 and 17.

In some implementations, a region of interest is defined based on the calibration polygon. Generally, the region of interest is a portion of the field of view of the image capture device. Based on the region of interest, computational power can be saved, and/or image data sized can be reduced. Examples are shown in FIGS. 16 and 17 discussed below.

Figure 16:
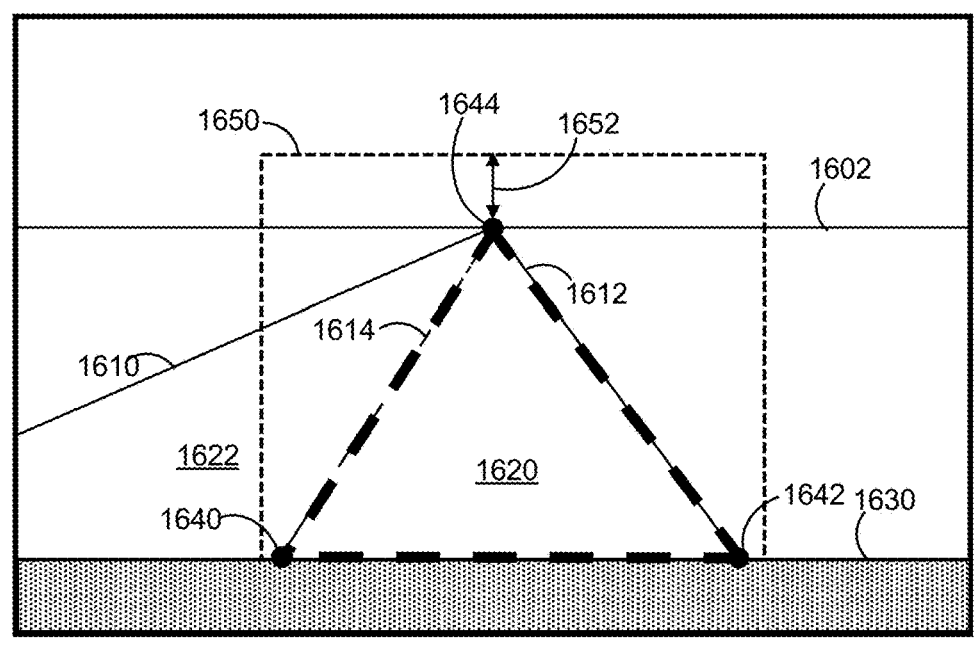
FIG. 16 illustrates an exemplary image from a road-facing perspective of a vehicle, illustrating a region of interest.

FIG. 16 illustrates image 1600. Image 1600 represents an image captured by a road-facing image capture device positioned at a vehicle, from a perspective of the vehicle. In the particular example of FIG. 16, the image 1600 represents an image captured from a forward-facing camera (dashcam), though the discussion of FIG. 16 could also apply to a rear-facing camera. Image 1600 includes a representation of a roadway on which vehicles can travel, delineated by boundaries 1612 and 1610, and extending to horizon 1602. The roadway in image 1600 includes a first lane of travel 1620 (in which the vehicle is positioned where image 1600 is captured from), and a second lane of travel 1622, divided by lane markers 1614 (a dashed line in the example, but other lane markers could also be used, such as a solid line or lane marker fixtures). Image 1600 in the example also includes a partial representation of a hood 1630 of the vehicle from which image 1600 is captured. In some example, no such hood may be visible. In other examples, other parts of the vehicle, such as windshield posts of the vehicle, may be visible in captured image data.

FIG. 16 also shows a calibration polygon defined by nearest left-lane point 1640, a nearest right-lane point 1642, and a vanishing point 1644. Nearest left-lane point 1640 can be an aggregated nearest left-lane point, nearest right-lane point 1642 can be an aggregated nearest right-lane point, and vanishing point 1644 can be an aggregated vanishing point, such as determined in any of method 600 or method 1000.

Image 1600 shows a two-lane roadway, but image data could be captured of roadways having any appropriate number of lanes. Further, image data captured by an image captured device can include representations of any pertinent features or objects; what is shown in FIG. 16 is a non-limiting example. Further still, the suitability criteria discussed in methods 600 and 1000 do not have to be satisfied to use image 1600. For example, the roadway could be curved or any appropriate shape; the vanishing point may not be visible, etc.

In some implementations, image 1600 as shown is raw data captured by an image capture device. In other implementations, image 1600 as shown has been processed and/or "cleaned up". For example, image 1600 as shown in FIG. 16 can be a cropped version of raw image data (to remove edge data and/or produce image 1600 having a certain aspect ratio. As another example, at least one distortion (or anti-distortion) transformation can be applied to raw image data, for example to compensate for characteristics of raw image data such as lens perspective or distortion.

FIG. 16 shows a region of interest 1650 defined based on the calibration polygon. In particular, region of interest 1650 is a quadrilateral with boundaries defined based on the calibration polygon.

In some cases, region of interest boundaries can match boundaries of the calibration polygon. In the illustrated example, a bottom edge of region of interest 1650 is shown as being aligned with nearest left-lane point 1640 and nearest right-lane point 1642. Because the nearest left-lane point 1640 and nearest right-lane point 1642 in this example represent the nearest visible lane area to the vehicle, this is a suitable bottom for the region of interest 1650 because it is extremely unlikely that any features of interest will be present below points 1640 and 1642 in any images.

In some cases, region of interest boundaries can be different from boundaries of the calibration polygon. In the illustrated example, a top edge of region of interest 1650 is positioned above vanishing point 1644, by a distance 1652. This is because some interesting features may appear this high in the image (e.g. signage, road signals, weather information via the sky, tops of vehicles, or any other features of interest). While not explicitly labelled to reduce clutter, a left boundary of region of interest 1650 is shown as being left of the nearest left-lane point 1640, and a right boundary of region of interest 1650 is shown as bring right of the nearest right-lane point 1642. In this way, the region of interest 1650 includes some area outside of the lane of travel of the vehicle, which can in some scenarios include useful information.

The region of interest can be defined algorithmically based on the calibration polygon. In particular, boundaries of the region interest can be defined as set numbers of pixels, or proportions of the image size, relative to the calibration polygon. In some cases, some boundaries of the region of interest can be defined to align with boundaries of the image. In this way, at least one processor can calculate a position of the region of interest based on the calibration polygon.

Figure 17:
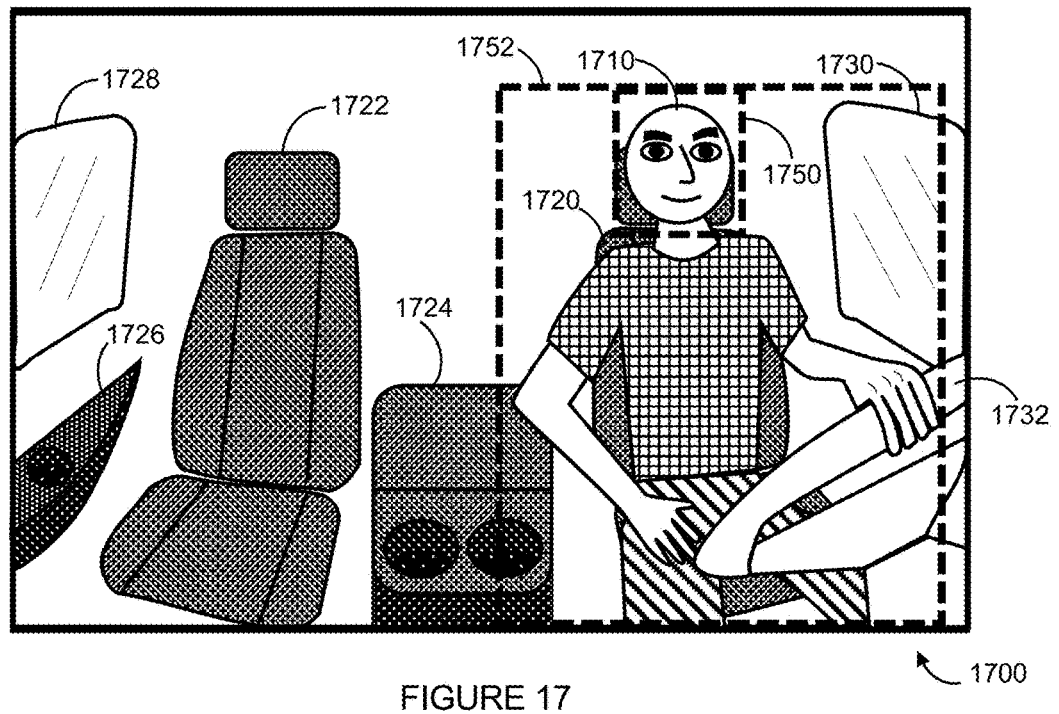
FIG. 17 illustrates an exemplary image from a cabin-facing perspective of a vehicle, illustrating a region of interest.

FIG. 17 illustrates image 1700. Image 1700 represents an image captured by a cabin-facing image capture device positioned at a vehicle, similar to images 1200, 1300, and 1400 in FIGS. 12A, 12B, 13, 14A, and 14B. In the particular example of FIG. 17, the image 1700 represents an image captured from a camera mounted at a front of the vehicle (e.g. to a windshield of the vehicle) facing inwards to the interior of the vehicle. Image 1700 includes a representation of a driver's seat 1720, with a driver 1710 sitting therein. Image 1700 also includes a representation of a passenger seat 1722, presently unoccupied. Image 1700 also includes representations of a center console 1724 between the driver's seat 1720 and the passenger seat 1722, side windows 1728 and 1730, passenger armrest 1726, and steering wheel 1732. While not illustrated to reduce clutter, image 1700 could also include representations of objects of features behind seats 1720 and 1722.

In image 1700, driver 1710 is operating the vehicle, with his left hand on steering wheel 1732 and his right hand on his lap. While image 1700 shows a left-hand drive vehicle (the driver's seat 1720, steering wheel 1732, and other vehicle operation controls are positioned at a left side of the vehicle), the discussion of FIG. 17 can apply to vehicles with any appropriate orientation, including right-hand drive vehicles or dual-side drive vehicles.

In some implementations, image 1700 as shown is raw data captured by an image capture device. In other implementations, image 1700 as shown has been processed and/or "cleaned up". For example, image 1700 as shown in FIG. 17 can be a cropped version of raw image data (to remove edge data and/or produce image 1700 having a certain aspect ratio. As another example, at least one distortion (or anti-distortion) transformation can be applied to raw image data, for example to compensate for characteristics of raw image data such as lens perspective or distortion.

FIG. 17 also shows a calibration polygon 1750. In the example, calibration polygon 1750 is an aggregated bounding box for a face of driver 1710, as determined in method 1100 or 1500. FIG. 17 shows a region of interest 1752 defined based on the calibration polygon 1750. In particular, region of interest 1752 is a quadrilateral with boundaries defined based on the calibration polygon 1750.

In some cases, region of interest boundaries can match boundaries of the calibration polygon. For example, a region of interest can be defined as matching bounding box 1750. Such an implementation would be useful for example in detecting driver drowsiness.

However, in driver monitoring systems it is often desirable to analyze actions by the driver's body, such as mobile device use. In this regard, in some implementations, (such as the example shown in FIG. 17), the region of interest is defined as extending beyond the calibration polygon. In the illustrated example, a top edge of region of interest 1752 is shown as being aligned with a top edge of calibration polygon 1750. This is a suitable top edge for the region of interest 1752 because it is extremely unlikely that any driver features of interest will be present above the driver's head. However, in the illustrated example the left, right, and bottom boundaries of region of interest 1752 are different from calibration polygon 1750. In the illustrated example, a left edge of region of interest 1750 is positioned left of a left edge of calibration polygon 1750, a right edge of region of interest 1750 is positioned right of a right edge of calibration polygon 1750, a bottom edge of region of interest 1750 is positioned below a bottom edge of calibration polygon 1750. In this way, the region of interest encompasses at least a portion of a body of driver 1710.

The region of interest can be defined algorithmically based on the calibration polygon. In particular, boundaries of the region interest can be defined as set numbers of pixels, or proportions of the image size, relative to the calibration polygon. In some cases, some boundaries of the region of interest can be defined to align with boundaries of the image. In this way, at least one processor can calculate a position of the region of interest based on the calibration polygon. In the example of FIG. 17, the bottom edge of region of interest 1752 can be set as the bottom edge of image 1700, the right edge of region of interest 1752 can be set as a certain number of pixels from the right edge of calibration polygon 1750, the left edge of region of interest 1752 can be set as a certain number of pixels form the left edge of calibration polygon 1750, and the top edge of region of interest 1752 can be set to align with the top edge of calibration polygon 1750. The exact amount of pixels between aspects of the calibration polygon 1750 and aspects of region of interest 1752 can be pre-set, for example as quantities typically sufficient to encompass a driver's body.

In some implementations, determination of the region of interest can be simplified. For example, for images from a cabin-facing image capture device (such as in FIG. 17), the region of interest could be defined as the horizontal half of the image where the calibration polygon for the driver is positioned. In the example of FIG. 17, the region of interest could be defined as the right half of the image 1700 (from the perspective of the viewer of the page), since this is the portion of the image where the calibration polygon indicates the driver is positioned.

Once a region of interest is defined (whether for road-facing image capture devices or for cabin-facing image capture devices), the region of interest can be used to reduce computational burden, storage requirements, or bandwidth requirements for images. Several examples are discussed below.

In some implementations, the image data can be reduced based on the region of interest. As an example, the image data could be cropped to the region of interest, and pixels outside of the region of interest can be deleted or discarded. As another example, image data outside of the region of interest could be maintained, but at a reduced quality (e.g. lower resolution or color depth) or at a reduced framerate. In such implementations, size of the image data is reduced.

Such reduced image data size takes up less storage space, enabling more image data to be stored and/or for smaller storage hardware to be effectively utilized. Further, reduced image data size also reduce transmission bandwidth should the image data be transferred (e.g. between an image capture device 108 and could server 106, client device 104, or local server 118). Further, computational burden of executing any detection models (such as trained machine learning or AI models) on the image data is reduced, because there is less data to process. By maintaining the image data in the region of interest, the most important area of the image data is maintained.

In other implementations, the image data itself may not be altered based on the region of interest, but application of detection models (such as trained machine learning or AI models) to the image data may be constrained to use the region of interest as input. That is, when executing a detection model on the image data, only the region of interest of image data may be input, or the model may be instructed to only execute on the data in the region of interest. In this way, computational burden of executing any detection models on the image data is reduced, because there is less data to process.

In some implementations, calibration results (a calibration polygon position and/or a region of interest) can be output to another device. For example, a calibration polygon as determined in any of methods 600, 1000, 1100, or 1500 could be transmitted to any of cloud server 106, client device 104, or local server 118 in FIG. 1A or 1B, to operator device 300 in FIG. 3, or to mobile device 400 in FIG. 4. This can be useful for example if a detection model is run at said other device, because the calibration results can inform image data to execute the detection model on. As another example, calibration results can be displayed or presented at a user device to aid in manual adjustment or confirmation of accurate calibration by a user.

Figure 18:
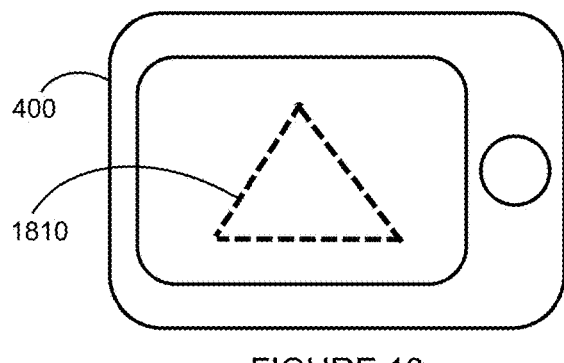
FIG. 18 is a front view of a mobile device presenting calibration results.

FIG. 18 is a front view of mobile device 400 discussed earlier with reference to FIG. 4. In FIG. 18, mobile device 400 displays a calibration polygon 1810, such that an operator or user of mobile device 400 can confirm accurate calibration, or adjust calibration of an image capture device, if needed. While the example of FIG. 18 shows a calibration triangle, other shapes of calibration are possible (such as quadrilateral), and the example of FIG. 18 applies to both road-facing and cabin-facing cameras.

Figure 19:
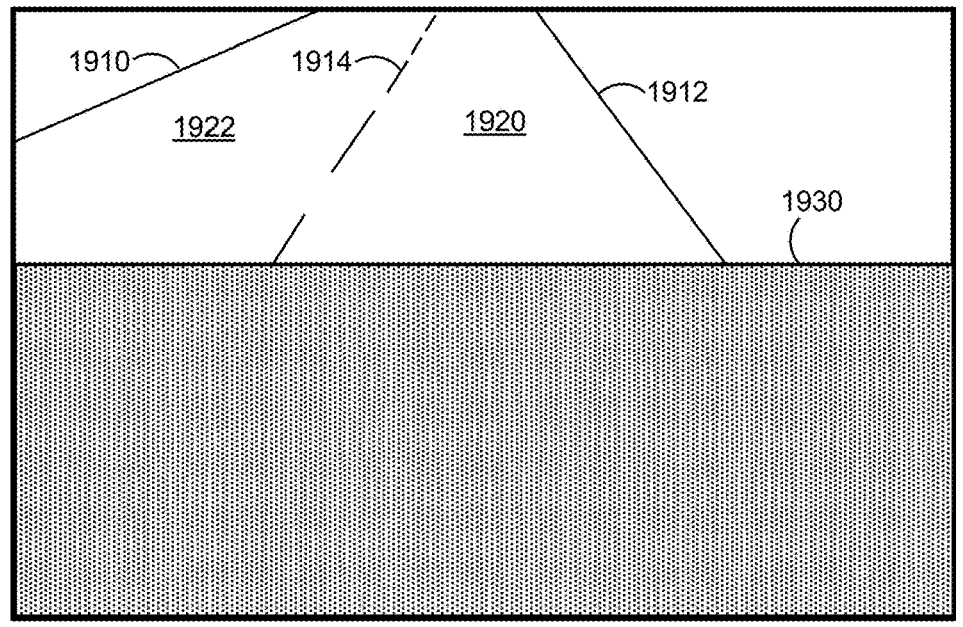
FIG. 19 illustrates an exemplary image where calibration of an image capture device is not possible.

FIG. 19 illustrates an image 1900 where calibration is not possible (using method 600 or method 1000 discussed earlier). Image 1900 represents an image captured by a road-facing image capture device positioned at a vehicle, from a perspective of the vehicle. In the particular example of FIG. 19, the image 1900 represents an image captured from a forward-facing camera (dash-cam), though the discussion of FIG. 1900 could also apply to a rear-facing camera. Image 1900 includes a representation of a roadway on which vehicles can travel, delineated by boundaries 1912 and 1910. The roadway in image 1900 includes a first lane of travel 1920 (in which the vehicle is positioned where image 1900 is captured from), and a second lane of travel 1922, divided by lane markers 1914 (a dashed line in the example, but other lane markers could also be used, such as a solid line or lane marker fixtures). Image 1900 in the example also includes a partial representation of a hood 1930 of the vehicle from which image 1900 is captured.

In the example of image 1900, no horizon is visible, and no vanishing point is detectable. As a result, a calibration polygon cannot be obtained via method 600 or method 1000. In response to such a scenario, the device which performs the calibration method can take corrective action. In an example, the device can output a warning or request to a user, indicating that corrective action needs to be taken. An example is shown in FIG. 20.

Figure 20:
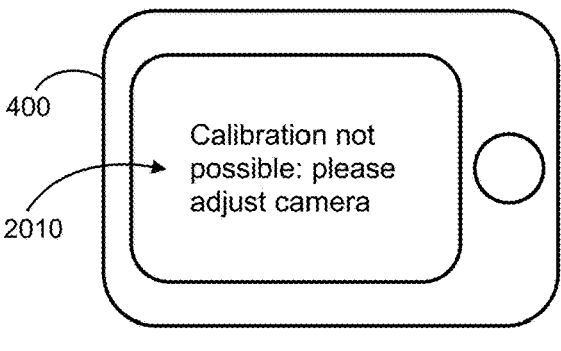
FIG. 20 is a front view of a mobile device presenting a warning regarding inability to calibrate.

FIG. 20 is a front view of mobile device 400 discussed earlier with reference to FIG. 4. In FIG. 20, mobile device 400 displays an alert 2010, such that an operator or user of mobile device 400 can take action, such as to adjust a portion or orientation of the image capture device. While the example of FIG. 20 shows visual text alert, other forms of alert are possible, such as an audio alert. Further, in some implementations an image from the image capture device (such as image 1900) can be displayed, to help the user take appropriate action.

While the example of FIGS. 19 and 20 show an image from a road-facing image capture device, the discussion applies in full to other image capture devices, such as cabin-facing image capture devices.

In some implementations, an actuator coupled to the image capture device can be used to automatically adjust alignment of the image capture device based on a calibration polygon determined in any of methods 600, 1000, 1100, or 1500. Such actuators are discussed with reference to FIGS. 2A, 2B, 2C and 2D (see actuators 230, 230C-1, 230C-1, 230D-1, and 230D-2). An example scenario is discussed below with reference to FIGS. 21 and 22.

Figure 21:
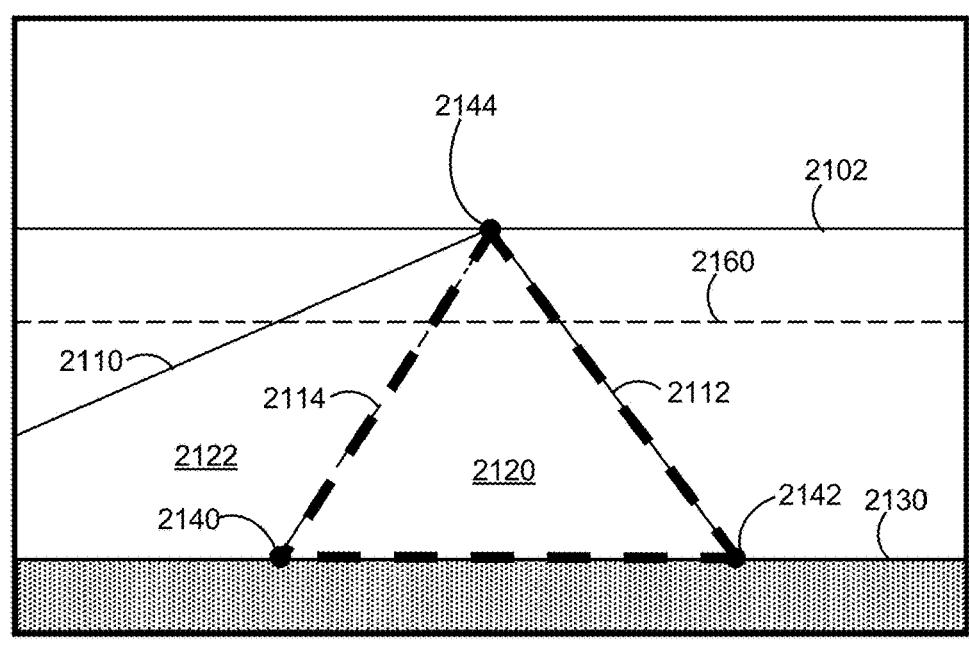
FIGS. 21 and 22 illustrate exemplary images from a road-facing perspective of a vehicle, showing adjustment of the image capture device.

FIG. 21 illustrates image 2100. Image 2100 represents an image captured by a road-facing image capture device positioned at a vehicle, from a perspective of the vehicle. In the particular example of FIG. 21, the image 2100 represents an image captured from a forward-facing camera (dash-cam), though the discussion of FIG. 21 could also apply to a rear-facing camera. Image 2100 includes a representation of a roadway on which vehicles can travel, delineated by boundaries 2112 and 2110, and extending to horizon 2102. The roadway in image 2100 includes a first lane of travel 2120 (in which the vehicle is positioned where image 2100 is captured from), and a second lane of travel 2122, divided by lane markers 2114 (a dashed line in the example, but other lane markers could also be used, such as a solid line or lane marker fixtures). Image 2100 in the example also includes a partial representation of a hood 2130 of the vehicle from which image 2100 is captured. In some examples, no such hood may be visible. In other examples, other parts of the vehicle, such as windshield posts of the vehicle, may be visible in captured image data.

Image 2100 shows a two-lane roadway, but image data could be captured of roadways having any appropriate number of lanes. Further, image data captured by an image captured device can include representations of any pertinent features or objects; what is shown in FIG. 21 is a non-limiting example.

In some implementations, image 2100 as shown is raw data captured by an image capture device. In other implementations, image 2100 as shown has been processed and/or "cleaned up". For example, image 2100 as shown in FIG. 21 can be a cropped version of raw image data (to remove edge data and/or produce image 2100 having a certain aspect ratio. As another example, at least one distortion (or anti-distortion) transformation can be applied to raw image data, for example to compensate for characteristics of raw image data such as lens perspective or distortion.

FIG. 21 also shows a calibration polygon defined by nearest left-lane point 2140, nearest right-lane point 2142, and vanishing point 2144. FIG. 21 also shows an optimal horizon line 2160. Optimal horizon line 2160 can be pre-defined, and in this example indicates that an optimal position for horizon line 2102 (a vertical position of vanishing point 2144) is at a vertical center of the image (50% of the image height). After determining the calibration polygon (in the example, according to method 600 or 1000, but in other example the calibration polygon could be determined in accordance with method 1100 or 1500), an actuator can be automatically actuated to reorient the image capture device, such that features of the image used in determining the calibration polygon align with defined optimal features. In the example of FIG. 21, the image capture device is actuated to rotate upwards, such that the horizon line 2102 (and vanishing point 2144) appear closer to the center of the image.

Figure 22:
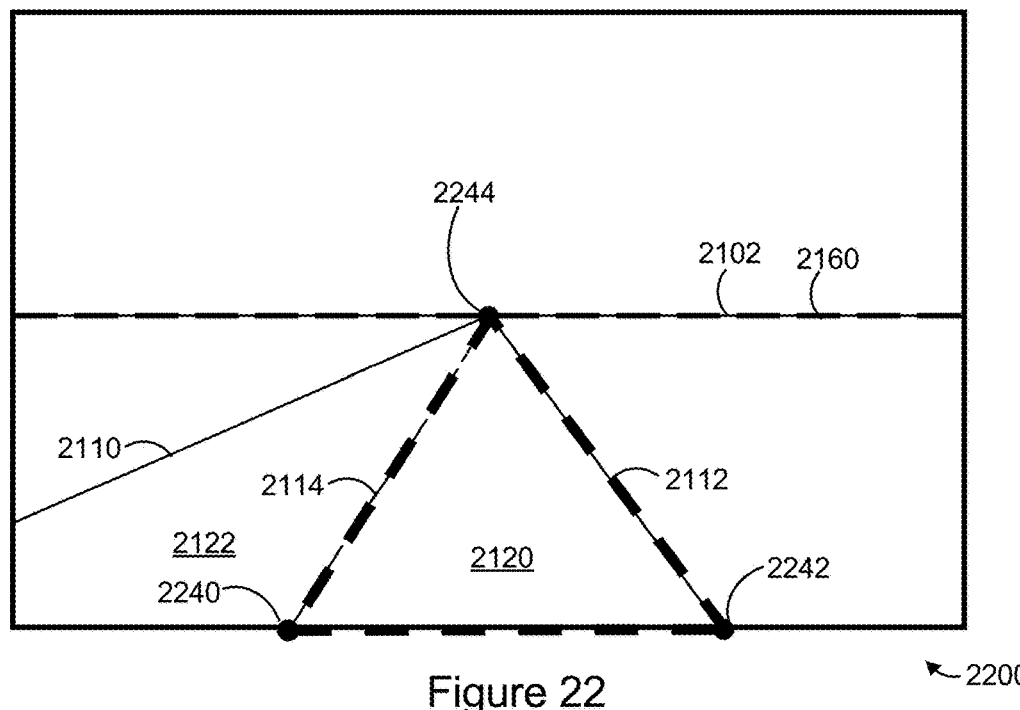

A result of actuation is shown in FIG. 22. FIG. 22 illustrates image 2200. Image 2200 represents an image captured by a road-facing image capture device positioned at a vehicle, from a perspective of the vehicle similar to image 2100. Many of the features in image 2200 are the same as or similar to features shown in image 2100, and description thereof is not repeated for brevity. The perspective of image 2200 is slightly different from image 2100, in that the camera has been rotated to aim higher. As a result, horizon line 2102 in image 2200 is aligned with optimal horizon line 2160.

A new calibration polygon can be determined (e.g. according to method 600 or 1000) after adjustment, to identify whether further adjustment is needed. FIG. 22 shows a new calibration polygon defined by nearest left-lane point 2240, nearest right-lane point 2242, and vanishing point 2244.

In the example illustrated in FIG. 22, the image capture device has been rotated to align horizon line 2102 with optimal horizon line 2160 very precisely, but this is not always possible. In some implementations, an image capture device (or lens thereof) is rotatable in discrete "steps" (e.g. rotatable in increments a 5 or 10 degrees, or other increments). In such implementations, adjustment or actuation of the image capture device may only be performed when the calibration polygon deviates from an optimal polygon in excess of an actuation threshold, where the threshold approximates one increment or step which the image capture device is rotatable by.

While the example of FIGS. 21 and 22 show images from a road-facing image capture device, the discussion applies in full to other image capture devices, such as cabin-facing image capture devices.

In some implementations, in addition to determining a calibration polygon, a calibration confidence score of the calibration polygon is also determined. As an example, the at least one processor can determine a calibration confidence score of the calibration polygon by comparing the calibration polygon to a predefined optimal polygon. Such an optimal polygon may define optimal or desired positioning for a calibration polygon. As one example, the optimal polygon may define that the vanishing point should be vertically centered in the image data (at 50% of the height of the image, such as shown in FIG. 21). A calibration polygon which deviates from this position has a negatively impacted calibration confidence score. In this example, if the vanishing point of the calibration polygon is positioned at 52% of the height of the image data, this represents a 2% gross or 4% relative deviation from optimal.

Calibration confidence score can be used to adjust trigger thresholds for detection models run on calibrated image data. In particular, where calibration confidence for a particular image capture device (or image data therefrom) is low, trigger threshold for detection models run on such image data can be elevated, to reduce the risk of false positive detections. As an example, if calibration confidence is low for a cabin-facing image capture device is low, then a trigger threshold for a mobile device usage detection model can be set to be high. In this way, a more clear detection of mobile device usage is required from the detection model because the calibration confidence is low. Such an implementation helps to eliminate false positives by adjusted trigger thresholds when data quality is expected to be lower (when calibration is less accurate than desired).

As discussed throughout this application, the various acts of the method described herein can be performed by various components of the devices described herein. Some exemplary implementations for where certain acts can be performed are discussed below. These examples are non-limiting, and acts can generally be performed at any appropriate device.

In some examples, methods 600, 1000, 1100, and 1500 can generally be performed locally at a respective vehicle. In such examples, image data (such as 612, 652, 1012, 1112, 1152, or 1512) are captured by an appropriate image capture device (such as any of those in FIG. 2A, 2B, 2C, or 2D). Further, telematics data (such as 614, 654, 1014, 1114, 1154, or 1514) are captured by an appropriate sensor (such as data sensor 208) at the image capture device, or a peripheral device communicatively coupled to the image capture device if applicable (such as any of those in FIG. 2A, 2B, 2C, or 2D). Further, acts of method 600 (such as 622, 624, 640, 660, 662, 664, and optionally 642), of method 1000 (such as 1020, 1022, 1024, 1032, and optionally 1040), of method 1100 (such as 1120, 1122, 1124, 1126, 1128, 1140, 1160, 1162, 1164, and optionally 1142), or of method 1500 (such as 1520, 1522, 1524, 1526, 1528, 1540, and optionally 1542) can be performed by at least one processor at the device local to the vehicle (image capture device or peripheral device), such as any of processors 206 in FIG. 2A, 2B, 2C, or 2D.

Even when a particular method is performed locally at a vehicle, acts 642, 1040, 1142, and 1542, whereby a calibration polygon is used, can be optionally performed locally at the vehicle and/or remotely from the vehicle. For example, image adjustments (cropping etc.) and detection model usage can be executed locally at the vehicle, or remotely on image data uploaded from the vehicle, based on calibration of the image captured device, regardless of where such calibration was performed. Where the calibration is performed locally at the vehicle, the calibration polygon can be transmitted from the device at the vehicle (image capture device or peripheral device), to the remote device (cloud server 106, client device 104, local server 118, operator device 300, or mobile device 400).

In some examples, methods 600, 1000, 1100, and 1500 can generally be performed remotely from a respective vehicle. In such examples, image data (such as 612, 652, 1012, 1112, 1152, or 1512) are captured by an appropriate image capture device (such as any of those in FIG. 2A, 2B, 2C, or 2D). Further, telematics data (such as 614, 654, 1014, 1114, 1154, or 1514) are captured by an appropriate sensor (such as data sensor 208) at the image capture device, or a peripheral device communicatively coupled to the image capture device if applicable (such as any of those in FIG. 2A, 2B, 2C, or 2D). Such image data and telematics data is transmitted from the device local to the vehicle to a remote device (e.g. cloud server 106, client device 104, local server 118, operator device 300, or mobile device 400). The remote device can then perform acts of method 600 (such as 622, 624, 640, 660, 662, 664, and optionally 642), of method 1000 (such as 1020, 1022, 1024, 1032, and optionally 1040), of method 1100 (such as 1120, 1122, 1124, 1126, 1128, 1140, 1160, 1162, 1164, and optionally 1142), or of method 1500 (such as 1520, 1522, 1524, 1526, 1528, 1540, and optionally 1542), by at least one processor at the remote device (e.g. any of processors 106a, 104a, 118a, 312, or 412). Where the calibration is performed remotely from the vehicle, the calibration polygon can be transmitted from the remote device, to a device local to the vehicle (any of the peripheral devices or image capture devices in FIGS. 2A, 2B, 2C, and 2D).

Further, in some implementations, a given device can perform a plurality of the methods described herein. For example, FIG. 2C shows an image capture device with two lenses 202C-1 and 202C-2, which can capture two different streams of image data representing different fields of view (e.g. one stream for road-facing image data, and another stream for cabin-facing image data). As another example, FIG. 2D shows two image capture devices 108D-1 and 108D2, which can capture two different streams of image data representing different fields of view (e.g. one stream for road-facing image data, and another stream for cabin-facing image data). As yet another example, FIG. 5 shows a vehicle having three image capture devices 502, 504, and 506, which can capture three streams of image data (one stream for forward road-facing data, one stream for rearward road-facing data, and another stream for cabin-facing data).

With reference to methods 600 and 1000, a plurality of images were discussed showing straight lanes. However, methods 600 and 1000 are not limited in applicability to only straight lanes. Methods 600 and 1000 are also applicable even when lanes are curved, as discussed below with reference to FIGS. 23A, 23B, and 23C.

Figure 23A:
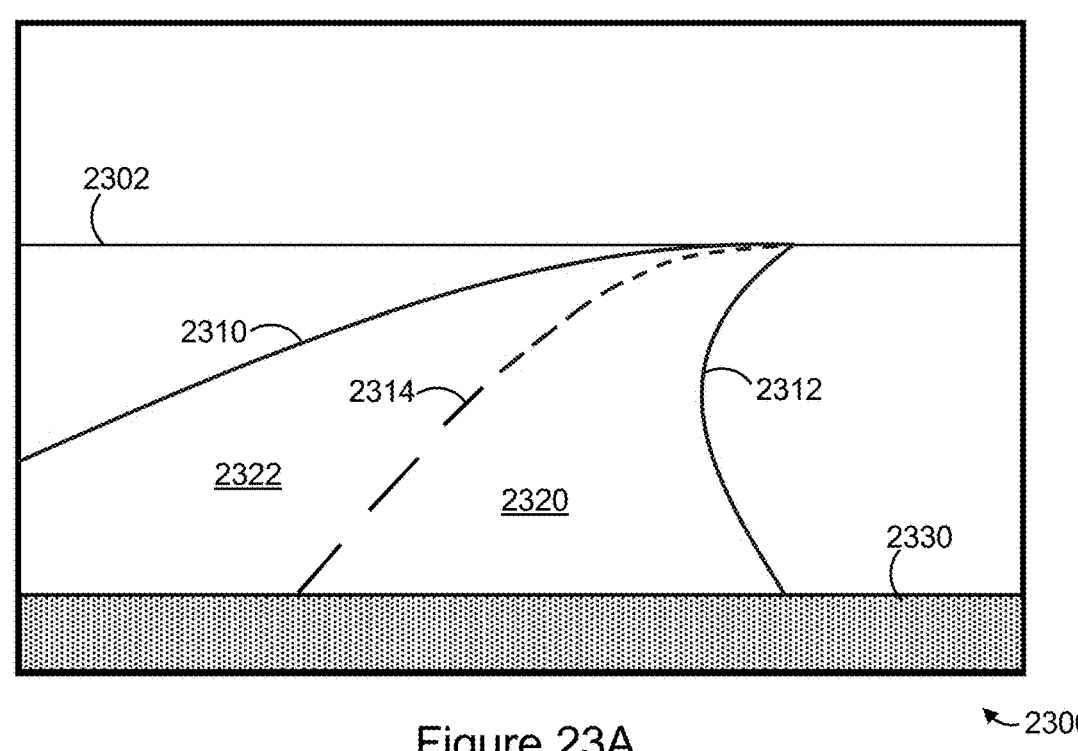
FIGS. 23A, 23B, and 23C illustrate further exemplary images from a road-facing perspective of a vehicle.

FIG. 23A illustrates image 2300. Image 2300 represents an image captured by a road-facing image capture device positioned at a vehicle, from a perspective of the vehicle. In the particular example of FIG. 23A, the image 2300 represents an image captured from a forward-facing camera (dash-cam), though the discussion of FIG. 23A could also apply to a rear-facing camera. Image 2300 includes a representation of a roadway on which vehicles can travel, delineated by boundaries 2312 and 2310, and extending to horizon 2302. The roadway in image 2300 includes a first lane of travel 2320 (in which the vehicle is positioned where image 2300 is captured from), and a second lane of travel 2322, divided by lane markers 2314 (a dashed line in the example, but other lane markers could also be used, such as a solid line or lane marker fixtures). Image 2300 in the example also includes a partial representation of a hood 2330 of the vehicle from which image 2300 is captured. In some examples, no such hood may be visible. In other examples, other parts of the vehicle, such as windshield posts of the vehicle, may be visible in captured image data.

Image 2300 shows a two-lane roadway which curves to the right. Image data could be captured of roadways having any appropriate number of lanes, curving in any direction. Further, image data captured by an image captured device can include representations of any pertinent features or objects; what is shown in FIG. 23A is a non-limiting example.

In some implementations, image 2300 as shown is raw data captured by an image capture device. In other implementations, image 2300 as shown has been processed and/or "cleaned up". For example, image 2300 as shown in FIG. 23A can be a cropped version of raw image data (to remove edge data and/or produce image 2300 having a certain aspect ratio. As another example, at least one distortion (or anti-distortion) transformation can be applied to raw image data, for example to compensate for characteristics of raw image data such as lens perspective or distortion.

Figure 23B:
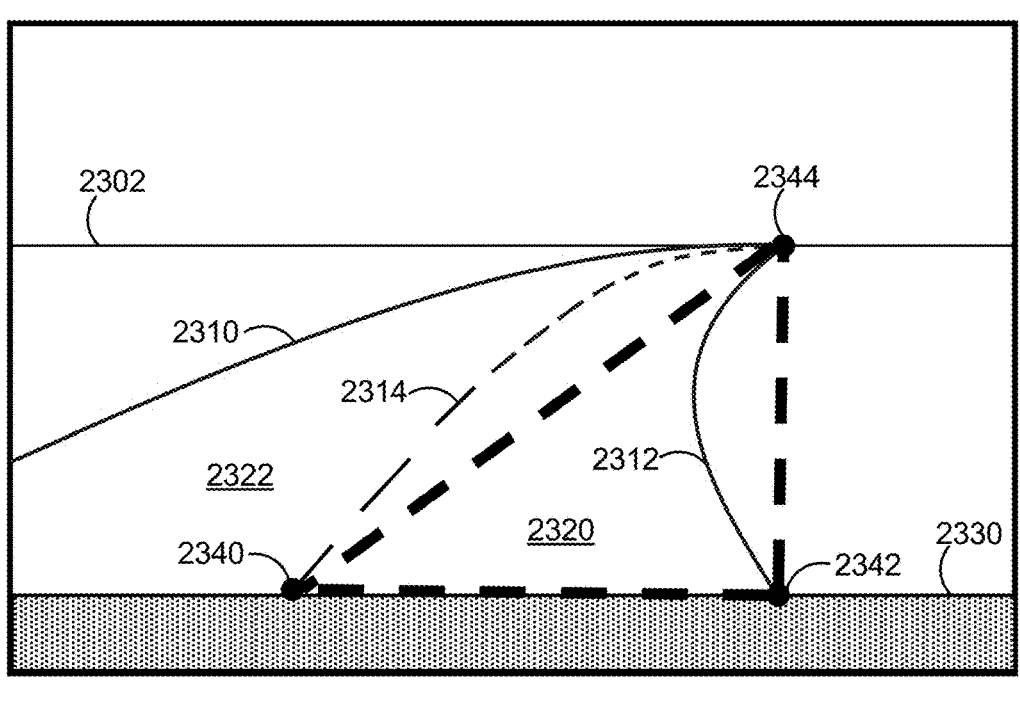

FIG. 23B shows image 2300, as described with reference to FIG. 23A. FIG. 23B includes additional annotations showing features determined in the calibration process (such as in method 600 or 1000). In particular, the at least one processor applies a lane detection model to the image to identify left and right boundaries of a lane of travel of the vehicle. In the example of image 2300, the at least one processor identifies a left lane boundary by lane markers 2314, and identifies a right lane boundary by road boundary 2312, which represent boundaries of lane 2320 in which the vehicle travels.

Lane boundaries can be determined by the at least one processor for example by applying a feature detection model to the image, similar to as discussed earlier. In an example, the at least one processor can detect lanes in the form of a segmentation mask, where pixels forming lane markings are labeled as lane marking pixels, while other pixels are labelled as background pixels.

Determining the first boundary and the second boundary can entail determining a mathematical representation for each boundary. Equation (1) discussed earlier is a linear equation (a first-order polynomial) representing straight line lane boundaries. In contrast, lane boundaries for a curved lane such as shown in FIGS. 23A and 23B can be modelled using a higher order polynomial or spline (piecewise polynomial). In an example, the at least one processor determines a polynomial or spline representing a left lane boundary (to the left of the lane of travel of the vehicle), and another polynomial or spline representing a right lane boundary (to the right of the lane of travel of the vehicle).

With reference to acts 622, 662, and 1022 in methods 600 and 1000, the at least one processor can determine a nearest left-lane point, a nearest right-lane point, and a vanishing point based on equations for the left lane boundary and the right lane boundary. In an example, the at least one processor determines a vanishing point for the image as a point where the left lane boundary and the right lane boundary intersect each other. In the example of FIG. 23B, the vanishing point is labelled as 2344.

In an example, the at least one processor determines the nearest left point for the image as a point where the left lane boundary intersects with the bottom of the image (the nearest point in the image on the left lane boundary), and determines the nearest right point for the image as a point where the right lane boundary intersects with the bottom of the image (the nearest point in the image on the right lane boundary). These points are not explicitly shown in FIG. 23B, as another implementation is shown as discussed below.

In another example, the at least one processor determines the nearest left point for the image as a visible point on the left lane boundary closest to the bottom of the image, and determines the nearest right point for the image as a visible point on the right lane boundary closest to the bottom of the image. For example, the object or feature detection model which detects the lane boundaries can output a coordinate for the closest point of the left lane boundary (as detected) and right lane boundary (as detected). In the example of FIG. 23B, the nearest left lane point is shown as 2340, and the nearest right lane point is shown as 2342.

In some implementations, equations for the left lane boundary and the right lane boundary are not explicitly determined. Instead, the nearest left lane point and nearest right lane point can be output as points detected for the left and right lane boundaries which are closest to a bottom of the image, and the vanishing point can be output as a point where the detected left lane boundary and the detected right lane boundary overlap.

As can be seen in FIG. 23B, the nearest left-lane point 2340, the nearest right-lane point 2342, and the vanishing point 2344 form a polygon, and in particular a triangle. By including additional and/or different identified points from the image, other polygons could be formed.

As can be seen in FIG. 23B, a polygon defined between a nearest left-lane point, a nearest right-lane point, and a vanishing point for a curved road may not encompass a significant portion of a lane of travel of the vehicle (in the example of FIG. 23B, not all of lane 2320 is covered by the polygon between points 2340, 2342, and 2340). In some implementations this is not an issue. For example where a region of interest is defined based on the calibration polygon (as discussed with reference to FIG. 16), the parameters for defining the region of interest may be such that all pertinent portions of the lane of travel are still included in the region of interest. Alternatively, a calibration polygon based on such points may not be restricted to being a triangle. For example, the calibration polygon can be defined based on the most extreme coordinates of the nearest left-lane point, the nearest right-lane point, and the vanishing point. An example is shown in FIG. 23C.

Figure 23C:
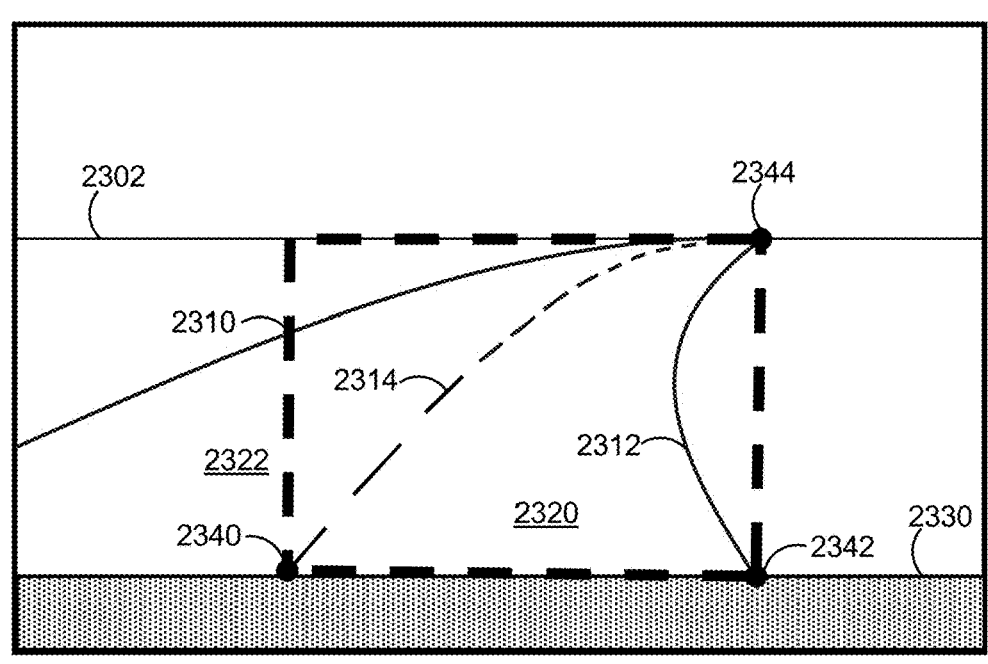

FIG. 23C illustrates image 2300, as described with reference to FIGS. 23A and 23B. FIG. 23C also shows a polygon (in this case a quadrilateral) which is defined based on nearest left-lane point 2340, nearest right-lane point 2342, and vanishing point 2344. In the example of FIG. 23C, the polygon is defined by a left boundary aligned with nearest left-lane point 2340 (the furthest left point), a top boundary defined by vanishing point 2344 (the highest point), a right boundary defined by vanishing point 2344 (the furthest right point), and a bottom boundary defined by nearest left-lane point 2340 and nearest right-lane point 2342 (the lowest points).

Means for adjusting an image capture device based on calibration are discussed earlier with reference to FIGS. 21-22. Further such means are discussed below. While the disclosure of FIGS. 21 and 22 generally refers to automatic adjustment via an actuator, it is also possible to present a user interface for adjustment by a user, operator, driver, installer, or other person. Examples are discussed below with reference to FIGS. 24, 25 and 26.

Figure 24:
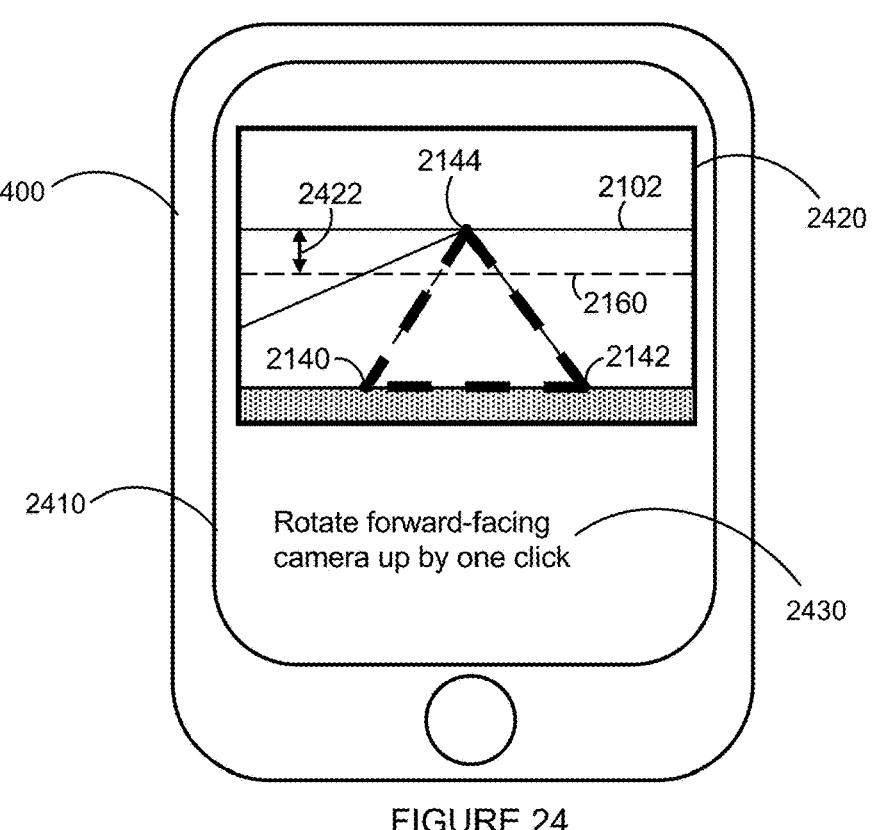
FIGS. 24, 25, and 26 illustrate user interfaces for adjustment of image capture devices in accordance with three exemplary implementations.

FIG. 24 is a front view of mobile device 400 discussed earlier with reference to FIG. 4. In the example of FIG. 24, mobile device 400 displays a user interface 2410, which an operator or user of mobile device 400 can view to confirm or adjust calibration of an image capture device. In the example, user interface 2410 is shown as including an image 2420 and guidance 2430. Image 2420 in the example of FIG. 24 corresponds to image 2100 in FIG. 21. FIG. 24 shows many reference numerals which are discussed earlier with reference to image 2100 in FIG. 21, including nearest left-lane point 2140, nearest right-lane point 2142, vanishing point 2144, horizon line 2102, and optimal horizon line 2160. The description of image 2100 and these reference numerals applies to image 2420 presented in FIG. 24, and is not repeated for brevity. Image 2100 is used as an example to simplify discussion, but in practice any appropriate image from an image capture device positioned at a vehicle can be shown, regardless of whether said image is from a forward-facing image capture device, an interior or cabin-facing image capture device, or any other image capture device at a vehicle.

FIG. 24 shows an example interface where a user is presented with an image from an image capture device, including calibration assistance information (optimal horizon line 2160) to aid the user in properly aligning the image capture device. Further, FIG. 24 shows a deviation 2422, which is indicative of deviation between the horizon line 2102 and the optimal horizon line 2160. Deviation 2422 can be useful for a user to quantify a degree of misalignment of the image capture device from optimal.

FIG. 24 also shows a guidance area 2430, where specific adjustment guidance is output for the user. In the example, the user is provided with instructions "rotate forward-facing camera up by one click". In this context "click" refers to a discrete adjustment interval of a lens angle of the image capture device. In some implementations, orientation of a lens of an image capture device may be continuously adjustable. The instructions provide specific and actionable recommendations to the user to achieve good calibration. The precise guidance presented can be determined for example by at least one processor of the image capture device or of the user device 400, based on deviation 2422. For example, a formula or look-up table can be established between deviation values and camera adjustment intervals, such that an appropriate suggestion of adjustment based on said intervals can be presented.

Figure 25:
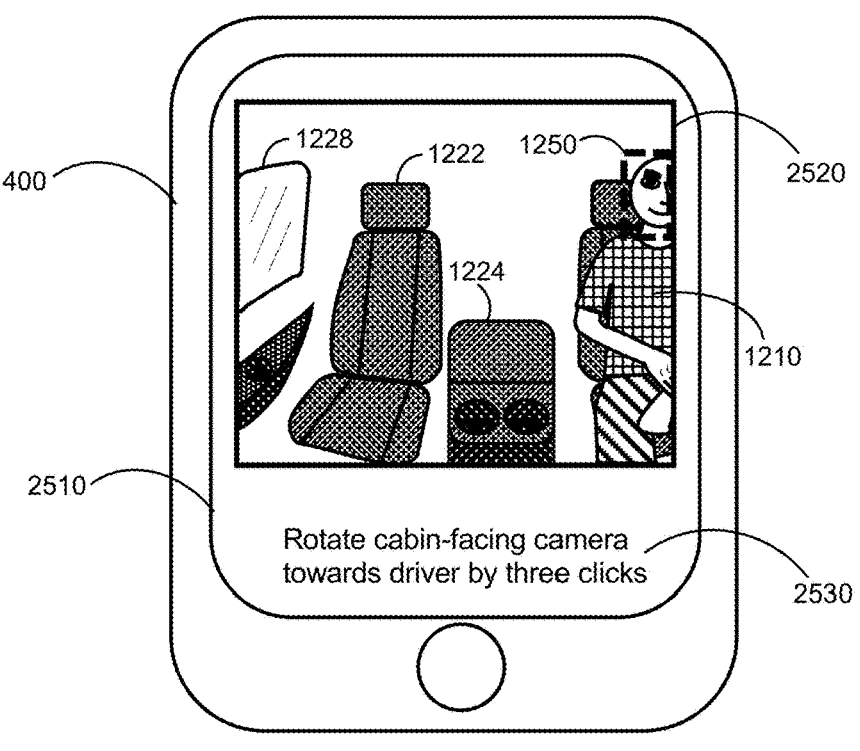

FIG. 25 is a front view of mobile device 400 discussed earlier with reference to FIG. 4. In the example of FIG. 25, mobile device 400 displays a user interface 2510, which an operator or user of mobile device 400 can view to confirm or adjust calibration of an image capture device. FIG. 25 is similar to FIG. 24, but FIG. 25 shows an example where interior or cabin-facing image data is shown, whereas FIG. 24 shows forward-facing image data.

In the example of FIG. 25, user interface 2510 is shown as including an image 2520 and guidance 2530. Image 2520 in the example of FIG. 25 is similar to image 1300 in FIG. 13. FIG. 25 shows many reference numerals which are discussed earlier with reference to image 1300 in FIG. 13 (and with reference to FIG. 12), including driver 1210, passenger set 1222, center console 1224, side window 1228, and a partial bounding box 1250. The description of image 1300 and these reference numerals applies to image 2520 presented in FIG. 25, and is not repeated for brevity. One difference to FIG. 13 is that image 2520 shows less area than image 1300. In particular, in FIG. 25 a right portion of the image is not captured, such that the driver's face is not fully represented, illustrative of offset orientation or positioning of the image capture device. Image 1300 is used as an example to simplify discussion, but in practice any appropriate image from an image capture device positioned at a vehicle can be shown, regardless of whether said image is from a forward-facing image capture device, a cabin-facing image capture device, or any other image capture device at a vehicle.

FIG. 25 shows an example interface where a user is presented with an image from an image capture device, including calibration assistance information (partial bounding box 1250) to aid the user in properly aligning the image capture device. FIG. 25 also shows a guidance area 2530, where specific adjustment guidance is output for the user. In the example, the user is provided with instructions "rotate cabin-facing camera towards driver by three clicks". In this context "click" refers to a discrete adjustment interval of a lens angle of the image capture device. The instructions provide specific and actionable recommendations to the user to achieve good calibration. In some implementations, orientation of a lens of an image capture device may be continuously adjustable. The precise guidance presented can be determined for example by at least one processor of the image capture device or of the user device 400, based on visibility of key features like the driver's face. For example, the at least one processor can determined that the driver's face is only partially representing, which demands a substantial rotation of the image capture device.

In some implementations where multiple image capture devices are utilized, respective adjustment interfaces can be presented separately (e.g. in sequence) for each image capture device. For example, the interface of FIG. 24 could be presented, and the interface of FIG. 25 could be presented, enabling a user to adjust both image capture devices. In alternative implementations, multiple images can be presented in a single interface, as discussed below with reference to FIG. 26.

Figure 26:
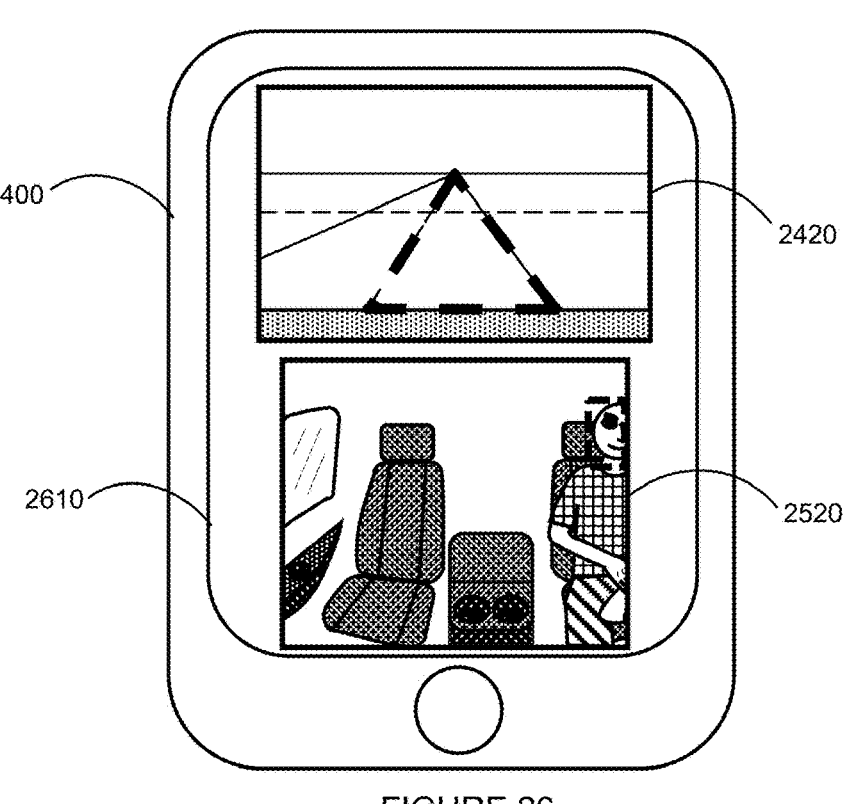

FIG. 26 is a front view of mobile device 400 discussed earlier with reference to FIG. 4. In the example of FIG. 26, mobile device 400 displays a user interface 2610, which an operator or user of mobile device 400 can view to confirm or adjust calibration of an image capture device. In the example, user interface 2610 is shown as including an image 2420 and an image 2520, similar to as discussed above with reference to FIGS. 24 and 25. Description of images 2420 and 2520 for FIGS. 24 and 25 is fully applicable to FIG. 26. FIG. 26 illustrates that a user interface can present multiple images, representing different perspectives from different image capture devices, so the user can perform adjustment or confirm calibration of the image capture devices. While FIG. 26 shows a forward-facing camera image (image 2420) and a cabin-facing camera image (image 2520), any appropriate perspective of image could be presented. Further, more than two images could be presented, from even more image capture devices. Further still, additional information, such as guidance 2430 or guidance 2530 could also be presented.

FIGS. 24, 25, and 26 show user interfaces being presented by a mobile device 400, as described earlier with reference to FIG. 4. However, any other appropriate device could be used to present the user interface. In some implementations, the interface may be audio-only, and present guidance 2430 or 2530 to the user as sound.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

What is claimed is:

1. A system, comprising:
   at least one image capture device positioned at a vehicle and oriented to face an interior of the vehicle;
   at least one processor; and
   at least one non-transitory processor-readable storage medium storing processor-executable instructions which when executed by the at least one processor cause the system to:
   perform a calibration process which includes:
      access first telematics data for the vehicle;
      capturing a first image data series by the at least one image capture device, the first image data series representing an interior of the vehicle, the first image data series and the first telematics data representing a first period of time;
      determining, by the at least one processor, whether suitability criteria are satisfied for at least the first telematics data;
      when the suitability criteria are not satisfied, restarting the calibration process; and
      when the suitability criteria are satisfied:
         for each image in the first image data series, applying at least one detection model to identify at least one bounding box around at least one human represented in the first image data series;
         cluster bounding boxes of each human of the at least one human across the first image data series to identify a respective bounding box cluster for each human of the at least one human;
         aggregate a position of each bounding box in each bounding box cluster to determine an aggregated position of each human of the at least one human; and
         select one human of the at least one human, the select human positioned at a driver's seat of the vehicle; and
         determine a calibration polygon focused on the aggregated position of the select human positioned at a driver's seat of the vehicle; and
   perform a monitoring process which includes:
      accessing second telematics data for the vehicle;

capturing second image data by the at least one image capture device, the second image data representing the interior of the vehicle, the second image data and the second telematics data representing a common time after the first period of time;

determining, by the at least one processor, whether the suitability criteria are satisfied for at least the second telematics data;

when the suitability criteria are not satisfied, restarting the monitoring process; and when the suitability criteria are satisfied:

applying the at least one detection model to identify a position of the select human represented in the second image data;

compare the position of the select human in the second image data to the aggregated position of the select human;

when the position of the select human in the second image data deviates from the aggregated position of the select human in excess of a deviation threshold, perform the calibration process again; and when the position of the select human in the second image data does not deviate from the aggregated position of the select human in excess of a deviation threshold, maintain the calibration polygon focused on the position of the select human.

2. The system of claim 1, wherein the first telematics data includes location data over time or speed data indicative of movement speed of the vehicle for the first period of time, and the suitability criteria includes the movement speed of the vehicle exceeding a speed threshold.

3. The system of claim 1, wherein the first telematics data includes location data indicative of a location of the vehicle, and the suitability criteria includes the location of the vehicle matching a location classification.

4. The system of claim 1, wherein determining whether suitability criteria are satisfied for at least the first telematics data comprises determining whether the suitability criteria are satisfied for the first telematics data and the first image data series.

5. The system of claim 4, wherein determining whether the suitability criteria are satisfied for the first image data series comprises determining whether a driver of the vehicle is in a driving posture.

6. The system of claim 1, wherein the processor-executable instructions further cause the at least one processor to:

determine a region of interest within a field of view of the at least one image capture device, based on the calibration polygon.

7. The system of claim 6, wherein the processor-executable instructions further cause the at least one processor to crop image data from the at least one image capture device to the region of interest.

8. The system of claim 6, wherein the processor executable instructions further cause the at least one processor to execute a trained detection model on the region of interest for image data from the at least one image capture device.

9. The system of claim 1, further comprising at least one actuator coupled to the at least one image capture device, wherein the processor-executable instructions further cause the system to orient, by the at least one actuator, the at least one image capture device to align a field of view of the at least one image capture device based on the calibration polygon.

10. The system of claim 1, further comprising a user interface to output, to a user, the calibration polygon.

11. The system of claim 1, wherein the deviation threshold comprises a pixel displacement threshold, and the monitoring polygon is within the deviation threshold if the monitoring polygon is displaced from the calibration polygon by a smaller pixel displacement than the displacement threshold.

12. The system of claim 1, wherein the processor-executable instructions further cause the at least one processor to determine a calibration confidence score based on an image position of the calibration polygon to an image position of an optimal polygon, the optimal polygon representing an optimal position for the calibration polygon.

13. The system of claim 12, wherein the deviation threshold is variable based on the calibration confidence score.

14. The system of claim 1, wherein the first telematics data comprises inertial data indicative of vertical movement of the vehicle for the first period of time, and the suitability criteria includes the vertical movement of the vehicle being linear.

15. The system of claim 1, wherein the first telematics data comprises elevation data indicative of change in elevation of the vehicle for the first period of time, and the suitability criteria includes an elevation trajectory of the vehicle being linear.

16. The system of claim 1, further comprising at least one telematics sensor which captures the first telematics data and the second telematics data.

* * * * *